(12) United States Patent
Nakajima et al.

(10) Patent No.: US 7,532,227 B2
(45) Date of Patent: May 12, 2009

(54) OPTICAL SCANNER AND IMAGE FORMING APPARATUS

(75) Inventors: Tomohiro Nakajima, Tokyo (JP); Akira Kojima, Chiba (JP); Ikuko Yamashiro, Kanagawa (JP); Seizo Suzuki, Kanagawa (JP); Taku Amada, Kanagawa (JP); Yoshinori Hayashi, Kanagawa (JP); Kazuyuki Shimada, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/609,577

(22) Filed: Jul. 1, 2003

(65) Prior Publication Data
US 2004/0036936 A1  Feb. 26, 2004

(30) Foreign Application Priority Data

| Jul. 2, 2002 | (JP) | ............................. 2002-193652 |
| Sep. 19, 2002 | (JP) | ............................. 2002-274073 |
| Sep. 19, 2002 | (JP) | ............................. 2002-274075 |
| Sep. 20, 2002 | (JP) | ............................. 2002-276311 |

(51) Int. Cl.
*B41J 15/14* (2006.01)
*B41J 27/00* (2006.01)
(52) U.S. Cl. ...................... 347/241; 347/256
(58) Field of Classification Search ......... 347/241–244, 347/256–261, 115–118, 232–235, 248–250; 399/399, 394, 204, 206; 356/73; 385/36; 359/234, 557, 678, 204, 206; 250/235
See application file for complete search history.

(56) References Cited

U.S. PATENT DOCUMENTS

| 2,828,670 | A | * | 4/1958 | Luboshez ................... 359/678 |
| 4,600,837 | A | * | 7/1986 | DiStefano et al. ........... 250/235 |
| 5,245,181 | A |   | 9/1993 | Cho |
| 5,452,073 | A | * | 9/1995 | Kataoka ...................... 399/299 |
| 5,481,394 | A | * | 1/1996 | Kimura ....................... 359/234 |
| 5,870,133 | A |   | 2/1999 | Naiki |
| 5,983,066 | A | * | 11/1999 | Abe et al. ................... 399/394 |
| 5,995,268 | A | * | 11/1999 | Shiraishi et al. ............. 359/204 |

(Continued)

FOREIGN PATENT DOCUMENTS

JP     58068016 A  *  4/1983

(Continued)

OTHER PUBLICATIONS

U.S. Appl. No. 10/942,907, filed Sep. 17, 2004, Miyatake et al.

(Continued)

*Primary Examiner*—Hai C Pham
(74) *Attorney, Agent, or Firm*—Oblon, Spivak, McClelland, Maier & Neustadt, P.C.

(57) ABSTRACT

An optical scanner is capable of effectively correcting a difference with respect to the sub-scanning direction between the positions of optical spots for scanning photoconductor drums of a tandem type color image forming apparatus. The optical scanner includes an optical axis adjusting part. The optical axis adjusting part uses a deflecting mirror or a wedge-shaped prism to deflect the optical axis of an optical beam with respect to the sub-scanning direction. As a result, it is possible to accurately correct a resist difference among individual image forming stations and form a high-quality color image without any color displacement.

14 Claims, 34 Drawing Sheets

U.S. PATENT DOCUMENTS

| | | | | |
|---|---|---|---|---|
| 6,005,703 | A | * 12/1999 | Maddox et al. | 359/206 |
| 6,014,205 | A | * 1/2000 | Kanazawa et al. | 356/73 |
| 6,101,033 | A | * 8/2000 | Kuno et al. | 359/557 |
| 6,236,040 | B1 | 5/2001 | Takemura et al. | |
| 6,243,126 | B1 | 6/2001 | Ueno | |
| 6,573,921 | B2 | 6/2003 | Hayashi | 347/131 |
| 6,636,664 | B2 | * 10/2003 | Snyder et al. | 385/36 |
| 6,844,892 | B2 | * 1/2005 | Iima et al. | 347/243 |
| 2004/0036936 | A1 | 2/2004 | Nakajima et al. | |

FOREIGN PATENT DOCUMENTS

| | | | |
|---|---|---|---|
| JP | 62-267774 | | 11/1987 |
| JP | 01-239520 | | 9/1989 |
| JP | 03-140916 | | 6/1991 |
| JP | 04-328779 | | 11/1992 |
| JP | 5-2142 | | 1/1993 |
| JP | 07-239598 | | 9/1995 |
| JP | 8-14731 | | 1/1996 |
| JP | 08201711 | A * | 8/1996 |
| JP | 8-313941 | | 11/1996 |
| JP | 9-15472 | | 1/1997 |
| JP | 09-159948 | | 6/1997 |
| JP | 09197310 | A * | 7/1997 |
| JP | 2672313 | | 11/1997 |
| JP | 10-197810 | | 7/1998 |
| JP | 10-239939 | | 9/1998 |
| JP | 10-260368 | | 9/1998 |
| JP | 10-268217 | | 10/1998 |
| JP | 11-64758 | | 3/1999 |
| JP | 11-64769 | | 3/1999 |
| JP | 11-129530 | | 5/1999 |
| JP | 11-153765 | | 6/1999 |
| JP | 11-301032 | | 11/1999 |
| JP | 2000-180756 | | 6/2000 |
| JP | 3049606 | | 6/2000 |
| JP | 3078830 | | 8/2000 |
| JP | 2000-314843 | | 11/2000 |
| JP | 2000-318211 | | 11/2000 |
| JP | 2001-042239 | | 2/2001 |
| JP | 2001-074421 | | 3/2001 |
| JP | 2001-100127 | | 4/2001 |
| JP | 2001-133718 | | 5/2001 |
| JP | 2001-253115 | | 9/2001 |
| JP | 2001-356314 | | 12/2001 |
| JP | 2002-174785 | | 6/2002 |
| JP | 2002-228959 | | 8/2002 |
| JP | 04-245263 | | 9/2002 |

OTHER PUBLICATIONS

U.S. Appl. No. 10/941,849, filed Sep. 16, 2004, Nakajima.
U.S. Appl. No. 10/942,825, filed Sep. 17, 2004, Hayashi.
U.S. Appl. No. 10/927,226, filed Aug. 27, 2004, Izumi et al.
U.S. Appl. No. 10/609,577, filed Jul. 1, 2003, Nakajima et al.
U.S. Appl. No. 10/892,191, filed Jul. 16, 2004, Suzuki et al.
U.S. Appl. No. 10/878,365, filed Jun. 29, 2004, Nakajima.
U.S. Appl. No. 10/866,043, filed Jun. 14, 2004, Hayashi et al.
U.S. Appl. No. 10/852,183, filed May 25, 2004, Miyatake et al.
U.S. Appl. No. 10/840,369, filed May 7, 2004, Itabashi et al.
U.S. Appl. No. 10/803,991, filed Mar. 19, 2004, Nakajima et al.
U.S. Appl. No. 10/788,032, filed Feb. 17, 2004, Suzuki et al.
U.S. Appl. No. 10/743,808, filed Dec. 24, 2003, Suzuki.
U.S. Appl. No. 10/735,690, filed Dec. 16, 2003, Suhara.
U.S. Appl. No. 10/665,287, filed Sep. 22, 2003, Kubo.
U.S. Appl. No. 10/717,090, filed Nov. 28, 2003, Kodama et al.
U.S. Appl. No. 10/127,768, filed Apr. 23, 2002, Nakajima.
U.S. Appl. No. 09/949,651, filed Sep. 12, 2001, Kojima et al.
U.S. Appl. No. 09/946,665, filed Sep. 6, 2001, Hayashi.
U.S. Appl. No. 09/984,236, filed Oct. 29, 2001, Masuda et al.
U.S. Appl. No. 09/982,831, filed Oct. 22, 2001, Hayashi et al.
U.S. Appl. No. 10/028,698, filed Dec. 28, 2001, Hayashi.
U.S. Appl. No. 10/047,698, filed Jan. 18, 2002, Suzuki.
U.S. Appl. No. 10/084,485, filed Feb. 28, 2002, Nakajima.
U.S. Appl. No. 10/085,707, filed Mar. 1, 2002, Hayashi et al.
U.S. Appl. No. 10/090,824, filed Mar. 6, 2002, Amada et al.
U.S. Appl. No. 10/161,659, filed Jun. 5, 2002, Suzuki et al.
U.S. Appl. No. 10/161,756, filed Jun. 5, 2002, Atsuumi et al.
U.S. Appl. No. 10/207,241, filed Jul. 30, 2002, Suzuki et al.
U.S. Appl. No. 10/200,778, filed Jul. 24, 2002, Amada et al.
U.S. Appl. No. 10/223,294, filed Aug. 20, 2002, Satoh et al.
U.S. Appl. No. 10/242,710, filed Sep. 13, 2002, Hayashi et al.
U.S. Appl. No. 10/247,702, filed Sep. 20, 2002, Hayashi et al.
U.S. Appl. No. 10/259,769, filed Sep. 30, 2002, Omori et al.
U.S. Appl. No. 10/268,830, filed Oct. 11, 2002, Nakazato et al.
U.S. Appl. No. 10/278,916, filed Oct. 24, 2002, Suzuki et al.
U.S. Appl. No. 10/278,878, filed Oct. 24, 2002, Suzuki et al.
U.S. Appl. No. 10/319,624, filed Dec. 16, 2002, Ono et al.
U.S. Appl. No. 10/323,837, filed Dec. 20, 2002, Suzuki et al.
U.S. Appl. No. 10/981,677, filed Nov. 5, 2004, Miyatake, et al.
U.S. Appl. No. 11/282,655, filed Nov. 21, 2005, Saitoh.
U.S. Appl. No. 12/020,292, filed Jan. 25, 2008, Miyatake, et al.
U.S. Appl. No. 12/024,505, filed Feb. 1, 2008, Watanabe, et al.
U.S. Appl. No. 12/028,446, filed Feb. 8, 2008, Nakamura, et al.
U.S. Appl. No. 12/051,404, filed Mar. 19, 2008, Amada, et al.
U.S. Appl. No. 11/609,098, filed Dec. 11, 2006, Nakajima.
U.S. Appl. No. 11/765,166, filed Jun. 19, 2007, Nakajima.

* cited by examiner

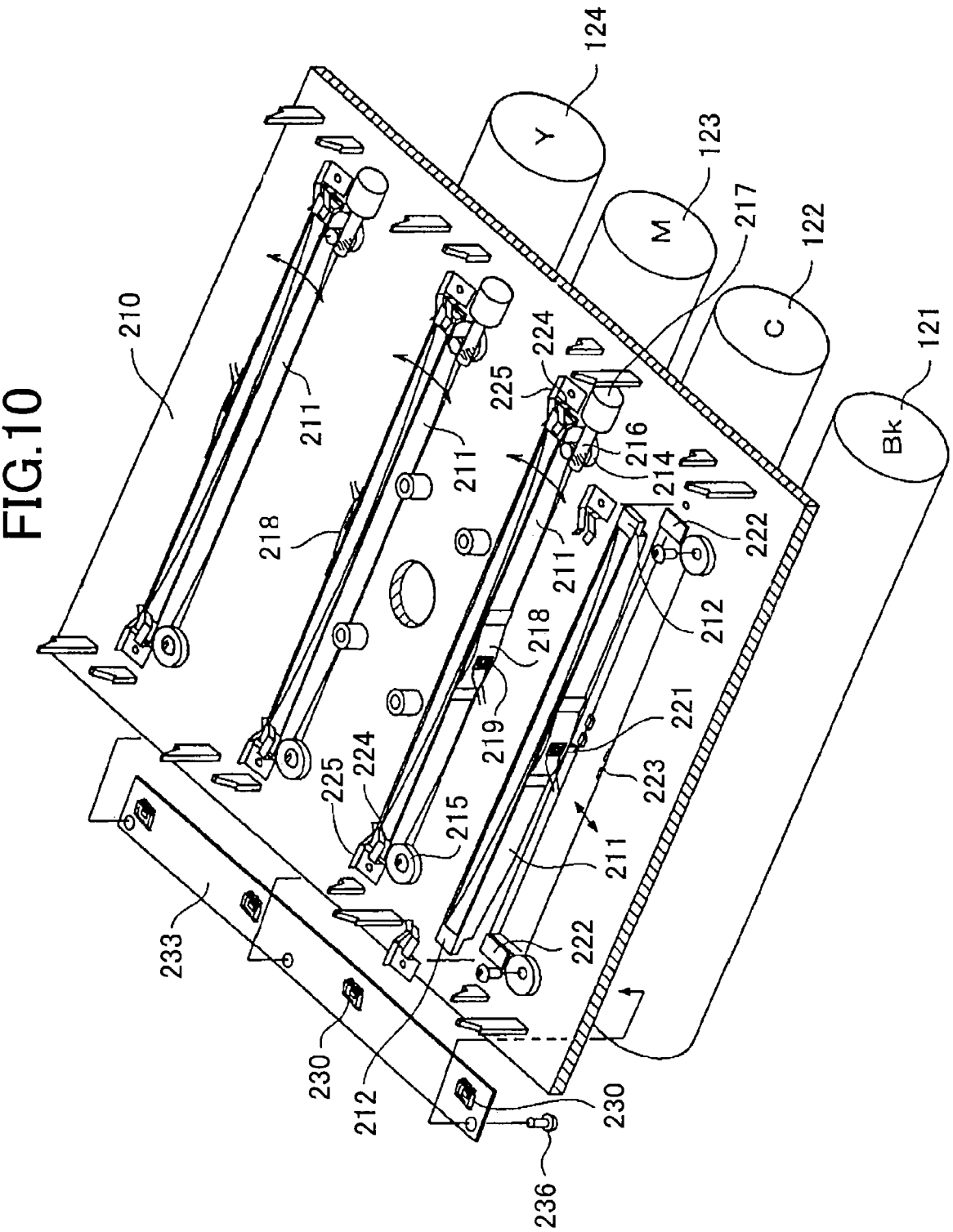

SCANNING DIRECTION

SCANNING DIRECTION

570

(TEMPERATURE CHANGE IN OPTICAL SCANNER AT SUCCESSIVE PRINTING)

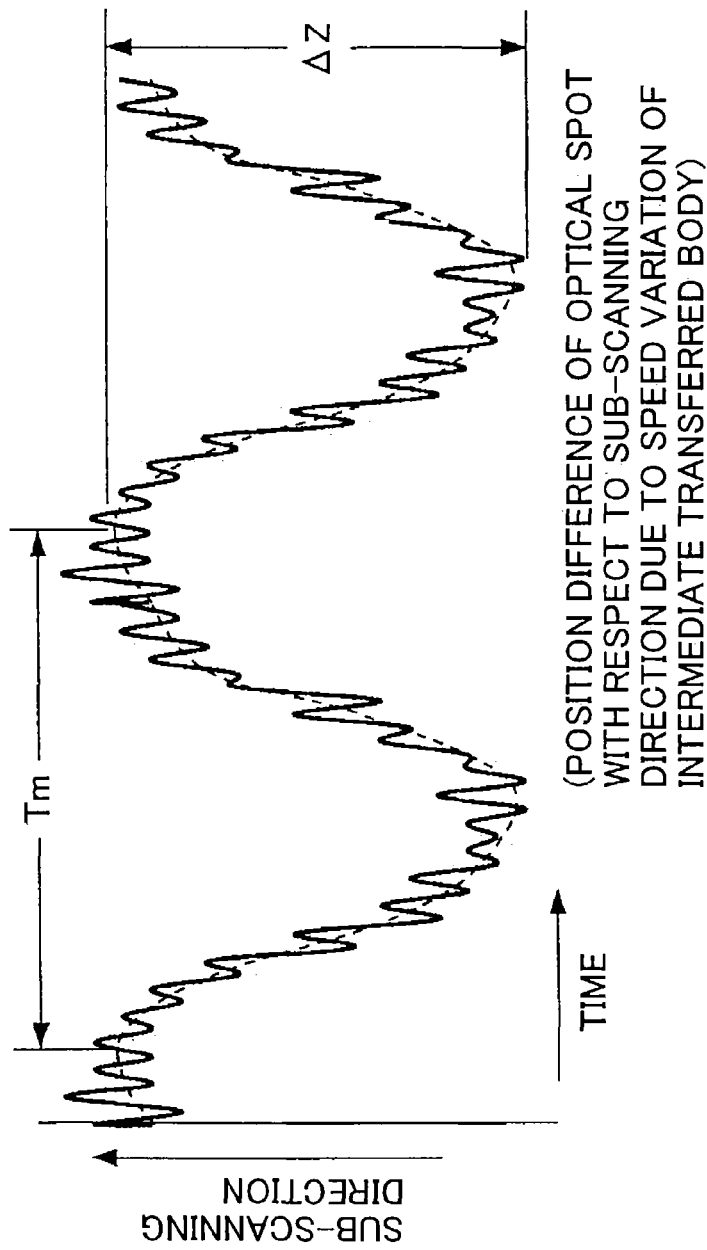
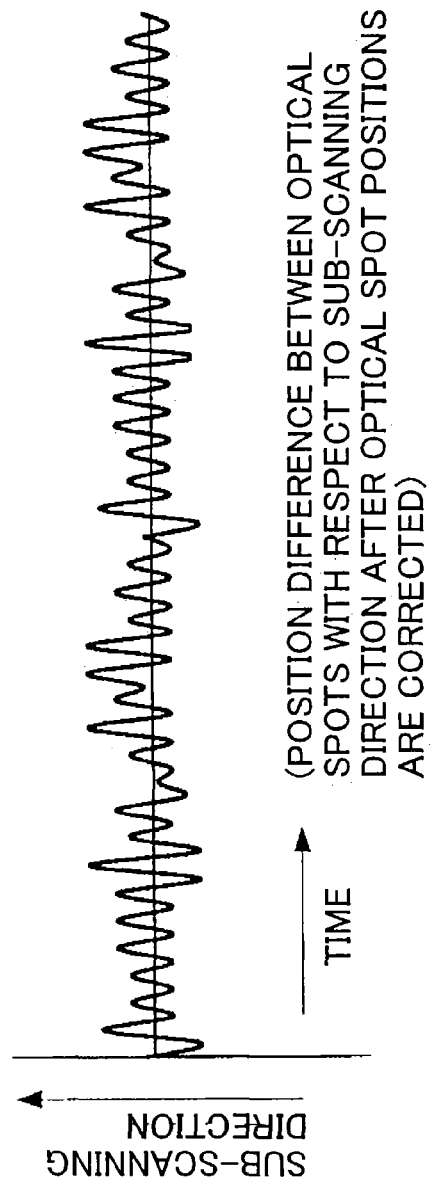
FIG.36A (POSITION DIFFERENCE OF OPTICAL SPOT WITH RESPECT TO SUB-SCANNING DIRECTION DUE TO SPEED VARIATION OF INTERMEDIATE TRANSFERRED BODY)
FIG.36B (POSITION DIFFERENCE BETWEEN OPTICAL SPOTS WITH RESPECT TO SUB-SCANNING DIRECTION AFTER OPTICAL SPOT POSITIONS ARE CORRECTED)

(RELATION BETWEEN DRIVE FREQUENCY OF STEPPING MOTOR AND TORQUE)

OPTICAL SCANNER AND IMAGE FORMING APPARATUS

BACKGROUND OF THE INVENTION

1. Field of the Invention

The present invention generally relates to an optical scanner and an image forming apparatus, and more particularly to an optical scanner that can be preferably used as a writing system for a digital copier, a laser printer, a laser plotter and a facsimile, and an image forming apparatus that can be preferably used as a multi-color image forming apparatus for forming a color image by superposing color toner images.

2. Description of the Related Art

In an image forming apparatus for forming an image in accordance with Carlson process, a latent image forming process, a developing process and a transferring process are conducted in response to rotation of a photoconductor drum. If the photoconductor drum has an eccentric rotational axis or a drive motor for rotating the photoconductor drum has speed variations, the latent image forming process through the transferring process cannot be completed at a uniform time. As a result, a pitch irregularity, that is, an irregularity of intervals (scanning pitches) between individual optically-written line images, arises in the sub-scanning direction of a transferred image, resulting in a density irregularity.

In a tandem type color image forming apparatus, a plurality of photoconductor drums are arranged along the shift direction of a transferred member. The tandem type color image forming apparatus forms a multi-color image or a full-color image by transferring and superposing different color images formed on the photoconductor drums on the transferred member sequentially. If the pitch irregularity is caused in the tandem type color image forming apparatus, there is a risk that the individual superposed toner color images may be misaligned to each other. In this case, a color displacement or a color change is generated in the formed multi-color image or the formed full-color image, resulting in degradation of image quality.

In addition, a pitch irregularity arises in the transferring part because of variations of shift speeds of a transfer belt as a transferred member and a carrier belt to carry transferred paper. As a result, the density irregularity, the color displacement and the color change are caused. This pitch irregularity is caused by eccentricity and rotational speed variations of drive motors for rotating the transfer belt and the carrier belt.

In order to overcome problems such as the density irregularity, the color displacement and the color change, therefore, it is necessary to eliminate rotational speed variations of a drive motor for driving a photoconductor drum and overcome eccentricity and rotational speed variations of a drive motor for driving the transfer belt or the carrier belt. However, it is impossible to totally eliminate criteria of stable machining and load changes of transmission systems. As a result, it is impossible to totally eliminate the above-mentioned eccentricity and the rotational speed variations.

In the tandem type color image forming apparatus, if optical scanners fail to uniformly align resist positions of individual color latent images on the corresponding photbconductor drums with high accuracy, there is a risk that the produced color image may include color displacement and color change. Additionally, when the optical scanners write latent images by individual scanning lines, there is another risk that the scanning lines may have different slopes from each other. Furthermore, if the scanning lines are curved in degrees different from each other, the color displacement and the color change appears similarly.

Japanese Laid-Open Patent Application No. 08-014731 discloses a method for eliminating influences due to a rotational irregularity of a photoconductor drum. In this disclosed method, a time period from latent image forming process to the transferring process is set as an integral multiple of the period of the rotational irregularity. As a result, since the phase of a periodically varying position difference at time of the latent image formation coincides with the phase of a periodically varying position difference at time of the transfer, it is possible to cancel the influences.

Japanese Laid-Open Patent Application No. 10-197810 discloses a method for dynamically controlling an optical scanner. In this disclosed method, periodical emergence of the pitch irregularity is focused. When the pitch irregularity is detected, a correction mirror is shifted corresponding to rotation of a photoconductor drum.

The pitch irregularity appears in an image as syntheses of low frequency factors and high frequency factors wherein the low frequency factors result from rotational irregularities of drive motors for a photoconductor drum, a transfer belt and a carrier belt and, on the other hand, the high frequency factors result from engagement of gears of transmission systems. As an image is required to have higher image quality, more accurate gears are used for the transmission systems and there is a stronger tendency that the photoconductor drum and the transfer belt are directly driven by the drive motors so that malfunctions between the transmission systems cannot affect image degradation. Also, by increasing the inertial force by means of a flywheel, the high frequency factors can be reduced.

However, it is impossible to prevent the influences exerted by the low frequency factors due to the load variations and others that are involved in the eccentricity and assembly differences in association with fabrication precision of parts thereof. Therefore, it is more important to suppress the low frequency factors.

Especially in the tandem type color image forming apparatus, the pitch irregularity period with respect to the sub-scanning direction, which results from variations of transferring timings of toner images, has a different phase or a different amplitude for each image. According to the above-mentioned methods, therefore, it is impossible to arrange dot positions of the individual images with high accuracy.

In order to adapt resist positions of individual latent images, a difference between the resist positions is detected through images recorded on a transferred member. Additionally, the resist positions with respect to the sub-scanning direction are aligned by adjusting writing timings.

On the other hand, there are some correction methods for correcting the curvature and gradient of a scanning line. Japanese Patent No. 3049606 discloses a correction method for correcting the curvature and gradient of a scanning line by curving a reflection mirror disposed in an optical path and inclining the reflection mirror of a surface parallel to a transfer surface. Japanese Laid-Open Patent Application No. 11-064758 discloses a correction method by changing heights of the optical axes of a part of lenses constituting an image forming optical system. Japanese Laid-Open Patent Application No. 10-268217 discloses a correction method by forcing the body of a lens to be curved. Japanese Laid-Open Patent Application No. 11-153765 discloses a correction method for rotating a part of lenses constituting an image forming optical system in the directions of the optical axes of the lenses.

In recent years, a resin-molded lens has been used as an image forming part of an optical scanner. Such a lens has some advantages in that, for example, a resin-molded lens can be shaped to have complicated surface shape at a reasonable cost. In contrast, the lens has disadvantages in that even if the curvature and gradient of a scanning line is initially adjusted, harmful curvature and gradient may arise because of deformation of the lens body due to temperature variations of the environment.

In particular, when a resin-molded lens is disposed away from a deflecting part, the stiffness of the resin-molded lens tends to be small because the lens is longer with respect to the main scanning direction. As conventional methods, if one surface of the lens with respect to the sub-scanning direction is in contact with something to maintain the orientation thereof, there is a risk that the lens body may be deformed because the lens is retained in a condition where stress such as a warp and a torsion is imposed on the lens.

If the curvature of a scanning line is attempted to be corrected by forcibly curving a resin-molded lens in accordance to Japanese Laid-Open Patent Application No. 10-268217, there is a risk that the surface shape of the lens is deformed by stress concentration. If an optical beam is deflected toward the refractive index of interior of a lens whose distribution is centered at the optical axis thereof with respect to the sub-scanning direction in accordance with Japanese Laid-Open Patent Application No. 11-064758, there is a risk that the diameter of a beam spot is not uniform on a photoconductor drum.

Additionally, a base member for retaining a resin-molded lens has thermal conductivity different from the outer atmosphere, resulting in a temperature difference between the lens surface in contact with the base member and the opposite lens surface exposed to the outer atmosphere. As a result, there is a problem that the lens body is deformed and curved over time.

In addition, a resist difference is conventionally detected based on a resist difference detection pattern recorded on a transferred body and is adjusted with respect to the sub-scanning direction by changing the writing timing as disclosed in Japanese Patents No. 3049606 and No. 3078830.

Japanese Laid-Open Patent Application No. 11-064769 discloses a method of correcting a scanning position by using a galvanometer mirror, which is disposed between an illuminant and an image forming optical system, to incline the optical axis of an optical beam in the sub-scanning direction.

Japanese Patent No. 2672313 discloses a method of correcting a scanning position by parallel-shifting a folding mirror.

When a multi-color image forming apparatus, in which a plurality of image forming stations are disposed along the carrying direction of a transferred member, forms a color image by superposing individual simple color images, color displacement or color change appears in the formed color image if resist positions, where individual latent images formed by the image forming stations are transferred, do not accurately coincide with each other.

However, even if an optical scanner is initially adjusted to correct a difference between scanning positions, which can cause a difference between resist positions, between individual image forming stations, there is a risk that temperature variations may deform the housing of the optical scanner and cause variations of the refractive index of a scanning lens. Therefore, it is impossible to avoid variations of resist positions over time.

For this reason, although the above-mentioned difference between resist positions is periodically detected and corrected, it is impossible to align the resist positions at the writing head of an image uniformly. As a result, for example, if the transferred member does not move at a constant speed, a more significant color displacement and color change can appear at the writing end of the image.

A difference between resist positions is conventionally corrected by adjusting the writing timings of the individual image forming stations. A synchronizing detection signal of each surface of a polygon mirror is used as triggers to determine the writing timings. For this reason, the writing timings cannot be adjusted for less than the sub-scanning pitch, which corresponds to the recording density. As a result, there is a risk that a difference between the resist positions, whose maximum size is a half of the sub-scanning pitch, may appear on an image.

Additionally, if there is a speed difference between the transferring position and the detecting position due to speed variations of the transferred body, there is a risk that a detected resist difference may contain an error. Furthermore, if the synchronizing detection sensor is not accurately positioned due to thermal expansion of the housing, the synchronizing detection signal is generated at various timings. The detected resist difference and the synchronizing detection signal is used as references of the feedback control of the optical scanner. Thus, it is impossible to align the resist positions uniformly based on such inaccurate references even if the adjusting process is properly operated.

In addition, a recent increase in the operational speed of color image forming apparatuses has realized practical use of color digital copiers, color laser printers and so on. In a four-drum tandem type color image forming apparatus, for example, four photoconductor drums are arranged in the carrying direction of record papers. A plurality of optical scanning systems corresponding to the individual photoconductor drums simultaneously expose the photoconductor drums so as to form latent images. These latent images are made visible by using different color developers such as yellow, magenta, cyan and black. Then, these developed simple color images are sequentially superposed and transferred onto a same record paper so as to form a full-color image.

Alternatively, a one-drum type image forming apparatus has only one photoconductor drum. In such a one-drum type image forming apparatus, the photoconductor drum is rotated as many times as the number of prepared colors. For each rotation, a latent image forming process (exposing process), a developing process and a transferring process are performed for the photoconductor drum, and then the resulting visible simple color images are superposed and transferred onto a same record paper so as to form a full-color image. As another embodiment of the one-drum type color image forming apparatus, after the visible simple color images are formed, the visible simple color images may be temporarily superposed onto an intermediate transferred member and then transferred onto the record paper.

The four-drum tandem type color image forming apparatus has an advantage compared to the one-drum type color image forming apparatus in that the four-drum tandem type color image forming apparatus can produce a color image and a monochrome image at a same speed. Thus, the four-drum tandem type color image forming apparatus is more suitable to high speed printing. In contrast, since the four-drum tandem type color image forming apparatus contains four optical scanning systems to expose four photoconductor drums, the four-drum tandem type color image forming apparatus tends to have a greater size and it is necessary to reduce the size thereof. Additionally, the four-drum tandem type color image forming apparatus has another problem in that color displacement may occur when individual color toner images corresponding to the four photoconductor drums are superposed and transferred onto a record paper.

In particular, the color displacement can be caused with respect to the sub-scanning direction by the following factors.

A speed variation of a photoconductor with respect to the circumferential direction (sub-scanning direction).

A speed variation of an intermediate transferred member with respect to the circumferential direction (sub-scanning direction).

A position difference between photoconductors.

A position difference of optical spots between optical scanning systems.

If a plurality of optical beams are simultaneously used to write latent images on individual photoconductor drums, there is a risk that misalignment with respect to the sub-scanning direction may be caused corresponding to the number of prepared optical beams because a polygon scanner is not rotated synchronously with the photoconductor drums in general.

The following conventional methods for suppressing such color displacement are presented.

Japanese Laid-Open Patent Application No. 2001-133718 discloses an invention that can make scanning lines on individual photoconductor drums coincide with each other by adjusting positions of the individual scanning means or the housings thereof relative to the photoconductor drums. According to this invention, however, the adjustment mechanism becomes complicated and it takes a large amount of adjustment time. In addition, since the heavy housings are adjusted, it is difficult to correspond to changes over time due to temperature variations. Also, it is difficult to accurately correct color displacement during printing operation or color displacement due to variations of the environment.

Japanese Laid-Open Patent Application No. 2001-100127 discloses a method for controlling the position of an optical beam with respect to the sub-scanning direction by using a galvanometer mirror. According to this disclosed method, however, since the galvanometer mirror is too sensitive for the purpose of controlling the optical beam position of with respect to the sub-scanning direction, the galvanometer mirror is highly influenced by external vibrations. In order to obtain a better beam spot diameter, it is necessary to satisfy high surface accuracy (about four times of a transmission surface).

Japanese Laid-Open Patent Application No. 10-239939 discloses a color image forming apparatus that includes color displacement correction means. In this color image forming apparatus, an optical beam for first writing an image on a photoconductor is selected among a plurality of optical beams based on a phase relation between a reference intermediate transferring signal and a line synchronizing signal so as to adjust starting positions for writing individual color images with respect to the sub-scanning direction. According to this color image forming apparatus, however, it is difficult to correct color displacement smaller than one line. For instance, if individual simple color images are written at 600 dpi (dots per inch) there is a risk that a full-color image generated from the individual color images may have color displacement of at least more than 42 μm.

SUMMARY OF THE INVENTION

It is a general object of the present invention to provide an optical scanner and an image forming apparatus in which the above-mentioned problems are eliminated.

A first specific object of the present invention is to provide an optical scanner and an image forming apparatus that can realize a satisfactory color image without any color displacement and color change by effectively correcting and lowering a pitch irregularity due to the low frequency factors, more specifically, by effectively correcting periodic pitch irregularities caused in individual color image forming stations and effectively lowering harmful the curvature and gradient of a scanning line generated by a resin-molded lens serving as an image forming system.

A second more specific object of the present invention is to provide an optical scanner and an image forming apparatus that can correct a difference between resist positions of individual image forming stations with high accuracy and form a satisfactory color image without any color displacement and color change due to variations over time, especially, temperature variations over time.

A third more specific object of the present invention is to provide an optical scanner and an image forming apparatus that can effectively correct color displacement among individual colors and form a satisfactory color image even if scanning positions are misaligned with respect to the sub-scanning direction due to rapid temperature variations and others.

A fourth more specific object of the present invention is to provide an optical scanner and an image forming apparatus that can effectively correct and reduce a pitch irregularity due to the above-mentioned low frequency factors and can form a satisfactory color image without any color displacement and color change by effectively correcting a periodic pitch irregularity generated by individual image forming stations and effectively reducing the curvature and gradient of a scanning line generated by a resin-molded lens serving as an image forming system.

In order to achieve the above-mentioned objects, there is provided according to one aspect of the present invention an optical scanner for scanning an image carrier, including: an illuminant part emitting an optical beam; a deflecting part deflecting the optical beam; an image forming part focusing the deflected optical beam on the image carrier; and an optical axis adjusting part being provided between the illuminant part and the deflecting part, the optical axis adjusting part adjusting a beam spot position of the optical beam on the image carrier with respect to a sub-scanning direction.

In the above-mentioned optical scanner, the optical axis adjusting part may include a movable mirror.

In the above-mentioned optical scanner, the movable mirror may have at least one vibration mode in which the movable mirror vibrates with respect to the sub-scanning direction.

In the above-mentioned optical scanner, the optical axis adjusting part may slightly vibrate the beam spot position of the optical beam on the image carrier with respect to the sub-scanning direction slowly relative to a period of optical scanning.

In the above-mentioned optical scanner, the optical axis adjusting part may include a phase adjusting part adjusting a phase of vibration.

In the-above-mentioned optical scanner, the optical axis adjusting part may include an amplitude adjusting part adjusting an amplitude of vibration.

Additionally, there is provided according to another aspect of the present invention an image forming apparatus, including: a plurality of image carriers; an optical scanner forming latent images on the plurality of image carriers, including: an illuminant part including a plurality of illuminants, the plurality of illuminants emitting optical beams; a deflecting part deflecting the optical beams; an image forming part focusing the deflected optical beams on the plurality of image carriers; and an optical axis adjusting part being provided between the illuminant part and the deflecting part, the optical axis adjusting part adjusting beam spot positions of the optical beams on the plurality of image carriers with respect to a sub-scanning direction; a developing part developing the latent images so as to form visible images; and a transferred member onto which the visible images are transferred from the plurality of image carriers, wherein the optical axis adjusting part includes a movable mirror and slightly vibrates the beam spot positions of the optical beams on the image. carriers with respect to the sub-scanning direction slowly relative to a period of optical scanning.

In the above-mentioned image forming apparatus, the optical axis adjusting part may slightly adjust rotational time of the image carriers from writing positions onto the image carriers to a transferring position onto the transferred member while the latent images are formed on the plurality of image carriers.

In the above-mentioned image forming apparatus, the illuminant part may include a selecting part selecting one of the plurality of illuminants for an optical beam that optically scans a head line with respect to the sub-scanning direction from which the latent images are formed corresponding to the rotational time of the image carriers from the writing positions onto the image carriers to the transferring position onto the transferred member.

According to the above-mentioned inventions, it is possible to effectively correct periodic variations of a pitch of scanning lines due to low-frequency factors, a difference between resist positions for forming a color image,. and the slope and curvature of a scanning line. In this fashion, since the optical scanner can properly write an image on an image carrier, the image forming apparatus is capable of form a high-quality color image by effectively suppressing density unevenness due to the pitch irregularity of scanning lines and reducing color displacement and color change.

Furthermore, in the above-mentioned optical scanner, the optical axis adjusting part may include a wedge-shaped prism.

In the above-mentioned optical scanner, the optical axis adjusting part may adjust the beam spot position of the optical beam with respect to the sub-scanning direction by rotating the wedge-shaped prism approximately on an optical axis.

In the above-mentioned optical scanner, the optical axis adjusting part may adjust the beam spot position of the optical beam during writing of an image.

Additionally, there is provided according to another aspect of the present invention an image forming apparatus, including: a plurality of image carriers; an optical scanner forming latent images on the plurality of image carriers, said optical scanner including: an illuminant part including a plurality of illuminants, the plurality of illuminants emitting optical beams; a deflecting part deflecting the optical beams; an image forming part focusing the deflected optical beams on the plurality of image carriers; and an optical axis adjusting part being provided between the illuminant part and the deflecting part, the optical axis adjusting part adjusting beam spot positions of the optical beams on the plurality of image carriers with respect to a sub-scanning direction; a developing part developing the latent images so as to form visible images; and a transferred member onto which the visible images are transferred from the plurality of image carriers, wherein the optical axis adjusting part comprises a wedge-shaped prism and adjusts the beam spot positions of the optical beams with respect to the sub-scanning direction by rotating the wedge-shaped prism approximately on an optical axis.

The above-mentioned image forming apparatus may further include a position difference detecting part detecting a difference between the beam spot positions of the optical beams on the plurality of image carriers with respect to the sub-scanning direction.

In the above-mentioned image forming apparatus, the optical axis adjusting part may adjust the beam spot positions of the optical beam with respect to the sub-scanning direction based on the difference detected by the position difference detecting part during writing of an image.

According to the above-mentioned inventions, since the wedge-shaped prism can be driven under simple mechanism and means, it is possible to correct misalignment of a scanning position and realize a highly accurate scanning position.

Additionally, according to the above-mentioned inventions, even if the position of an optical spot is drastically varied, it is possible to correct the position of the optical spot.

Furthermore, there is provided according to another aspect of the present invention an optical scanner for scanning an image carrier, including: an illuminant part emitting an optical beam; a deflecting part deflecting the optical beam; an image forming part focusing the deflected optical beam on the image carrier; and an optical axis adjusting part being provided between the illuminant part and the deflecting part, the optical axis adjusting part adjusting a writing start position of the optical beam on the image carrier with respect to a sub-scanning direction.

In the above-mentioned optical scanner, the optical axis adjusting part may include a movable mirror.

The above-mentioned optical scanner may further include an optical beam detecting part detecting a position of the optical beam with respect to a main scanning direction.

The above-mentioned optical scanner may further include a housing integrally accommodating the illuminant part, the deflecting part, the image forming part, and the optical beam detecting part.

In the above-mentioned optical scanner, the optical beam detecting part may be disposed at a position in the housing toward a main scanning end from a position detected by the optical beam detecting part and the detected position may be allowed to conduct free expansion relative to the position of the optical beam detecting part.

Additionally, there is provided according to another aspect of the present invention an image forming apparatus, including: a plurality of image carriers; an optical scanner forming latent images on the plurality of image carriers, the optical scanner including: an illuminant part including a plurality of illuminants, the plurality of illuminants emitting optical beams; a deflecting part deflecting the optical beams; an image forming part focusing the deflected optical beams on the plurality of image carriers; and an optical axis adjusting part being provided between the illuminant part and the deflecting part, the optical axis adjusting, part adjusting writing start positions of the optical beams on the plurality of image carriers with respect to a sub-scanning direction; a developing part developing the latent images so as to form visible images; and a transferred member onto which the visible images are transferred from the plurality of image carriers, wherein the optical axis adjusting part comprises a movable mirror and adjusts the writing start positions of the optical beams on the plurality of image carriers with respect to the sub-scanning direction.

The above-mentioned image forming apparatus may further include a resist position difference detecting part detecting a difference between the writing start positions of the optical beams on the plurality of image carriers with respect to the sub-scanning direction.

In the above-mentioned image forming apparatus, the optical axis adjusting part may be controlled through feedback based on the difference between the writing start positions detected by the resist position difference detecting part so as to adjust the writing start positions of the optical beams.

In the above-mentioned image forming apparatus, a distance between each of transferring positions of the latent images onto the transferred member and a detecting position of the resist position difference detecting part may be set as an approximately integer multiple of a circumferential length of a driving roller for driving the transferred member.

According to the above-mentioned inventions, although a conventional image forming apparatus align resist positions of individual image forming stations per one line corresponding to the recording density, the image forming apparatus according to the present invention is capable to aligning the resist positions with higher accuracy. As a result, it is possible to form a high-quality color image without any color displacement and color change.

Additionally, according to the above-mentioned inventions, even if the transfer belt moves at variable speeds, it is possible to make the circumferential speed of the transfer belt at a transferring position equal to the circumferential speed at a detecting position. As a result, it is possible to detect a difference between resist positions at the transferring position with high accuracy. Through the detection improvement, the image forming apparatus is capable of forming a high-quality color image.

Additionally, according to the above-mentioned inventions, even if the temperature is varied, a synchronization detecting position is stably maintained. As a result, it is possible to effectively control the phases of writing timings between individual image forming stations and form a high-quality color image without any color displacement and color change.

In the above-mentioned optical scanner, the optical axis adjusting part may include a wedge-shaped prism.

In the above-mentioned optical scanner, the optical axis adjusting part may adjust the writing start position of the optical beam with respect to the sub-scanning direction by rotating the wedge-shaped prism approximately on an optical axis.

Additionally, there is provided according to another aspect of the present invention an image forming apparatus, including: a plurality of image carriers; an optical scanner forming latent images on the plurality of image carriers, the optical scanner including: an illuminant part including a plurality of illuminants, the plurality of illuminants emitting optical beams; a deflecting part deflecting the optical beams; an image forming part focusing the deflected optical beams on the plurality of image carriers; and an optical axis adjusting part being provided between the illuminant part and the deflecting part, the optical axis adjusting part adjusting writing start positions of the optical beams on the plurality of image carriers with respect to a sub-scanning direction; a developing part developing the latent images so as to form visible images; and a transferred member onto which the visible images are transferred from the plurality of image carriers, wherein the optical axis adjusting part comprises a wedge-shaped prism and adjusts the writing start positions of the optical beams with respect to the sub-scanning direction by rotating the wedge-shaped prism approximately on an optical axis.

The above-mentioned image forming apparatus may further include a resist position difference detecting part detecting a difference between the writing start positions of the optical beams on the plurality of image carriers with respect to the sub-scanning direction.

In the above-mentioned image forming apparatus, the optical axis adjusting part may be controlled through feedback based on the difference between the writing start positions detected by the resist position difference detecting part so as to adjust the writing start positions of the optical beams.

In the above-mentioned image forming apparatus, the plurality of image carriers may include just four image carriers corresponding to four colors: black, yellow, magenta and cyan, that are arranged in a tandem fashion, one of the four colors may be predetermined as a reference color, and the optical axis adjusting part may have three wedge shaped prisms for adjusting writing start positions of optical beams for scanning three image carriers other than the reference color such that the writing start positions coincide with a writing start position of an optical beam for scanning an image carrier for the reference color.

According to the above-mentioned inventions, even if a scanning position is misaligned with respect to the sub-scanning direction due to drastic temperature variations and others, it is possible to effectively correct a color difference between individual colors and form a proper color image.

Additionally, according to the above-mentioned inventions, even if a scanning position is greatly misaligned to the scanning position of a reference color, it is possible to easily correct a color difference thereof because the number of adjusting portions and an adjusted amount are reduced.

Additionally, according to the above-mentioned inventions, even if the writing start position on an image carrier is misaligned over time, it is possible to correct the misalignment of the writing start position with respect to the sub-scanning direction.

Other objects, features and advantages of the present invention will become more apparent from the following detailed description when read in conjunction with the accompanying drawings.

BRIEF DESCRIPTION OF THE DRAWINGS

FIG. 10 is a diagram for explaining slope of a scanning line;

FIG. 36A is a diagram for explaining position differences of an optical spots with respect to the sub-scanning direction due to a speed variation of an intermediate transferred body;

FIG. 36B is a diagram for explaining positions differences of an optical spot with respect to the sub-scanning direction after the position of the optical spot is corrected.

DETAILED DESCRIPTION OF THE PREFERRED EMBODIMENTS

In the following, embodiments of the present invention will be described with reference to the accompanying drawings.

Figure 1:
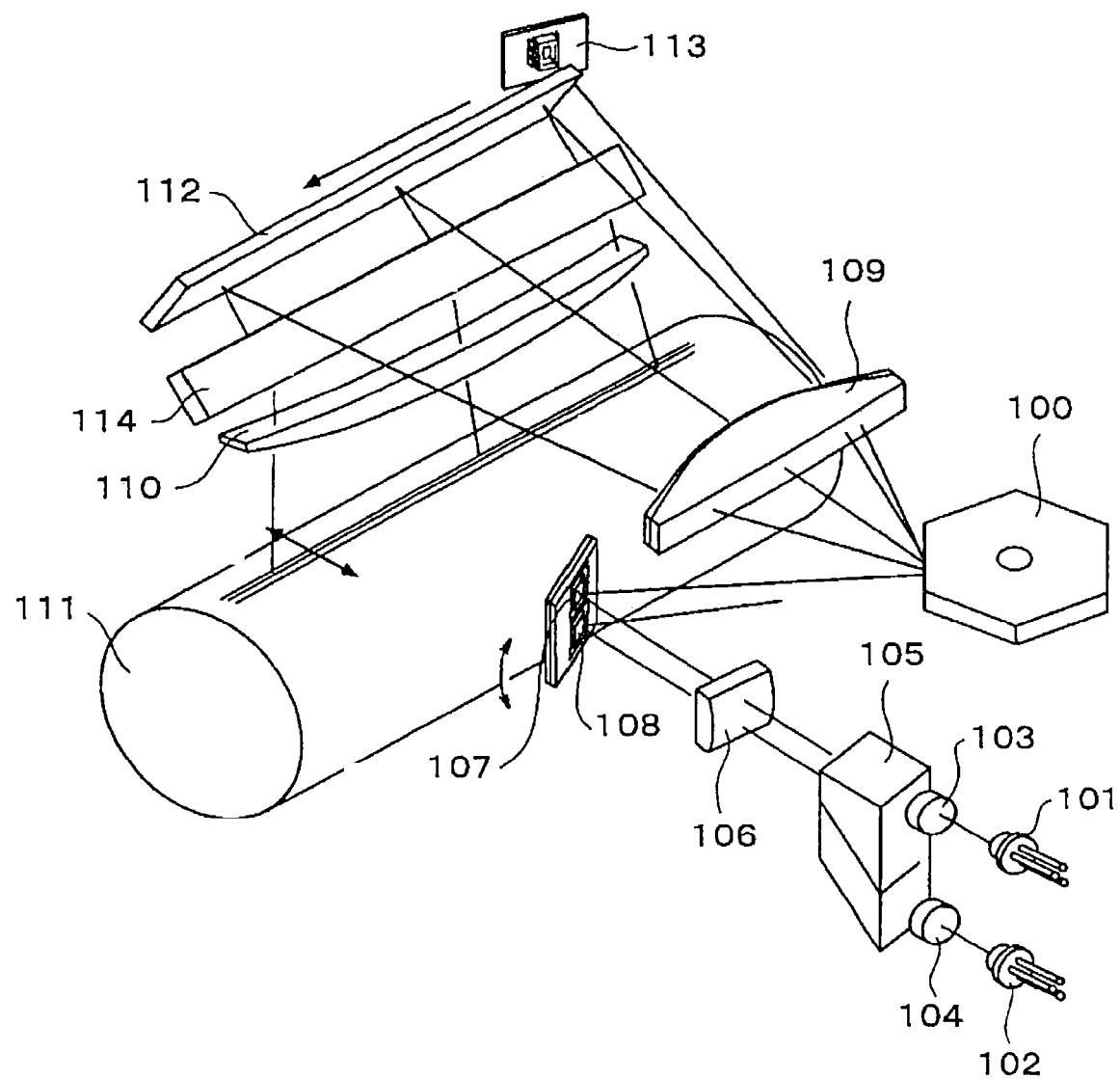
FIG. 1 is a diagram illustrating an exemplary optical scanner according to the present invention.
Figure 2:
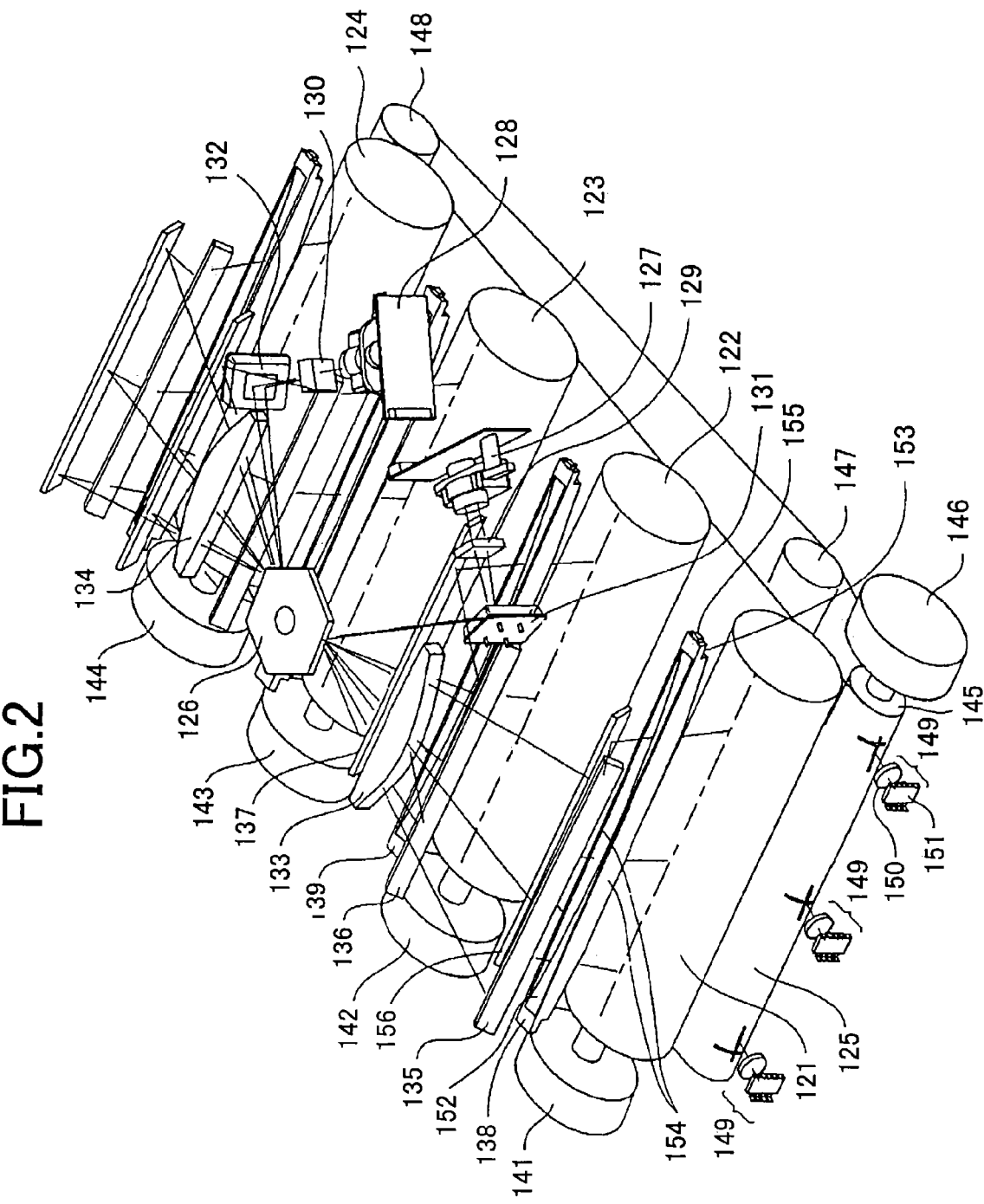
FIG. 2 is a diagram illustrating an image forming part of an exemplary tandem type color image forming apparatus according to the present invention.

FIG. 1 shows the structure of an optical scanner according to one embodiment of the present invention, and FIG. 2 shows the structure of an image forming part of a tandem type color image forming apparatus according to one embodiment according to the present invention. The optical scanner in FIG. 1 constitutes the image forming part of the tandem type color image forming apparatus in FIG. 2. The optical scanner optically scans one photoconductor drum included in the tandem type color image forming apparatus. In order to avoid confusion, parts in FIG. 2 are designated by reference numerals different from parts in FIG. 1 even if some of the parts are identical objects.

In the image forming part of the tandem type color image forming apparatus in FIG. 2, four photoconductor drums 121, 122, 123 and 124 are arranged along the shift direction of the circumferential surface of a transfer belt 125, which serves as a transferred member. After electrostatic latent images are optically written and formed on the individual photoconductor drums 121, 122, 123 and 124, the electrostatic latent images are made visible with distinct color toners. The color toner images are sequentially superposed and transferred on the transfer belt 125 to form a color image. The color image is transferred and fused on (not illustrated) a recording medium, for example, a record paper so as to form a color image.

The optical scanners, each of which optically scans respective photoconductor drums 121, 122, 123 and 124, share a polygon mirror 126, which serves as a deflecting part. Also, the tandem type color image forming apparatus contains lenses, which serve as image forming parts, for focusing optical beams deflected by the polygon mirror 126 on the corresponding photoconductor drums 121, 122, 123 and 124. Some of the lenses are also shared for the photoconductor drums 121, 122, 123 and 124.

Each of illuminant units 127 and 128 includes a pair of semiconductor lasers for emitting optical beams, which are deflected on same deflection reflection surfaces of the polygon mirror 126. The tandem type color image forming apparatus in FIG. 2 will be described later in detail.

Referring to FIG. 1, for example, the optical, scanner in FIG. 1 corresponds to the optical scanner that optically scans the photoconductor drum 122 with an optical beam emitted by the illuminant unit 127 in the configuration of the tandem type color image forming apparatus in FIG. 2.

In the optical scanner in FIG. 1, semiconductor lasers 101 and 102 emit optical beams for optically scanning a photoconductor drum 111 and (not illustrated) another photoconductor drum, respectively. The two optical beams are converted into parallel luminous fluxes through coupling lenses 103 and 104, respectively, and then enter a synthesizing prism 105. The synthesizing prism 105 is formed as a combination of a parallelogram prism and a trapezoid prism.

The optical beam from the semiconductor laser 101 is transmitted through the trapezoid prism of the synthesizing prism 105. On the other hand, the optical beam from the semiconductor laser 102 is reflected on a pair of parallel reflection surfaces of the parallelogram prism of the synthesizing prism 105 sequentially and then exits close to the optical beam from the semiconductor laser 101 such that the two optical beams have a predetermined interval each other with respect to the sub-scanning direction as illustrated in FIG. 1.

The two optical beams pass through positions away from the center axis of the cylindrical lens 106 with respect to the sub-scanning direction. Then, the optical beams from the semiconductor lasers 101 and 102 are reflected on respective movable mirrors 107 and 108 so as to cross each other on a deflection reflection surface of a polygon mirror 100 with respect to the sub-scanning direction. The reflected optical beams are focused near the deflection reflection surface of the polygon mirror 100 as a line beam with respect to the main scanning direction. Through rotation of the rotationally driven polygon mirror 100, the line beam becomes a luminous flux deflected at a constant angular velocity. Hereinafter, only the optical beam propagating to the photoconductor drum 111 will be described.

After the optical beam is deflected by the polygon mirror 100, the deflected optical beam is transmitted through an fθ lens 109 and a toroidal lens 110, each of which serves as the image forming part, and then is focused on the circumferential surface of the photoconductor drum 111 as an optical spot to optically scan the circumferential surface.

In this embodiment, the fθ lens 109 and the toroidal lens 110 extend in the sub-scanning direction.

The movable mirror 107 is capable of deflecting the optical beam to the photoconductor drum 111 with respect to the sub-scanning direction and serves as an optical axis adjusting part for deflecting the optical beam with respect to the sub-scanning direction.

The semiconductor lasers 101 and 102 comprise semiconductor laser arrays each of which is formed in a monolithic structure by arranging a plurality of illuminants at a pitch of slightly more than 10 μm as an array. A compound image formation magnification of the coupling lens 103, the cylindrical lens 106, the fθ lens 109 and the toroidal lens 110 with respect to the sub-scanning direction is notated as β, and the pitch of the illuminants is notated as d. Then, if the optical scanner is designed to meet the equation β=p/d, optical spots from the illuminants are formed on the photoconductor drum 111 to have a pixel pitch p corresponding to a recording density.

Although the optically scanning process follows a "multi-beam scanning fashion", it is possible to select one of the plurality of illuminants to write the head line.

As previously mentioned, the two optical beams from the semiconductor lasers 101 and 102 are deflected to cross each other near the polygon mirror 100 with respect to the sub-scanning direction. In this case, it is possible to separate the two optical beams after the deflection by the polygon mirror 100 with respect to the sub-scanning direction so that each of the deflected optical beams can travel toward a photoconductor drum different from each other. In the optical scanner shown in FIG. 1, after the optical beam from the semiconductor laser 101 is deflected by the polygon mirror 100, the deflected optical beam is guided toward the photoconductor drum 111 by two folding mirrors 112 and 114.

In FIG. 1, a synchronization detecting sensor 113 takes a start timing for writing in the main scanning direction.

It is noted that an optical path of the optical beam from the semiconductor laser 102 is omitted in FIG. 1. In this embodiment, the movable mirrors 107 and 108 are configured as one movable mirror module. However, the movable mirrors 107 and 108 may be separately provided for each of the two optical beams.

Figure 3:
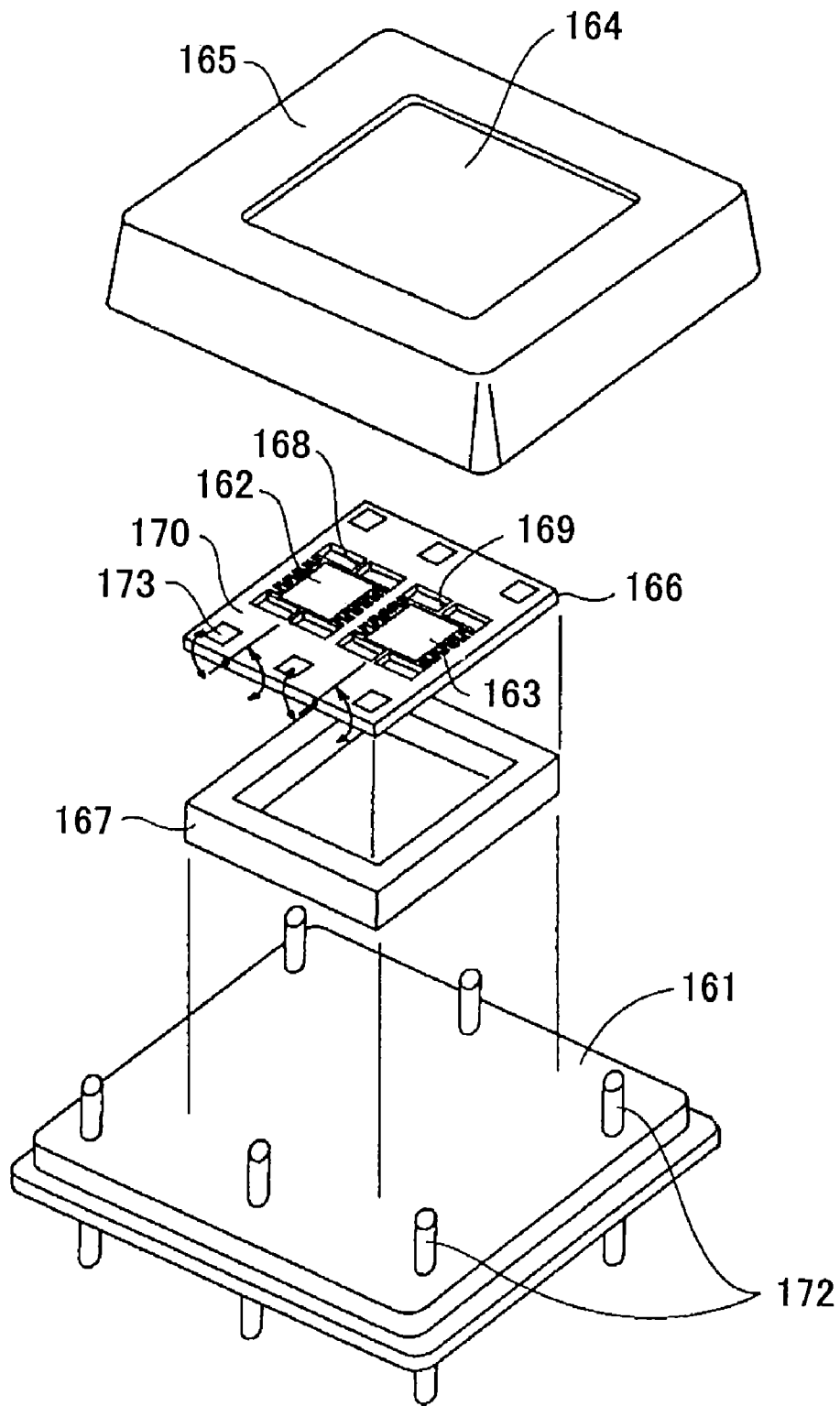
FIG. 3 is an exploded perspective view of an exemplary movable mirror module serving as an optical axis adjusting part according to the present invention.

FIG. 3 is an exploded perspective view of the movable mirror module 160, which serves as the optical axis adjusting part according to the present invention, accommodating the movable mirrors 107 and 108 in FIG. 1 wherein the movable mirrors 107 and 108 are designated by the reference numerals 162 and 163, respectively.

In the movable mirror module 160, first and second movable mirrors 162 and 163 are disposed in parallel to the sub-scanning direction on a support substrate 161 shaped of a sintered metal. The interior of the movable mirror module 160 is sealed with a cap-shaped cover 165. An optical beam passes through a glass window 164 that is provided at an aperture of the cover 165. Inactive gas is enclosed in the sealed interior.

A movable mirror substrate is configured by joining an Si substrate 166 and an Si support frame 167 via an insulation film. The Si substrate 166 is formed of an Si substrate of 60 μm in thickness. An etching process is performed to cut off portions of the first and the second movable mirrors 162 and 163 as well as the periphery of twisted beams 168 and 169 to support the movable mirrors 162 and 163. The movable mirrors 162 and 163 are coupled to a fixing frame 170 via the twisted beams 168 and 169. Then, the movable mirrors 162 and 163 are provided to be connected to the fixing frame 170 via the twisted beams 168 and 169. The first and the second twisted beams 168 and 169 are arranged in parallel to the main scanning direction.

On the surface of the Si substrate 166, the movable mirrors 162 and 163 have tooth-shaped ends at the sides orthogonal to the twisted beams 168 and 169 and the fixing frame 170 has tooth-shaped ends, as illustrated in FIG. 3, so as to engage with each other. A metal film of Au and others is deposited on the tooth-shaped portions of the movable mirrors 162 and 163 together with the tooth-shaped portion of the fixing frame 170. The tooth-shaped portions of the movable mirrors 162 and 163 serve as first and second movable electrodes, and the tooth-shaped portion of the fixing frame 170 serves as first and second fixed electrodes opposite to the first and the second movable electrodes.

When a voltage is applied to the first and the second fixed electrodes, electrostatic force is generated between the mutually facing movable electrodes. Consequently, the twisted beams 168 and 169 are twisted and the movable mirrors 162 and 163 are separately rotated by small angles. If a pulse voltage is periodically applied to the first and the second fixed electrodes, it is possible to cause the movable mirrors 162 and 163 to oscillate.

Here, if the twisted beams 168 and 169 are configured to have widths and lengths corresponding to resonance frequency peculiar to the oscillating portions thereof, it is possible to make the amplitude larger due to the oscillation. As a result, since the movable mirrors 162 and 163 can be driven by applying weak intensity of electric current, it is possible to reduce an amount of the power consumption. In order to prevent resonance caused by vibration transmission due to rotation of photoconductor drums and others, however, it is preferable that the resonance frequency be set as a sufficiently high resonance frequency (more than 200 Hz) toward the vibration due to the rotation.

On the other hand, the resonance frequency may be set to correct pitch variations (banding) involved in the vibration transmission with respect to the sub-scanning direction.

When the fixed and the movable electrodes are tooth-shaped as mentioned above, it is possible to increase the outer circumferential lengths thereof as much as possible and make the lengths of the electrodes greater. As a result, it is possible to obtain a greater electrostatic torque at a low voltage.

The Si support frame 167 is formed of an Si substrate of 200 μm in thickness, and an aperture is provided at the center of the Si support frame 167. The Si support frame 167 fixes a support portion of the Si substrate 166 so that the aperture can provide an oscillation area of the movable mirrors 162 and 163. Lead terminals 172 are provided to pierce a support substrate 161 via an insulator. A wire bonding process is conducted for each of the lead terminals 172 such that each of the fixed electrodes, each of pad parts 173, and each upper end of the lead terminals 172 are connected each other via the lead terminal 172. As a result, it is possible to connect between the interior and the exterior of the packed electric wiring.

The cover 165 is embedded in a step part formed in the outer circumference of the support substrate 161, and the glass window 164 is joined at the aperture from the inner side of the cover 165.

In this configuration, it is assumed that each of the movable mirrors 162 and 163 has $2a$ in length, $2b$ in width and d in thickness and that each of the twisted beams 168 and 169 has L in length and c in width. Also, the density of the Si is notated as ρ and the material constant is notated as G. Then, the moment of inertia I of the movable mirrors 162 and 163 and the spring constant K of the twisted beams 168 and 169 are given as follows;

$$I=(4ab\rho d/3)\cdot a^2, \text{ and}$$

$$K=(G/2L)\cdot\{cd(c^2+d^2)/12\}.$$

Accordingly, the resonance frequency f is given as follows;

$$f=(1/2\pi)\cdot(K/I)^{1/2}=(1/2\pi)\cdot\{Gcd(c^2+d^2)/24LI\}^{1/2}.$$

Additionally, since the length L of the twisted beams 168 and 169 is in proportion to an oscillation angle θ, the oscillation angle θ is represented as follows;

$$\theta=(A/I)f^2,$$

where A is a constant. As seen from the above formula, the oscillation angle θ is in inverse proportion to the moment of inertia I.

In a case where the resonance frequency f is high, unless the moment of inertia I is reduced, the above formula says that the oscillation angle θ becomes small. In order to overcome this problem, the movable mirrors 162 and 163 according to this embodiment is designed to reduce the weight thereof by partially cutting off the back sides thereof. As a result, it is possible to decrease the moment of inertia I.

Also, electrostatic force F between a fixed electrode and a movable electrode is given as follows;

$$F=\in HV^2/2\delta,$$

where ∈ is a dielectric constant of air, H is the length of the electrodes, V is an applied voltage and δ is the distance between the fixed electrode and the movable electrode.

Accordingly, the oscillation angle θ can be represented as follows;

$$\theta=B\cdot F/I,$$

where B is a constant.

This formula asserts that the larger electrode length H is, the greater oscillation angle θ is. In response to this fact, the fixed electrode and the movable electrode are tooth-shaped in this embodiment of the present invention so as to obtain the large electrode length H. As a result, if the number of the teeth is n, it is possible to obtain a 2n amount of drive torque.

Here, the viscous resistance P of air toward the movable mirror is given as follows;

$$P=C\cdot\eta v^2\cdot E^3,$$

where C is a constant, η is the air density in the vicinity of the movable mirror, v is the speed of the movable mirror, and E is the area of the movable mirror.

In this embodiment, the movable mirrors are sealed, and decompressed inactive gas is enclosed in the sealed interior as previously mentioned. As a result, it is possible to not only reduce the viscous resistance but also prevent changes of properties of the metal films on the movable mirrors due to chemical changes thereof.

Figure 4A:
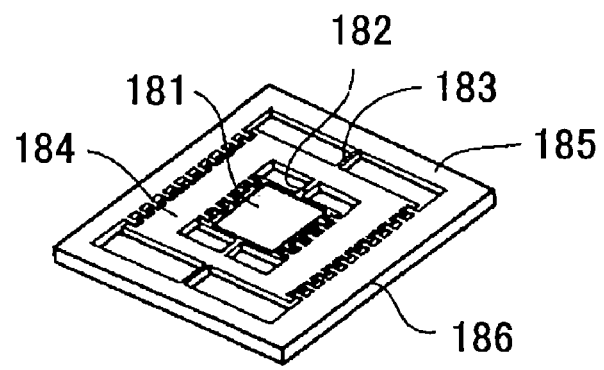
FIGS. 4A and 4B are diagrams illustrating variations of the optical axis adjusting part according to the present invention.

FIG. 4A shows an exemplary movable mirror according to another embodiment of the present invention. This movable mirror has two oscillation modes.

In the movable mirror in FIG. 4A, an etching process is conducted for an Si substrate 186. In the etching process, a movable mirror 181, a first twisted beam 182 to support the movable mirror 181, a movable frame 184 connected to the first twisted beam 182, a second twisted beam 183 to connect between the movable frame 184 and a fixing frame 185, and the fixing frame 185 are formed of the Si substrate 186 as illustrated.

As shown in FIG. 4A, the movable mirror 181, the movable frame 184 and the fixing frame 185 have tooth-shaped portions such that the twisted beams 182 and 183 are sandwiched. In this configuration, the movable mirror 181, the movable frame 184 and the fixing frame 185 can engage with each other. The tooth-shaped portions of the movable mirror 181, the movable frame 184 and the fixing frame 185 are deposited with metal films of Au and others. Then, the tooth-shaped portions of the movable mirror 181 are set as a first movable electrode, the corresponding tooth-shaped portions of the movable frame 184 are set as a first fixed electrode, the other tooth-shaped portions of the movable frame 184 are set as a second movable electrode, and the corresponding tooth-shaped portions of the fixing frame 185 are set as a second fixed electrode.

When a voltage is applied to the first and the second fixed electrodes, electrostatic force is generated between the fixed electrodes and the corresponding movable electrodes. Since the twisted beams 182 and 183 are twisted by the generated electrostatic force, it is possible to rotate the movable mirror 181 and the movable frame 184 separately by small angles. If a pulse voltage is periodically applied to the first and the second fixed electrodes, it is possible to oscillate the movable mirror 181 and the movable frame 184.

In this embodiment, the twisted beams 182 and 183 are disposed on the same axis. Accordingly, if voltages of different frequencies are applied to the first and the second fixed electrodes, it is possible to oscillate the movable mirror 181 at such an amplitude that two oscillation modes are overlapped in the same direction.

Similarly to the movable mirrors 162 and 163 in FIG. 3, the movable mirror 181 in FIG. 4A is disposed on the Si support frame such that the movable mirror 181 is sealed by the support substrate and the cover and inactive gas is enclosed in the decompressed interior thereof. Also, the electric wiring is provided to the movable mirror 181 like the movable mirrors 162 and 163.

In the above-mentioned implementation, the movable mirror is driven by electrostatic force. However, the movable mirror may be driven by a piezoelectric element and others.

Figure 4B:
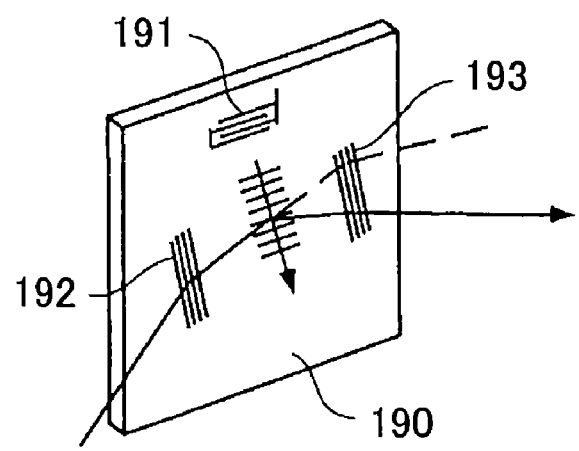

The optical axis adjusting part is not limited to the above-mentioned movable mirrors. Suitable means for changing the optical axis of an optical beam may be used as the optical axis adjusting part. As shown in FIG. 4B, for instance, it is possible to adjust the optical axis of an optical beam by using a surface elastic wave resulting from entering the optical beam to an optical waveguide substrate 190 formed of $LiNO_3$, ZnO or the like.

Referring to FIG. 4B, if the frequency of a surface elastic wave excited by a tooth-shaped electrode (transducer) 191 is adjusted, it is possible to change the deflection angle of an optical beam. The diffraction gratings 182 and 183 are provided so that the optical beam can travel in/from the optical waveguide substrate 190.

Prior to the further description, an image forming process by the image forming part (of the tandem type color image forming apparatus) is briefly described with reference to FIG. 2.

In FIG. 2, optical beams emitted by the illuminant units 127 and 128 are transmitted through the cylindrical lenses 129 and 130. Then, the optical beams are deflected by the movable mirror modules 131 and 132 in such two directions that the optical beams can enter opposite surfaces of the polygon mirror 126 to each other as illustrated in FIG. 2. Here, the movable modules 131 and 132 have the same configuration as the movable mirror associated with FIG. 3.

As discussed in association with FIG. 1, each of the illuminant units 127 and 128 emits two optical beams, and the two optical beams are separated into the upper beam and the lower beam with respect to the sub-scanning direction. After the illuminant units 127 and 128 emit two pairs of upper and lower optical beams, the upper and lower optical beams enter the cylindrical lenses 129 and 130 at positions symmetrically away from the center axes of the cylindrical lenses 129 and 130 with respect to the sub-scanning direction. For each pair, the upper and the lower optical beams cross each other with respect to the sub-scanning direction in the vicinity of deflection reflection surfaces of the polygon mirror 126 and are deflected in the same direction by the polygon mirror 126. Then, the deflected optical beams, which are emitted by the illuminant units 127 and 128, pass through the fθ lenses 133 and 134, respectively. One of the two optical beams from the illuminant unit 127 travels to the photoconductor drum 121 via the folding mirrors 135 and 156, and the other optical beam travels to the photoconductor drum 122 via the folding mirrors 136 and 137. The toroidal lenses 138 and 139 are provided to the two optical beams separately. For the photoconductor drums 123 and 124, the optical beams from the illuminant unit 128 are similarly guided thereto via two folding mirrors and different toroidal lenses. For simplicity, the folding mirrors, and the toroidal lenses for the photoconductor drums 123 and 124 are not designated in FIG. 2 by reference numerals.

As mentioned previously, each of the illuminant units 127 and 128 comprises a plurality of semiconductor lasers, coupling lens, a holder for retaining a synthesizing prism, and a semiconductor laser drive circuit whose print substrate is mounted on the back surface thereof. The illuminant units 127 and 128 are configured to be rotated with respect to the cylindrical part from which optical beams are emitted. Through adjustment of the cylindrical part, it is possible to fine-tune a writing phase of each of the upper and the lower optical beams.

Figure 5:
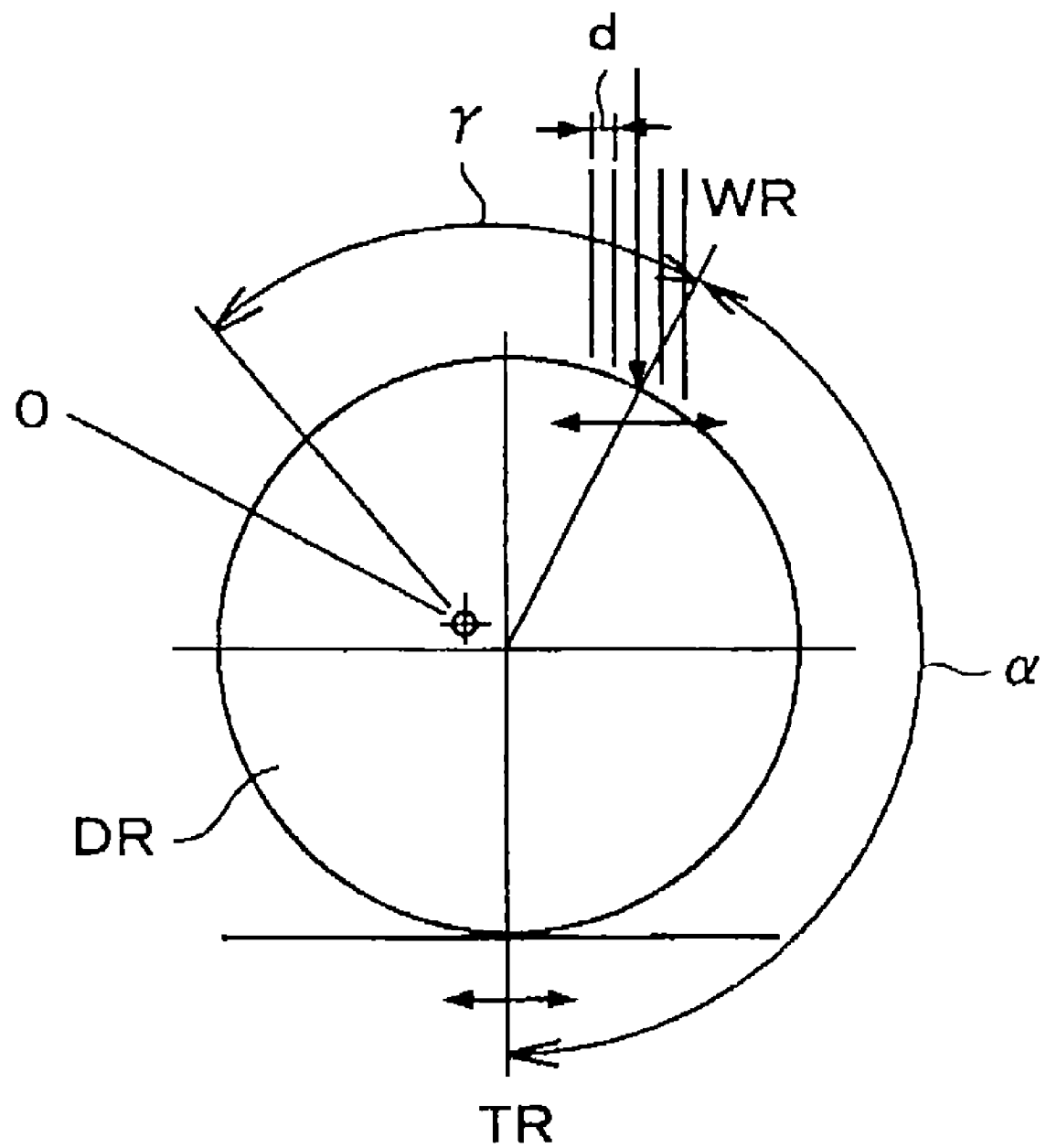
FIG. 5 shows an exemplary relation between a writing position onto a photoconductor drum and a transferring position.

The individual photoconductor drums 121, 122, 123 and 124 are directly connected to motors 141, 142, 143 and 144, respectively. The motors 141, 142, 143 and 144 are rotated clockwise at the same frequency as illustrated in FIG. 5.

The transfer belt 125 is rotated counterclockwise by a driving roller 145 connected to a motor 146 and is tensioned by driven rollers 147 and 148.

In this embodiment, each of the photoconductor drums 121, 122, 123 and 124 is in contact with the transfer belt 125 at a transferring position. The transferring positions are arranged at an interval of an integral multiple of the circumferential length of the driving roller 145. In this configuration, even if the transfer belt 125 is shifted at periodically varying speeds due to eccentricity of the driving roller 145, it is possible to make the phase of the periodical speed variation uniform for the transferring positions. A detector 149 for reading a reference position of each image is provided near the driving motor 145 on the transfer belt 125.

The detector 149 comprises a CCD area sensor 151 and an objective lens 150. Three detectors 149 are disposed near the center and the both ends of the transfer belt 125 along the main scanning direction. The detectors 149 enlarge and read a predefined detection pattern formed of a reference color toner image (black toner image) and then detect resist positions with respect to the main scanning direction and the sub-scanning direction. At the same time, by comparing the black toner image with the other color (cyan, magenta and yellow) toner images, the detectors 149 detect "differences between resist positions", "the slope of a scanning line" and "the curvature of a scanning line". The differences between resist positions are derived based on the detected resist positions with respect to the main scanning direction and the sub-scanning direction. The slope of a scanning line is derived based on a detected difference between the both ends. The curvature of a scanning line is derived based on a detected difference between the middle point of the both ends and the center.

In order to detect a pitch variation, (not illustrated) caterpillar-shaped patterns are formed in the sub-scanning direction at a constant period, and intervals of the caterpillar-shaped patterns (time lag) are read as "streak misalignment" at a predefined sampling time. The period and the amplitude of the shift speed variation of the transfer belt 125 and phase differences between the speed variation and the detected resist positions are detected through a frequency analysis of the read intervals.

FIG. 5 shows an exemplary relation between the writing position WR onto a photoconductor drum DR and the transferring position TR. In FIG. 5, the rotational center O of the photoconductor drum DR is misaligned to the center axis of the photoconductor drum DR. The angle between the writing position WR and the transferring position TR is set as α.

In this configuration, if rotation of the photoconductor drum DR has no eccentricity and the rotational speed of the photoconductor drum DR is constant, it takes a constant time t for the photoconductor drum DR to be rotated from the writing position WR to the transferring position TR.

However, the time t of the photoconductor drum DR may differ from another photoconductor drum due to "unevenness of the drum diameter" of the photoconductor drums DR and misalignment of the writing position WR. Also, if the photoconductor drum DR has the eccentric rotational center O due to the fabrication inaccuracy, the time t would periodically change corresponding to the configuration of the photoconductor drum DR.

According to this embodiment, if variations of the time t are caused by the drum diameter unevenness and the writing position misalignment as mentioned above, it is possible to correct the variations by selecting an optimal illuminant to write the head line among a plurality of illuminants constituting a semiconductor array of the illuminant unit.

Figure 6:
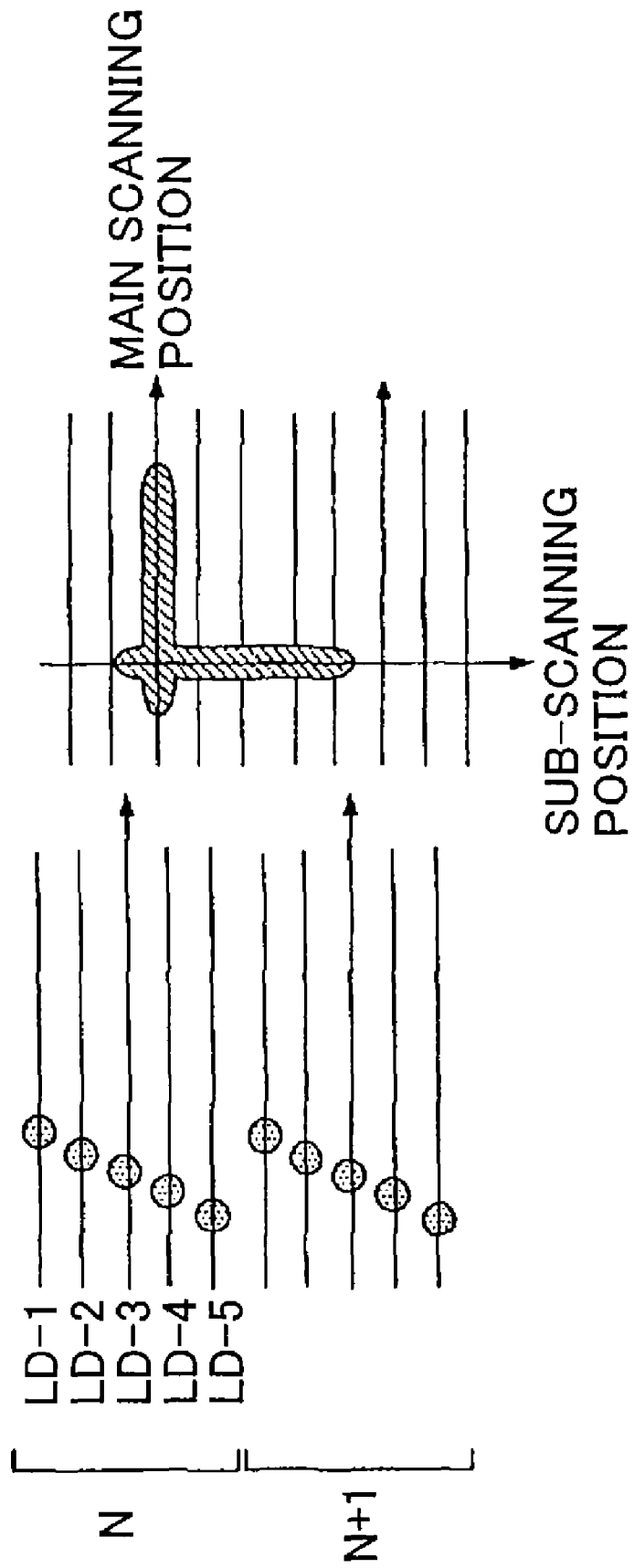
FIG. 6 shows an exemplary placement of optical spots emitted from an illuminant unit according to one embodiment of the present invention.

FIG. 6 shows a case where the semiconductor laser array of the illuminant unit has five illuminants. Five optical spots LD-1 through LD-5 are formed of optical beams from the five illuminants at the writing position WR on the photoconductor drum DR. When such a semiconductor laser array is used to perform a multi-beam type scanning process, five scanning lines to simultaneously scan a photoconductor drum are generated from the optical spots LD-1 through LD-5.

In FIG. 6, the notation N represents a surface of a polygon mirror for reflecting and deflecting the five optical beams simultaneously, and the notation N+1 represents the next surface of the polygon mirror. As shown in FIG. 6; whenever the surface for reflecting and deflecting optical beams is switched through rotation of the polygon mirror, the five scanning lines to simultaneously scan a photoconductor drum are formed on the drum surface.

When image data are written with the writing position WR on the photoconductor drum DR, one optical spot for writing the head line is selected among the optical spots LD-1, LD-2, LD-3, LD-4 and LD-5 that are deflected on a same surface of the polygon mirror. The selected optical spot has a minimum difference with the resist position (right-hand side in FIG. 6) of a reference color detected by the detector 149. In this case, only two scanning lines generated from the optical spots LD-4 and LD-5 are used for the surface N of the polygon mirror, that is, at the start time of writing. Then, the five scanning lines are used for the next surface N+1 of the polygon mirror.

Figure 7:
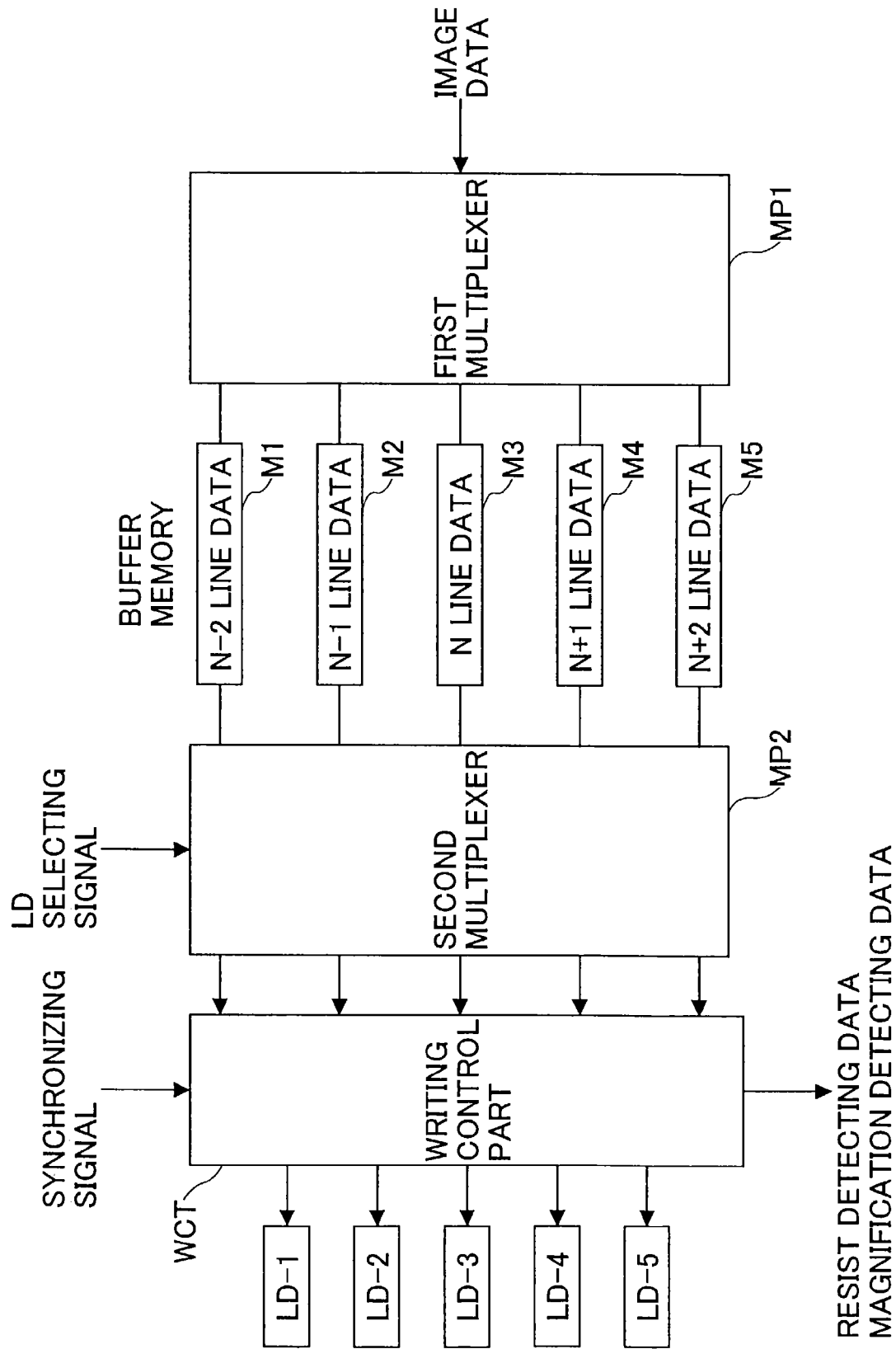
FIG. 7 is a block diagram illustrating a circuit for selecting an illuminant in a semiconductor array.

FIG. 7 is a block diagram of a circuit for selecting an illuminant to write the head line. In FIG. 7, a plurality of illuminants of a semiconductor laser array are referred to as the same notations as the above-mentioned optical spots LD-1 through LD-5. As shown in FIG. 7, when a first multiplexer MP1 receives image data, the first multiplexer MP1 distributes each five lines of the image data to five buffer memories M1 through M5, and then the distributed five lines are temporarily stored therein.

A second multiplexer MP2 selects a semiconductor laser to write the head line based on reference position data. Then, the second multiplexer MP2 reads the stored image data from the buffer memories M1 through M5 synchronously with a synchronizing signal of each surface of the polygon mirror and drives the illuminants LD-1 through LD-5 of the semiconductor laser array via a writing control part WCT. Here, if a portion of the image data has not been written in deflection on a surface of the polygon mirror, the portion is stored until deflection on the next surface of the polygon mirror.

When the optical spot to write the head line is selected so that the difference with the resist position of the reference color can be minimized, it is possible to properly correct differences of the time t among the individual photoconductor drums due to the drum diameter unevenness and the misalignment of the writing positions.

In this case, by using the synchronizing signals as triggers, the writing control part resets a main scanning directional timing for writing an image for each optical scanning part of the image forming apparatus based on detection results of resist positions such that the center of the reference color coincides with the center of the each image region. In order to make the image widths (total width magnification) uniform, an image frequency for modulating a semiconductor laser is multiplied in inversely proportion to variations of the image widths. Then, it is possible to properly superpose the individual image regions by selecting the closest setting value among values determined by individual division rates.

The resist positions are periodically set with respect to the main scanning direction and the sub-scanning direction during a start-up period before an image forming job or a waiting period between jobs such that the resist positions are suitable to an environment of the image forming apparatus.

A description will now be given of correction of periodical variations of the time t due to eccentricity of the rotational center of a photoconductor drum or a transfer belt.

In FIG. 5, an eccentric angle γ indicates an angle between the writing position WR and the rotational center O of the photoconductor drum. In order to correct the periodic variations of the time t due to the eccentricity of the rotational center of the photoconductor drum or the transfer belt, the above-mentioned movable mirror is slightly vibrated at the period of one rotation of the photoconductor drum DR corresponding to the eccentric angle γ such that the amplitude and phase of the movable mirror coincide with those of the periodical variations. As a result, it is possible to periodically change the writing position so that the time t can be constant.

If the center axis of the photoconductor drum is misaligned to the rotation axis thereof, the distance r between the rotation axis and the circumferential surface of the photoconductor drum is varied in the range of $r_0 \pm \Delta r$, where $r_0$ is the drum diameter without eccentricity and $\Delta r$ is an amount of the eccentricity. In this case, when the photoconductor drum is rotated at a constant speed, the photoconductor drum has different surface speeds corresponding to positions on the circumferential surface thereof. If the surface speed is higher at a position on the circumferential surface, the writing position is shifted away from the transferring member, that is, in the rotational upstream direction thereof. In contrast, if the surface speed is lower at a position on the circumferential surface, the writing position is shifted to the transferring member. This adjustment makes the rotation time t of the photoconductor drum from the writing position to the transferring position uniform. In other words, even if the writing position is not shifted, it is possible to make the time t, which is varied over time, uniform by slightly changing the time t.

The surface speed around the writing position is periodically varied at the period of one rotation of the photoconductor drum. Thus, if the movable mirror in FIG. 3 is used to deflect an optical beam in the sub-scanning direction synchronously with the period and to shift the writing position such that the varying surface speed matches the phase of the period, it is possible to make the time t uniform. At this time, an optical beam is sufficiently slowly varied on the movable mirror with respect to the sub-scanning direction relative to the period of the optical scanning. In this case, although the optical beam is deflected with respect to the sub-scanning direction, only extremely slight curvature and slope are caused in the scanning line corresponding to the deflected optical beam. As a result, it is possible to ignore the curvature and slope of the scanning line in practice.

Figure 8:
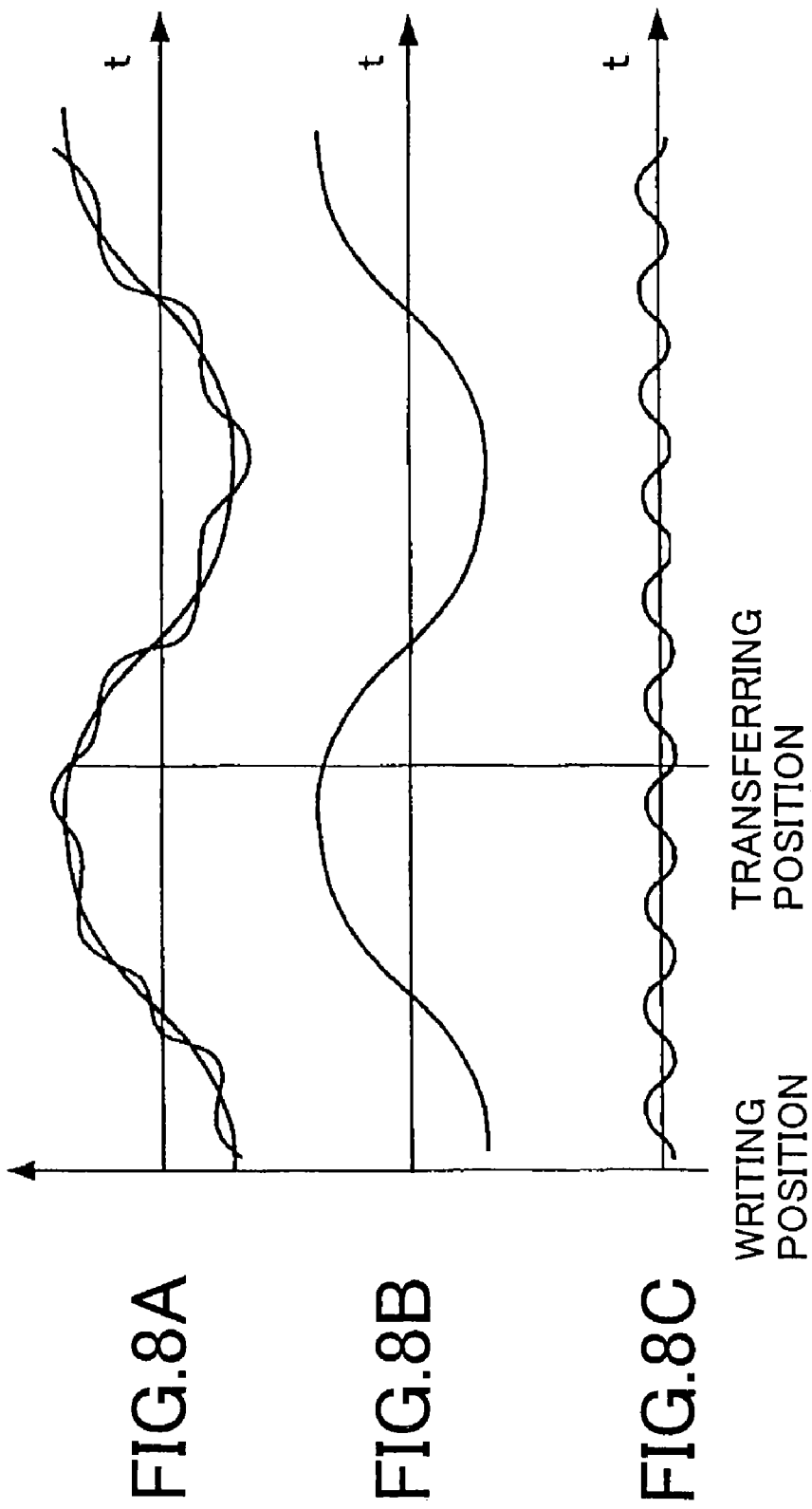
FIGS. 8A through 8C are diagrams illustrating exemplary variations of a recording pitch with respect to a sub-scanning direction.

FIG. 8A shows an exemplary variation of a recording pitch on an image with respect to the sub-scanning direction. This variation is generated as a composition of large undulations as illustrated in FIG. 8B and small undulations as illustrated in FIG. 8C. The large undulations are generated during one rotational period of a photoconductor drum, and the small undulations are generated during one rotational period of a driving roller for driving a transfer belt.

The above description handles the case where the movable mirror in FIG. 3 is used to correct, in particular, the large undulations through the periodical deflection of an optical beam with respect to the sub-scanning direction. As shown in FIG. 8A, however, if the recording pitch is varied in accordance with the composite of the two oscillation modes, the above-mentioned movable mirror module in FIG. 4A is preferably used. The movable frame 184 is vibrated synchronously with the large undulations, and the movable mirror 181 in FIG. 4A is vibrated synchronously with the small undulations. As a result, it is possible to accurately shift the writing position with respect to the sub-scanning direction in response to the composite undulations as shown in FIG. 8A. Therefore, it is possible to realize the constant time t even if the variation of the recording pitch in FIG. 8A exists.

However, as mentioned above, even if a movable mirror is vibrated at the period corresponding to only the larger undulation of the two different oscillation modes, it is possible to effectively reduce unevenness of the recording pitches due to the periodical variations of the time t by making the amplitudes and the phases uniform so as to offset the pitch variations at the transferring position.

Since the above-mentioned pitch variations are characteristics inherent in an image forming apparatus with a drive transmission system, it is possible to effectively reduce the unevenness of the pitches by making the amplitudes and the phases uniform at the initial arrangement so as to offset the pitch variations at each transferring position.

In FIGS. 8A through 8C, the speed is varied at the constant period. However, even if the period of the speed variations sporadically changes during an image forming process due to load variations and others, it is possible to correct the pitch unevenness like the above fashion by inclining the movable mirror at an occurrence timing of the sporadic period change.

Figure 9:
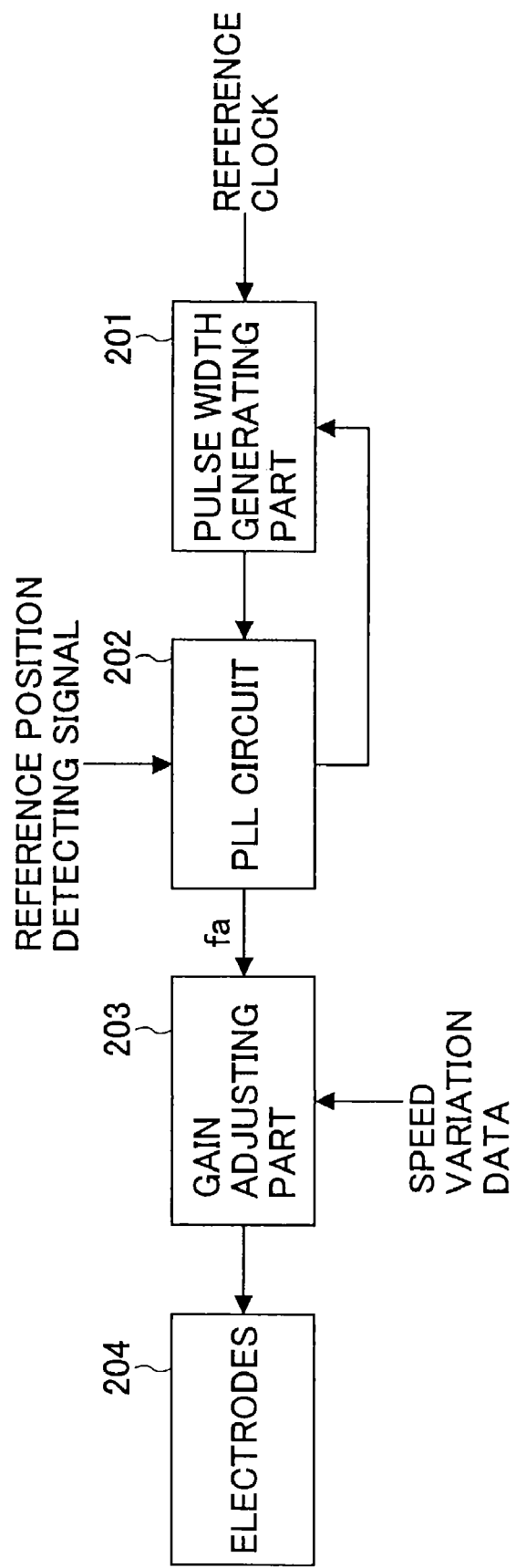
FIG. 9 is a block diagram illustrating a drive circuit for driving a movable mirror.

FIG. 9 is a block diagram of a drive circuit for driving a movable mirror. A voltage supplied to individual electrodes 204, which correspond to electrodes of the movable mirror module illustrated in FIG. 3, is generated as follows. Based on a reference clock, a pulse width generating part 201 generates a sequence of pulses corresponding to an oscillation period of the movable mirror.

In a PLL circuit 202, the phase of the pulse sequence is made synchronous with a reference position detecting signal of the rotational direction of the photoconductor drum. The reference position detecting signal is generated based on an encoder of a drive motor for the photoconductor drum or a detected resist mark on the transfer belt. A gain adjusting part 203 sets the oscillation amplitude of the movable mirror corresponding to an amount of speed variations (an amount of speed variations at the writing position on the circumferential surface of the photoconductor drum), and then the resulting voltage is applied to the electrodes 204.

The pulse width generating part 201 is capable of generating a pulse sequence whose frequency is varied over time and a sporadic pulse. Thus, the pulse width generating part 201 can change the oscillation period of the movable mirror corresponding to correction data.

A supplemental description will now be given, with reference to FIG. 2, of the image forming part of the optical scanner according to the present invention.

The fθ lenses 133 and 134 are hybrid lenses in a sense that the fθ lenses 133 and 134 are formed by attaching aspheric components to glass-grinded spherical lenses by resin molding. On the other hand, the toroidal lenses 148 and 149 are formed by injection molding.

Although toroidal lenses are provided corresponding to each of the photoconductor drums 121 through 124, all the toroidal lenses have the same configuration as the toroidal lens 138. Thus, the following description is focused on the toroidal lens 138. The toroidal lens 138 comprises a lens part 152, a box-shaped rib part 154 for surrounding the lens part 152, and a flange part 153 that projects from both ends of the box-shaped rib part 154 in the main scanning direction. A gate part 155, which is formed by injecting resin, is provided to one end of the flange part 153.

Since the toroidal lens 138 has a long body, the lens part 152 can have its own peculiarity that is generated at formation time. For example, the lens part 152 may be uniformly curved due to differences of cooling time in local areas of the lens part 152 after injection molding. For this reason, the four toroidal lenses 148, 149 and others, which are provided corresponding to the photoconductor drums 121 through 124, are disposed such that the gate parts of the toroidal lenses have the same orientation and the curvatures thereof are similarly oriented. In this configuration, it is possible to make curvature directions of scanning lines, which are caused by the curvatures of the toroidal lenses, uniform to the individual photoconductor drums.

The flange part 153 has a flat plate body. In this configuration, the flange part 153 has a sub-scanning directional section modulus lower than that of the lens part 152 reinforced by the rib part 154 so as to absorb torsional stress. In this fashion, it is possible to prevent the lens part 152 from twisting largely by using the release stress against the torsional stress.

A description will now be given, with reference to FIG. 10, of a correcting method for correcting the slope of a scanning line.

FIG. 10 is a diagram for explaining the correcting method for correcting the slope of a scanning line wherein the toroidal lens 138 in FIG. 2 is referred to as the different numeral 211.

For instance, when a scanning line for optically scanning the photoconductor drum 121 is inclined, this inclination is corrected by rotating the toroidal lens 211 in the optical axis direction in a state where the toroidal lens 211 is in contact with the surface orthogonal to the optical axis.

The individual toroidal lenses 211 are disposed to face the photoconductor drums 121 through 124, as illustrated in FIG. 10, and are arranged on the bottom surface 210 (a base member shared by the toroidal lenses 211) of a housing such that the toroidal lenses 211 are uniformly aligned with respect to the optical axis direction and the sub-scanning direction. The toroidal lenses 211 are positioned with respect to the main scanning direction by catching projections 221, which project toward the photoconductor drums, at the center of the toroidal lenses 211 with concave parts 223 on the bottom surface 210 of the housing. The toroidal lenses 211 are connected to the housing via the projections 221 and concave parts 223 on the bottom surface 210 of the housing so as to be fixed with respect to the main scanning direction.

The toroidal lenses 211 are depressed to eccentric cams 214 and 215, which are in contact with one side surface of both ends of the flange parts 212, by first blade springs 225 so as to be positioned with respect to the sub-scanning direction. Also, the under surfaces of the toroidal lenses 211 are depressed to a housing reference surface 222 by second blade springs 224 so as to be positioned with respect to the optical axis direction.

The eccentric cam 215 is screwed at installation time to serve as a reference eccentric cam. On the other hand, the other eccentric cam 214 is used as an adjusting eccentric cam. The eccentric cam 214 is rotated via a pair of oblique tooth gears 216 by a pulse motor 217. In this configuration, even if the under surfaces of the toroidal lenses 211 are in contact with the housing reference surfaces 222, the toroidal lenses 211 can be initially set to be aligned at scanning positions of optical beams with respect to the sub-scanning direction by using the reference eccentric cam 215. As a result, it is possible to adjust the slopes of the scanning lines by using the adjusting eccentric cam 214. Additionally, it is possible to detect and correct a sub-scanning directional slope due to misalignment between the optical scanning parts or axial inclination of a photoconductor drum at any time based on a recorded image on the transfer belt.

In this embodiment, a black image is set as the reference color image, and the other color images are adjusted relative to the reference color image. Thus, the optical scanner for writing the black image is configured such that eccentric cams in contact with the toroidal lens 211 for the photoconductor drum 121 are fixed with screws.

Alternatively, the reference eccentric cam 215 may be configured to be rotated by a pulse motor like the adjusting eccentric cam 214. Thereby, it is also possible to correct the above-mentioned resist position with respect to the sub-scanning direction.

Figure 11A:
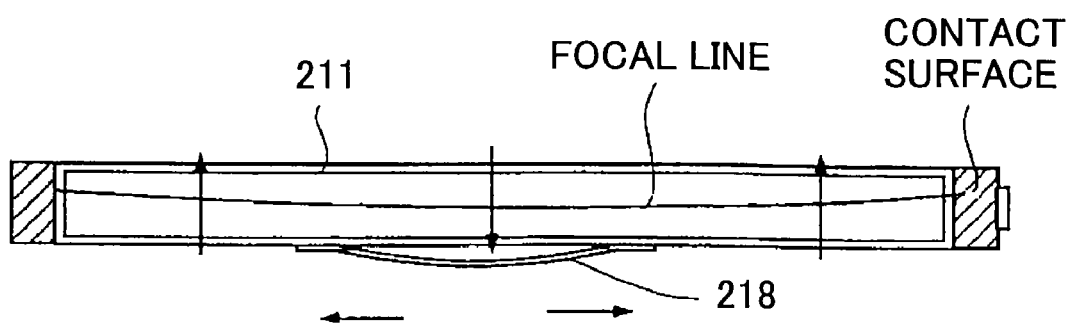
FIGS. 11A and 11B are diagrams for explaining curvature of a scanning line.
Figure 11B:
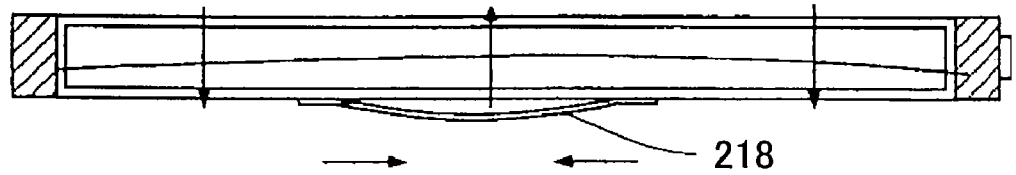

A description will now be given, with reference to FIGS. 11A and 11B, of a correction method for correcting curvature of a scanning line. FIGS. 11A and 11B are diagrams for explaining a correction method for correcting curvature of a scanning line.

As discussed associated with the image forming apparatus in FIG. 2, optical beams enter a same surface of a polygon mirror and are deflected so as to optically scan different photoconductor drums. Since the deflected optical beams cross around the surface of the polygon mirror with respect to the sub-scanning direction, the optical beams are inclined to a plane orthogonal to the rotational axis of the polygon mirror. Thus, the scanning line is not linear and is curved more greatly at an end in the sub-scanning direction than at the center.

The scanning line may be curved due to an axial difference between the fθ lens and the toroidal lens, which serve as the image forming parts. In this embodiment, the curved scanning line on a photoconductor drum is made linear by curving the toroidal lens 211 inversely to the curvature of the curved scanning line.

Figure 12A:
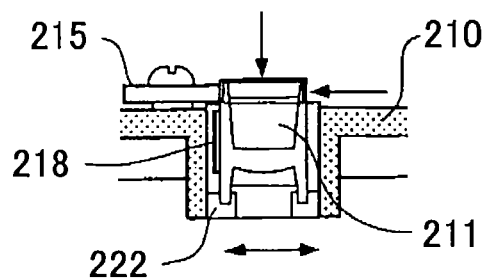
FIGS. 12A and 12B are diagrams illustrating a supported toroidal lens.
Figure 12B:
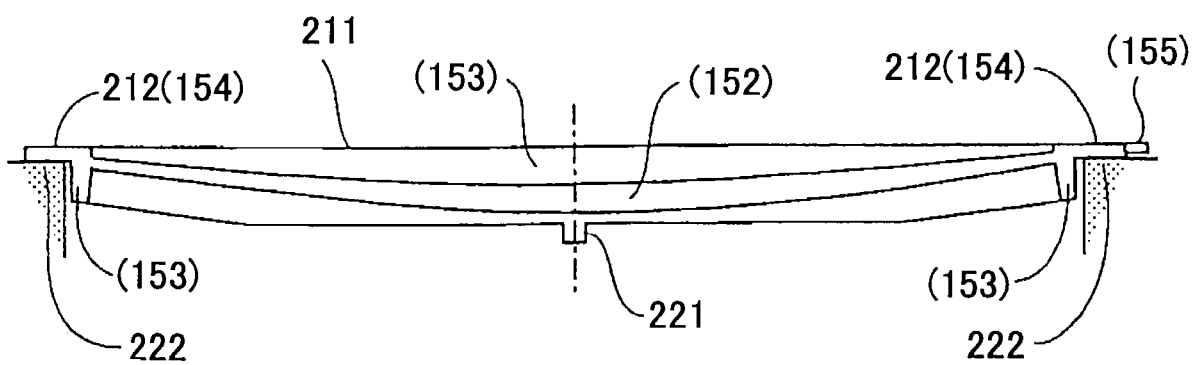

This correction process is described by using the toroidal lens 211 as an example with reference to FIGS. 11A and 11B and FIGS. 12A and 12B. FIGS. 12A and 12B show the supported toroidal lens.

As shown in FIGS. 12A and 12B, the flange parts 212, which are provided at both ends of the toroidal lens 211, is in contact with the housing reference surface 222 so as to support the toroidal lens 211. As seen from a cross-sectional view of the toroidal lens 211 in FIG. 12B, the toroidal lens 211 is supported without any constraint to the lens part with respect to the sub-scanning direction.

As shown in FIGS. 11A and 11B, an arch-shaped shape-memory metal plate 218 is connected at both ends thereof to one of the rib part 212 of the toroidal lens 211.

As shown in FIG. 10, a thin-film resistor 219 is attached to a portion of the outer surface of the shape-memory metal plate 218. By controlling electric power supplied to the thin-film resistor 219, it is possible to change the temperature of the shape-memory metal plate 218. The curvature of the shape-memory metal plate 218 can be arbitrarily changed depending on the temperature, resulting in elastic stress. If the elastic stress, which is generated by the curvature variations, affects the toroidal lens 211 in the main scanning direction, it is possible to adjust the curvature of the toroidal lens 211.

In other words, when the shape-memory metal plate 218 expands (contracts), the toroidal lens 211 is curved to be convex (concave) toward the shape-memory metal plate 218. If the shape-memory metal plate 218 is made in advance to memorize such a curvature that the elastic stress to either of the two directions is generated at a lower temperature, it is possible to correct the curvature of a curved scanning line, which is a focal line with respect to the sub-scanning direction, on a photoconductor drum through curvature offset even at normal temperature.

Here, the shape-memory metal plate 218 and the thin-film resistor 219 serve as a stress generating part.

If a scanning line is always curved in the same direction by temperature variations, it is possible to set the curvature direction of the toroidal lens 211 in advance. As a result, it is possible to effectively reduce the curvature of the scanning line without the thin-film resistor 219.

Alternatively, if shape-memory metal plates 218 are provided to both outer surfaces of the rib part 212 with respect to the sub-scanning direction, it is possible to offset the curvature of the scanning line by properly taking a balance between the two shape-memory metal plates 218.

In this configuration, the curvature may be adjusted by attaching a piezoelectric element to an arch-shaped plate. It is noted that the plate does not have to be a shape-memory metal plate in this case. As long as compression stress with respect to the main scanning direction is imposed between at least arbitrary two points of the toroidal lens 211, it is possible to obtain the similar correction effect on the curvature of a scanning line.

Figure 13:
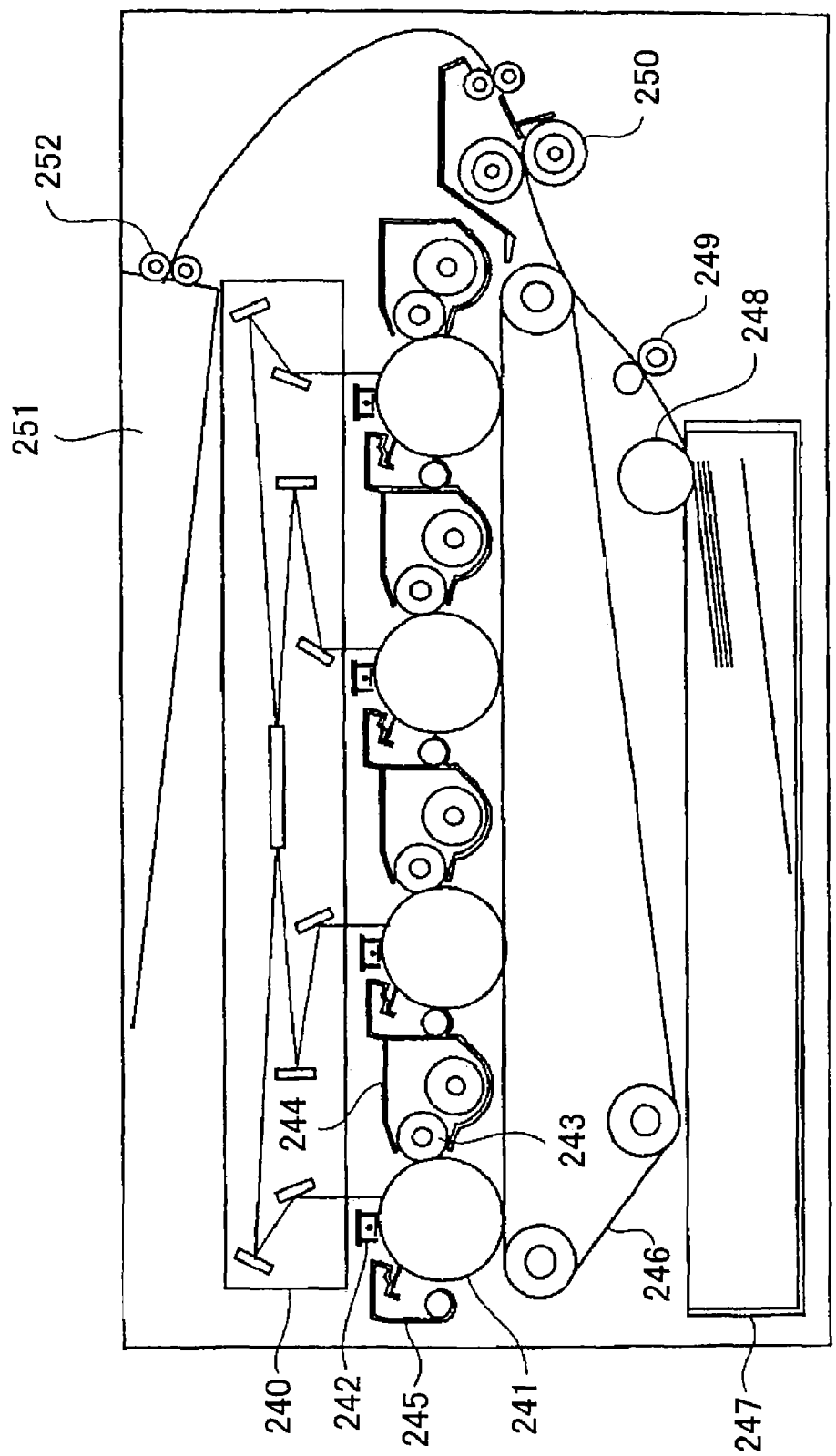
FIG. 13 is a diagram illustrating the structure of an exemplary image forming apparatus according to the present invention.

FIG. 13 shows an exemplary image forming apparatus in which the above-mentioned optical scanner is installed wherein the photoconductor drums 121 through 124 in FIG. 2 are collectively referred to as the numeral 241.

The most left photoconductor drum 241 (on which a black image is written) in FIG. 13 is described as an example. An electrifying charger 242, a developing roller 243, a toner cartridge 244 and a cleaning case 245 are disposed in the vicinity of the photoconductor drum 241. The electrifying charger 242 electrifies the photoconductor drum 241 at a high voltage. The developing roller 243 makes an electrostatic latent image written by an optical scanner 240 visible by attaching charged toners to the electrostatic latent image. The toner cartridge 244 supplies toners to the developing roller 243. The cleaning case 245 cleans up and collects remaining toners on the photoconductor drum 241 therein after a transferring process.

In the above-mentioned fashion, an image is written on the photoconductor drum 241 by a multi-beam scanning operation using a plurality of scanning lines simultaneously per one surface of a polygon mirror. In the above-mentioned embodiment, five scanning lines are used simultaneously.

The four photoconductor drums 241 and the peripheral devices are arranged parallel to the shifting direction of a transfer belt 246. Each color toner images of yellow, magenta, cyan and black are sequentially transferred and superposed onto the transfer belt 246 at an appropriate timing so as to form a full color image.

A record paper (a recording medium) onto which a color image is to be transferred and fused is delivered from a paper tray 247 by a paper roller 248. A pair of resist rollers 249 delivers the record paper when an image starts to be recorded. The full color image on the transfer belt 206 is transferred onto the delivered record paper. The transferred full color image on the record paper is fused by fusing rollers 250 and then is brought out in an output tray 251 by output rollers 252.

According to this embodiment, a difference of resist positions is detected from an image recorded on the transfer belt 125 as illustrated in FIG. 2. Based on the detection result, an illuminant to emit an optical beam for writing the head line is selected. However, the image forming apparatus according to the present invention is not limited to such selection. For instance, the illuminant for writing the head line may be selected in the interior of the optical scanner through position detection of optical beams with respect to the sub-scanning direction.

A sensor part 230 in FIG. 10 detects the position of an optical beam with respect to the sub-scanning direction. The similarly configured sensor part 230 is provided for each of the photoconductor drums 121 through 124.

Figure 14:
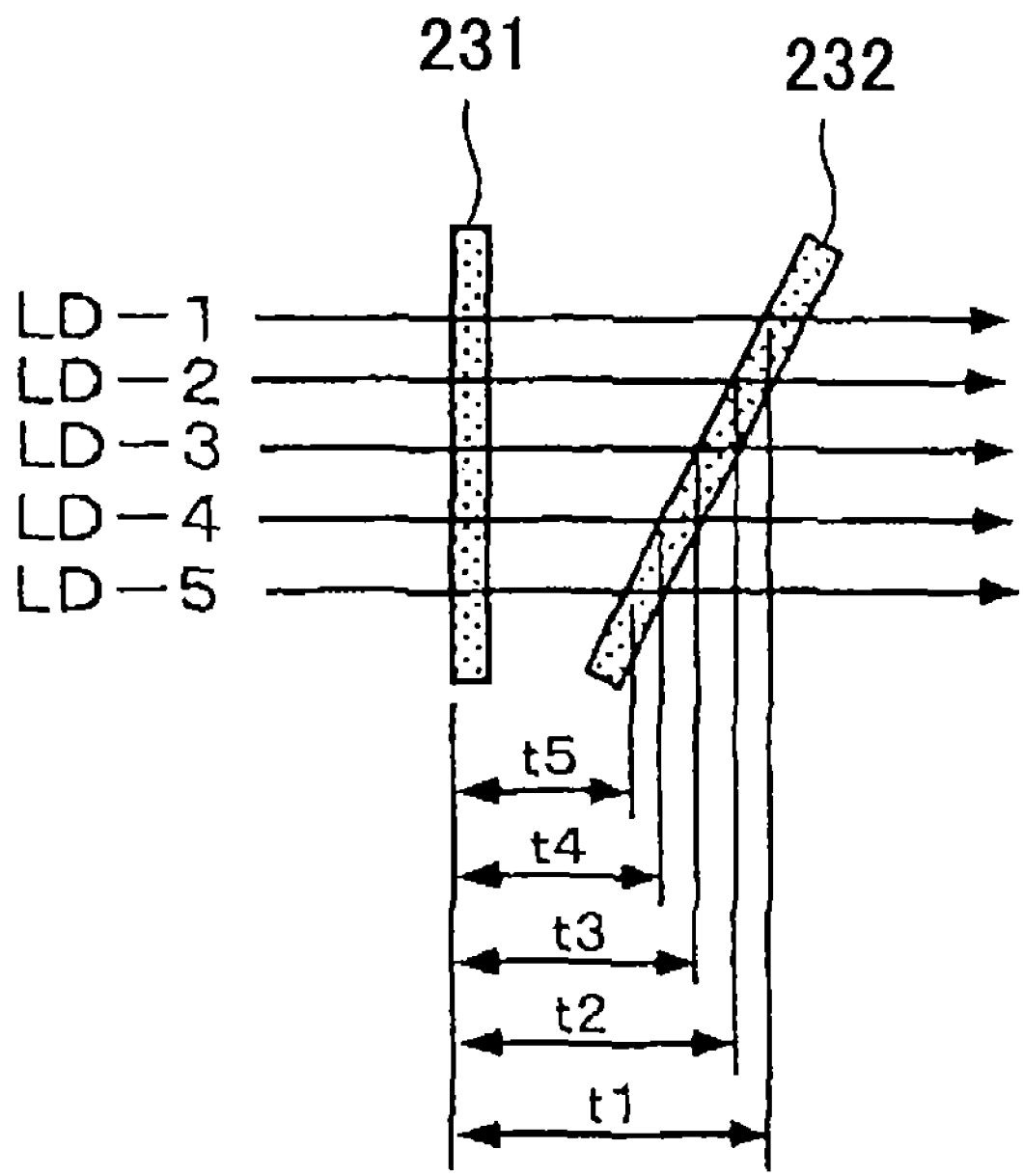
FIG. 14 is a diagram for explaining a sensor part for detecting the position of an optical beam with respect to the sub-scanning direction.

FIG. 14 is a diagram for explaining the sensor part 230 for detecting the position of an optical beam with respect to the sub-scanning direction.

The sensor part 230 has two PIN photodiodes 231 and 232 each of which has a linear acceptance surface. As shown in FIG. 14, the PIN photodiode 231 is disposed such that the longitudinal axis of the acceptance surface thereof is parallel to the sub-scanning direction, and the PIN photodiode 232 is disposed such that the longitudinal axis of the acceptance surface thereof is inclined to the sub-scanning direction. For each of the photoconductor drum 121 through 124, the sensor part 230 is provided and is mounted on a position of a common surface 233 out of a writing area of an optical path from the toroidal lens 211 to the photoconductor drum 121 as illustrated in FIG. 10. The common substrate 233 is fixed with screws 236 on the housing bottom surface 210 at the reference side of the above-mentioned slope adjustment of the toroidal lens 211 and others.

As shown in FIG. 14, each of the scanning optical spots LD-1 through LD-5 is projected to have a predetermined pitch with respect to the sub-scanning direction (the vertical direction in FIG. 14) with the adjacent optical spots. Thus, the optical spots LD-1 through LD-5 have different detection time t1 through t5, respectively, between the PIN photodiodes 231 and 232, as illustrated in FIG. 14. If the optical spots LD-1 through LD-5 are misaligned with respect to the sub-scanning direction, the detection time differences t1 through t5 are uniformly varied.

Accordingly, if an illuminant for forming an optical spot whose time difference is the closest to a predetermined time difference $t_0$ is selected, it is possible to achieve a minimum amount of misalignment of the head line and maintain an appropriate pitch between writing parts. Additionally, although the sensor part 230 is disposed at one end of the bottom surface 210 of the housing in the above-mentioned embodiment as illustrated in FIG. 10, two sensor parts 210 may be disposed at both ends of the bottom surface 210 with respect to the main scanning direction so as to detect not only misalignment with respect to the sub-scanning direction but also slopes of scanning lines.

Figure 15:
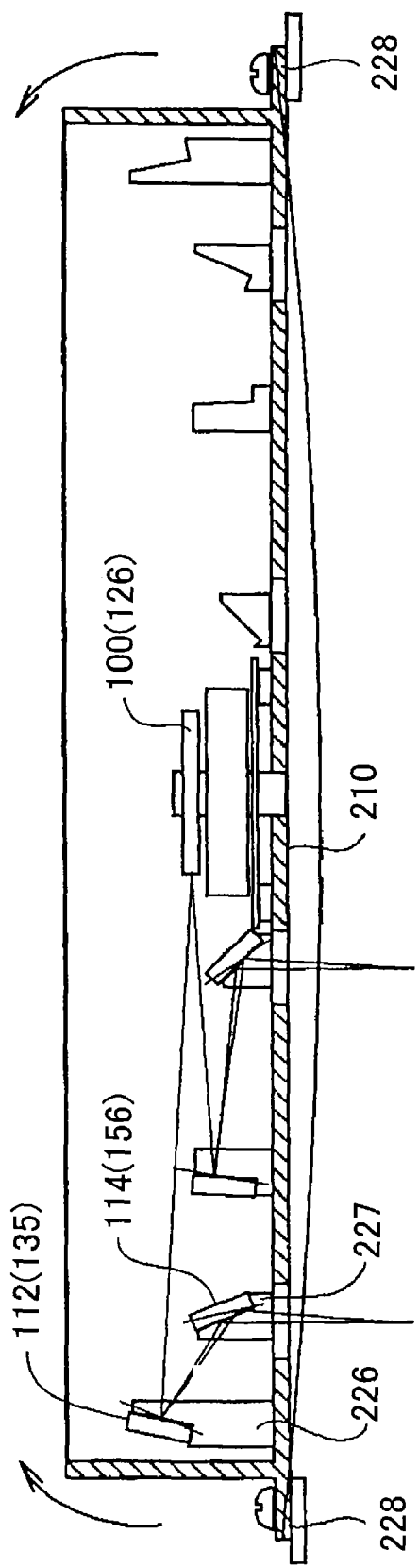
FIG. 15 is a diagram for explaining a curvature of the bottom surface of a housing for an optical scanner according to one embodiment of the present invention.

The housing for retaining optical elements of the optical scanner is often formed of a material whose thermal expansion coefficient is relatively large, for example, almi-diecast. For this reason, when the temperature of the interior of the housing rises, there is a risk that the housing bottom surface 210 may be curved, as illustrated in FIG. 15, in the lower direction from fastening parts 218 at both ends thereof.

If the housing bottom surface 200 is curved due to a temperature increase, there arises a risk that braces 226 for supporting the folding mirrors 112 and 114 (135 and 156 in FIG. 2, respectively), which are mounted on the housing bottom surface, may be also inclined. As a result, the reflection angle of the folding mirrors 112 and 114 may have inappropriate reflection angles. In this case, however, the folding mirrors 112 and 114 face each other. Thus, even if the reflection angles are changed, the change of reflection angles can be offset because the folding mirrors 112 and 114 are mutually displaced in the inverse direction. As a result, it is possible to effectively reduce variations of optical spots due to the curvature of the housing bottom surface 210.

The misalignment of the reaching positions of the optical beams is detected as a position difference of a scanning line with respect to the sub-scanning direction. Thus, it is not necessary to use the two folding mirrors 112 and 114 in the above fashion. One folding mirror may guide an optical beam deflected by the polygon mirror to the toroidal lens.

Additionally, although the convex surface of the toroidal lens faces a photoconductor drum in this embodiment, the concave surface of the toroidal lens may face the photoconductor drum.

A description will now be given, with reference to FIG. 16, of an image forming apparatus according to another embodiment of the present invention.

Figure 16:
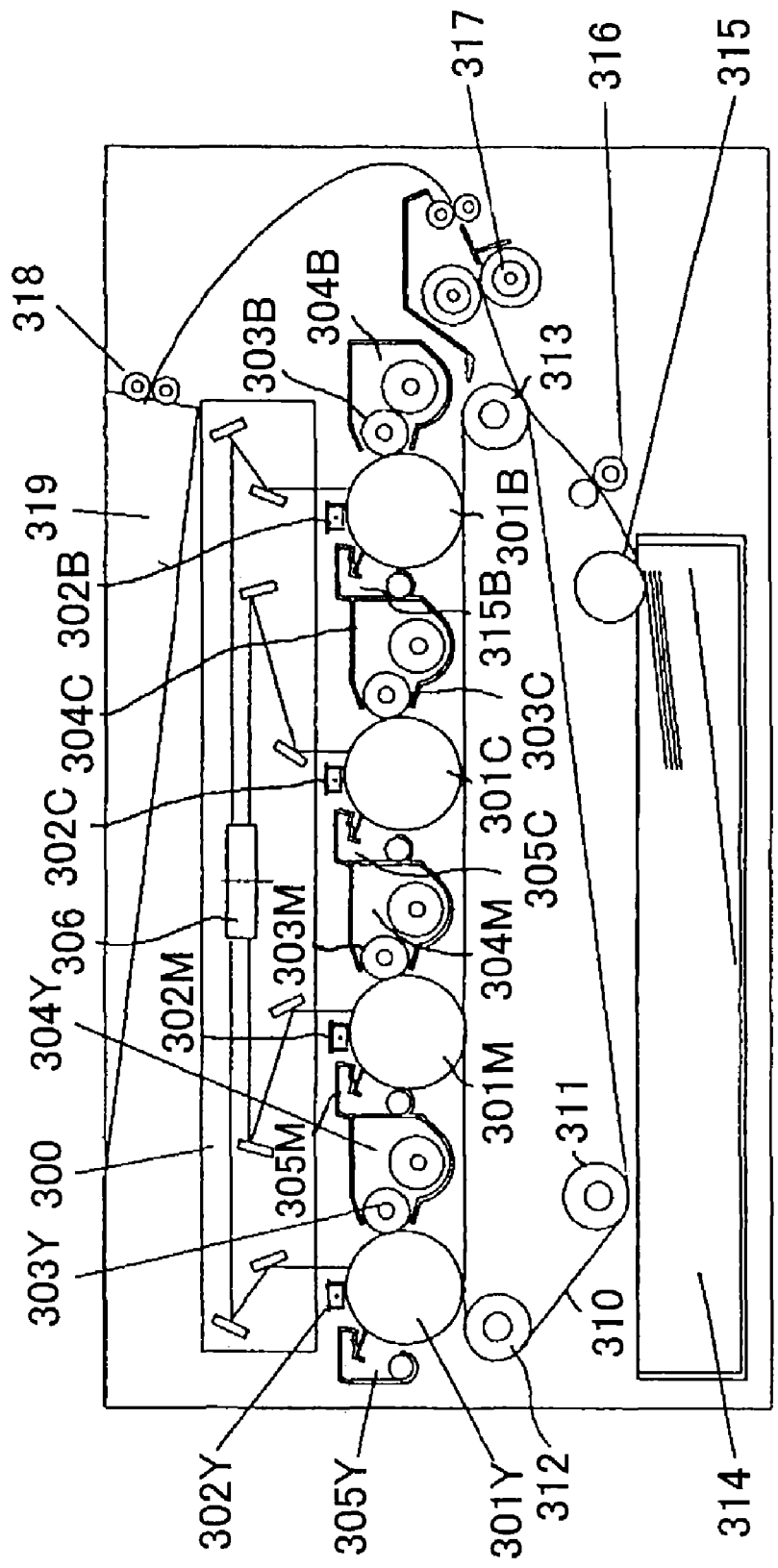
FIG. 16 is a diagram illustrating the structure of an image forming apparatus according to another embodiment of the present invention.

Referring to FIG. 16, the image forming apparatus is a tandem type color printer. Four photoconductor drums 301Y, 301M, 301C and 301B, which serve as image carriers, are arranged along the shift direction of a transfer belt 310, which serves as a transferred member. The image forming apparatus transfers different color toner images formed on the photoconductor drums 301Y, 301M, 301C and 301B sequentially onto the transfer belt 310 so as to form a full color image.

For example, the photoconductor drum 301Y has an electrifying charger 302Y, a developing roller 303Y, a toner cartridge 304Y and a cleaning case 305Y in the vicinity thereof. The electrifying charger 302Y electrifies the photoconductor drum 301Y at a high voltage. In order to make the resulting image visible, the developing roller 303Y attaches yellow toners to an electrostatic latent image recorded by an optical scanner 300. The toner cartridge 304Y supplies yellow toners to the developing roller 303Y. The cleaning case 305Y removes and collects remaining toners on the photoconductor drum 301Y. An image forming station for forming a yellow image has the above-mentioned configuration.

In this configuration, a plurality of lines of a source image (five lines in this embodiment) are simultaneously recorded on a photoconductor drum 301 for each surface of a polygon mirror 306 as mentioned later. As shown in FIG. 16, the above-mentioned image forming stations are arranged along the shift direction of the transfer belt 310 as the transferred member. Individual color toner images, that is, a yellow (Y) toner image, a magenta (M) toner image, a cyan (C) toner image and a black (B) toner image, are sequentially transferred and superposed onto the transfer belt 310 at an appropriate timing so as to form a full color image. Although the yellow image forming station has been intensively described, it is understood that each of the other color image forming stations fundamentally has the same configuration as the yellow image forming station except that different color toners are used. Regarding the other color image forming stations, thus, if the color indicative suffix Y is replaced with the other color indicative suffixes M, C and B, the other color image forming stations can be described in the similar fashion to the above-mentioned yellow image forming station and, therefore, a description thereof is omitted herein.

A record paper, which serves as a recording medium, is delivered from a paper trey 314 by a feeding roller 315. Then, a pair of resist rollers 316 sends the record paper in the sub-scanning direction synchronously with a record start timing. A color image is transferred from the transfer belt 310 onto the record paper. The transferred record paper is fused by a fusing roller 317 and is supplied to an output trey 319 by a pair of output rollers 318.

A description will now be given, with reference to FIG. 17, of cooperation between the individual photoconductor drums 301Y, 301M, 301C and 301B and the optical scanner 300. In this embodiment, individual optical scanners for scanning each of the four photoconductor drums 301Y, 301M, 301C and 301B are integrally configured as the single optical scanner 300. A polygon mirror 306 serves as a single deflecting part and is operative for all optical beams toward the photoconductor drums 301Y, 301M, 301C and 301B.

Two illuminant units 330 and 331 serve as illuminant parts. Each of the illuminant units 330 and 331 accommodates a pair of semiconductor lasers for emitting optical beams to be deflected on same surfaces of the polygon mirror 306. Each of the illuminant units 330 and 331 emits optical beams to the polygon mirror 306 such that the optical beams from the illuminant unit 330 enter the polygon mirror 306 opposite to those from the illuminant unit 331. After being deflected by the polygon mirror 306, the optical beams from the illuminant units 330 and 331 travel in different directions as illustrated in FIG. 17.

The optical beams from the illuminant units 330 and 331 arrive at the polygon mirror 306 through movable mirror modules 334 and 335, which serve as optical axis adjusting parts, and are deflected in the directions opposite to each other by the polygon mirror 306. As mentioned above, each of the illuminant units 330 and 331 emits two optical beams from the two semiconductor lasers therein such that the two optical beams travel separately with respect to the vertical direction. These optical beams, that is, the upper optical beams and the lower optical beams, from the illuminant units 330 and 331 enter same cylinder lenses 332 and 333, respectively, symmetrically away from the center axes of the cylinder lenses 332 and 333.

After being deflected by the polygon mirror 306, the deflected optical beams, which travel in the opposite directions each other, pass through similarly configured fθ lenses 336 and 337. As shown in FIG. 17, one of the two optical beams from the illuminant unit 330 is guided to the photoconductor drum 301Y via folding mirrors 338 and 339, and the other optical beam is guided to the photoconductor drum 601M via folding mirrors 340 and 341. Two toroidal lenses 342 and 343 are separately prepared for each of the two optical beams from the illuminant unit 330. On the other hand, the two optical beams from the illuminant unit 331 are guided to the photoconductor drums 301C and 301B in the same fashion. An image forming part of the image forming apparatus according to this embodiment comprises the fθ lenses 336 and 337, the folding mirrors 338, 339, 340 and 341, and the toroidal lenses 342 and 343.

A printed board is installed to the rear surface of each of the illuminant units 330 and 331. The printed board accommodates the semiconductor lasers, a holder for holding coupling lenses and a synthesizing prism, and a drive circuit for driving the semiconductor lasers. The illuminant units 330 and 331 can be rotated on a cylinder part from which optical beams are emitted to the exterior thereof, and thereby it is possible to fine-tune the positions of the upper and the lower optical beams with respect to the main scanning direction.

The fθ lenses 336 and 337 are hybrid lenses in a sense that each of the fθ lenses 336 and 337 is formed by coupling a thin-film aspheric component to a glass-grinded cylindrical lens by resin forming. Each of the toroidal lenses 342 and 343 integrally comprises an injection-molded lens part 345, a box-shaped rib part 348 to enclose the lens part 345, and a flange part 346. The flange part 346 projects from both ends of the rib part 348 with respect to main scanning direction. A gate part 347 from which resin is injected at molding time is provided to one end of the flange part 346.

Figure 17:
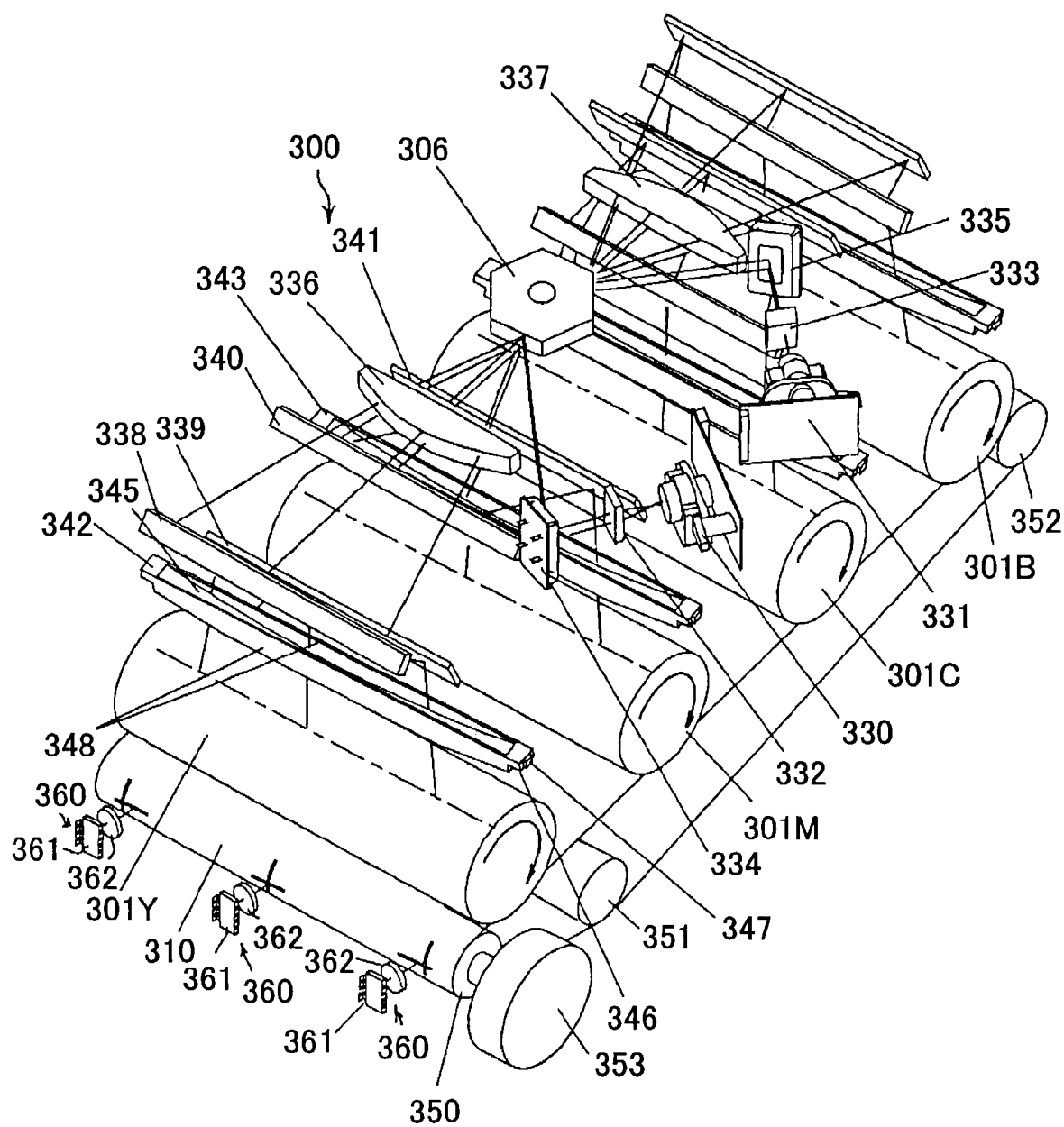
FIG. 17 is a diagram illustrating the structure of an image forming part of the image forming apparatus according to the embodiment.

Since the toroidal lenses 342 and 343 have wide bodies as illustrated in FIG. 17, there is a risk that the bodies may be uniformly curved depending on a condition of the molding. For example, when the toroidal lenses 342 and 343 are cooled down after the injection process, the toroidal lenses 342 and 343 may be uniformly curved depending on differences of cooling time in local areas of the bodies. For this reason, all the toroidal lenses of the image forming parts are uniformly oriented to the gate parts 347 thereof. Furthermore, the flange part 346 is shaped as a flat body so as to have a lower section modulus with respect to the sub-scanning direction than the lens part 345 reinforced by the rib part 348. Thereby, even if the toroidal lenses 342 and 343 receive some twist stress, it is possible to absorb the twist stress at the flange part 346.

The photoconductor drums 301Y, 301M, 301C and 301B are directly coupled to the axis of each motor and are rotated at a same drive frequency in the rotational direction as indicated by the curved arrows in FIG. 17. The transfer belt 310 is tensioned under predetermined tensile force by a driving roller 350 and two driven rollers 351 and 352. The driving roller 350 is rotated in the direction opposite to the photoconductor drums 301Y, 301M, 301C and 301B by a motor 353 connected thereto.

In this embodiment, each of the photoconductor drums 301Y, 301M, 301C and 301B is in contact with the transfer belt 310. The contact point is called as a transferring position. The transferring position is set such that an interval between adjacent transferring positions becomes an integer-multiple of the circumferential length of the driving roller 350. As a result, even if the driving roller 350 has a periodic speed variation due to eccentricity thereof and other factors, it is possible to apply the same phase of the periodic speed variation to each of the photoconductor drums 301Y, 301M, 301C and 301B.

Furthermore, as shown in FIG. 17, three detectors 360 are disposed at the center and the both ends of the transfer belt 310. The detectors 360 serve as resist difference detecting parts to detect reference positions of individual color images on the transfer belt 310.

Each of the detectors 360 comprises a CCD area sensor 361 and an objective lens 362. The detector 360 detects a cross-shaped detection pattern whose lines are drawn parallel to the main scanning direction and the sub-scanning direction as illustrated in FIG. 17. The detection pattern is formed of color toner images of the reference color (black) and the other colors (cyan, magenta and yellow). The three detectors 360 are capable of detecting an amount of a resist difference with respect to the sub-scanning direction based on the sub-scanning directional line of the cross-shaped detection pattern. Additionally, the detectors 360 are capable of detecting the slope of a scanning line based on a difference between two cross points of the cross-shaped detection patterns at the both ends of the transfer belt 310. Furthermore, the detectors 360 are capable of detecting the curvature of a scanning line based on a difference between the cross point of the detection pattern placed at the center of the transfer belt 310 and the middle point of the two cross points of the detection patterns at the both ends of the transfer belt 310.

Figure 18:
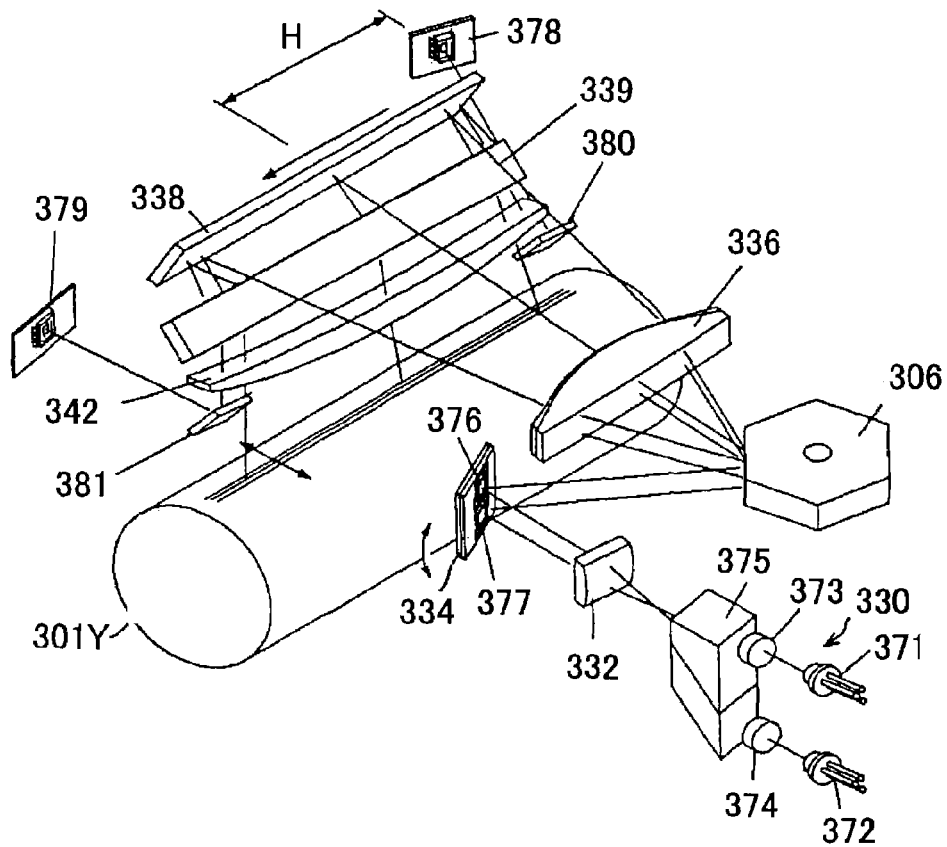
FIG. 18 is a diagram illustrating the structure of a portion of an optical scanner according to one embodiment of the present invention.

FIG. 18 shows the structure of an optical scanning part, which is a portion of the optical scanner 300, for the photoconductor drum 301Y in detail. Referring to FIG. 18, the illuminant unit 330 (331) comprises semiconductor lasers 371 and 372, coupling lenses 373 and 374 and a synthesizing prism 375. Each of the semiconductor lasers 371 and 372 exposes a photoconductor drum different from each other. The synthesizing prism 375 comprises a parallelogram part and a trapezium part.

Two optical beams from the semiconductor lasers 371 and 372 are converted into parallel luminous fluxes by the coupling lenses 373 and 374. The parallel luminous flexes enter the same surface of the synthesizing prism 375. The optical beam from the semiconductor laser 371 directly passes through the synthesizing prism 375, and, on the other hand, the optical from the semiconductor laser 372 is reflected on a pair of parallel reflection surfaces of the parallelogram part. The reflected optical beam travels adjacently to the optical beam from the semiconductor laser 371 such that the two optical beams have a predetermined convergence angle with respect to the sub-scanning direction.

After the two optical beams temporarily cross each other, the optical beams enter a cylinder lens 332 from positions away from the center axis of the cylinder lens 332, resulting in parallel optical beams of an interval of about 3 mm with respect to the sub-scanning direction. The optical beams enter the polygon mirror 306 via a movable mirror module 334. The movable mirror module 334 (335) serves as an optical axis adjusting part for adjusting the optical axes of the optical beams with respect to the sub-scanning direction through rotation on a twisted beam thereof as the rotation axis. After being deflected by the polygon mirror 306, one of the two optical beams is focused as an optical spot on the photoconductor drum 301Y via an fθ lens 336 and a toroidal lens 342. The fθ lens 336 is operative to the optical beam with respect to the main scanning direction. The toroidal lens 342 is operative to correct an optical face tangle error caused by the polygon mirror 306.

During formation of an image, a constant voltage is being applied to the movable mirror module 334 (335) so as to maintain movable mirrors 376 and 377 at predetermined slope angles.

Each of the semiconductor lasers 371 and 372 includes a plurality of illuminants. The illuminants are monolithically arranged at a pitch d of 10-20 μm. The illuminants may be arranged as an array in the sub-scanning direction. For the pitch d of the illuminants, if the above-mentioned image forming optical system is designed such that the sub-scanning lateral magnification β meets the formula;

$$\beta = P/d \ (P: \text{pixel pitch}),$$

it is possible to position optical spots at the pixel pitch P corresponding to a recording density.

In this embodiment, since two optical beams from the fθ lens 336 are separated at a predetermined interval with respect to the vertical direction, it is possible to guide the optical beam from the semiconductor laser 371 to the photoconductor drum 301Y by using the folding mirrors 338 and 339. In FIG. 18, the optical path of the optical beam from the semiconductor laser 372 are omitted. Although the movable mirror module 334 (335) controls optical beams for two color photoconductor drums, one movable mirror module may be provided for each color.

For each optical scanning part of the optical scanner 300, a synchronization detecting sensor 378 and an end detecting sensor 379, which constitute an optical detecting part, are disposed at the scanning start side and the scanning end side of an image recorded area, respectively. The synchronization detecting sensor 378 detects a writing start timing with respect to the main scanning direction. Through measurement of scanning time between the both sensors, a change of an image width (width magnification) is detected. Image frequency for modulating the semiconductor laser 371 is multiplied inversely to the detected image width so as to make the image width constant. As shown in FIG. 18, mirrors 380 and 381 are provided to guide the optical beam to the synchronization detecting sensor 378 and the end detecting sensor 379, respectively.

Figure 19:
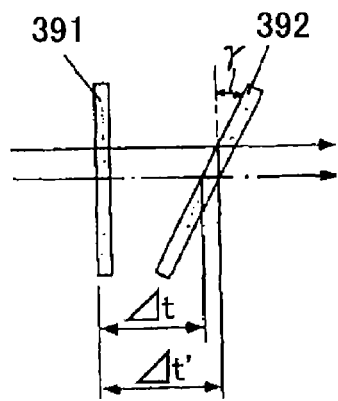
FIG. 19 is a cross-sectional view of a synchronization detecting sensor and an end detecting sensor according to one embodiment of the present invention.

As shown in FIG. 19, each of the synchronization detecting sensor 378 and the end detecting sensor 379 comprises a photodiode 391 orthogonal to the main scanning direction and a photodiode 392 that is not parallel to the main scanning direction. Just when an optical beam passes through an edge of the photodiode 391 of the synchronization detecting sensor 378/the end detecting sensor 379, a synchronization detecting signal/an ending detecting signal is generated. In order to find a sub-scanning directional position difference Δy of the optical beam, a difference Δt of passage time from the photodiode 391 to the photo diode 392 is measured.

Here, the sub-scanning directional position difference Δy is represented by the following formula;

$$\Delta y = (V/\tan \gamma) \cdot \Delta t,$$

where γ is the slope angle of the photodiode 392, and V is a scanning speed of the optical beam. If Δt is constant, it can be concluded that there is no position difference with respect to the sub-scanning direction. In this embodiment, Δy is computed as the average of values at the scanning start side and the scanning end side.

Figure 20A:
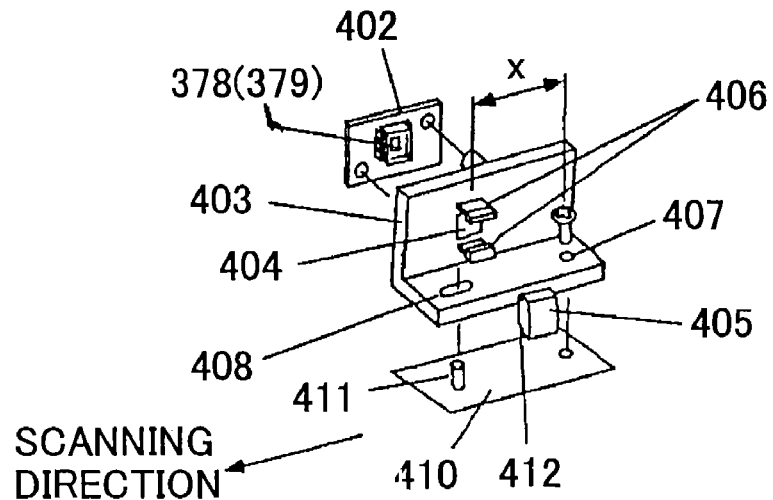
FIGS. 20A and 20B are cross-sectional views of an exemplary horizontally installed optical detecting part and an exemplary vertically installed optical detecting part, respectively, according to the present invention.
Figure 20B:
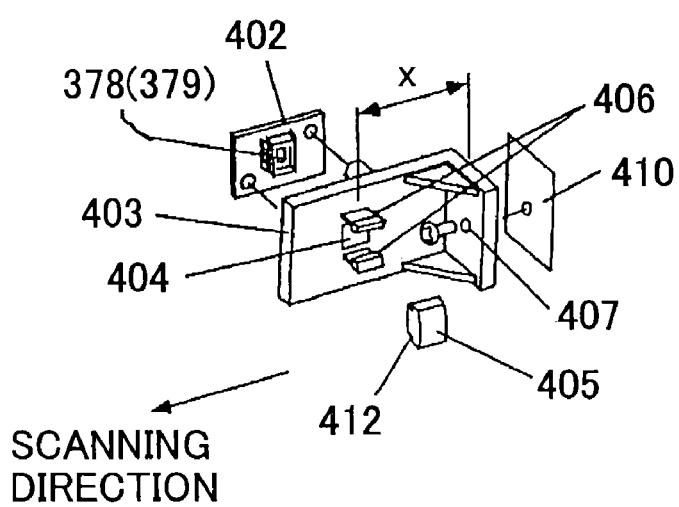

As shown in FIGS. 20A and 20B, the synchronization detecting sensor 378 and the ending detecting sensor 379 (optical detecting sensors) are supported by a mounting surface 410. FIG. 20A shows an exemplary optical detecting sensor that is installed horizontally to the mounting surface 410, and FIG. 20B shows an exemplary optical detecting sensor that is installed orthogonally to the mounting surface 410. In the following, the horizontally installed optical detecting sensor in FIG. 27A is focused.

The synchronization detecting sensor 378 (or the end detecting sensor 379) is screwed on a substrate 402 with an L-shaped resin holder 403. A step part 412 of an image forming lens 405 is caught to a square hole 404 with a pair of snaps 406 such that the synchronization detecting sensor 378 is oriented to the same direction as the optical axis of the image forming lens 405.

As shown in FIG. 20A, a reference hole 407 and a long hole 408 are provided on the bottom surface of the holder 403 so as to be positioned at backward and forward sides of the scanning direction, as indicated by the arrow, respectively, with respect to the center of the synchronization detecting sensor 378. A pin 411 is formed to project from the mounting surface 410 of an optical housing. The pin 411 is inserted into the long hole 408, and the holder 403 is screwed to the mounting surface 410 via the reference hole 407. Here, the end detecting sensor 379 has a holder that is configured symmetrically to the holder 403 for the synchronization detecting sensor 378.

The holder 403 is formed of a material that satisfies the following formula;

$$s \cdot x = S \cdot H,$$

where s is a thermal expansion coefficient of the holder 403, x is a distance between the synchronization detecting sensor 378 and the reference hole 407, S is a thermal expansion coefficient of the optical housing, and H is a distance between the center of an image with respect to the main scanning direction and the synchronization detecting sensor 113, which is a synchronization image height in this embodiment. Under this selection, even if the optical housing, which is formed of almi-diecast in this embodiment, extends due to temperature variations, the synchronization detecting sensor 378 has a steady sensor position. If S<s, a position difference is not large and therefore it is possible to detect variations of an image width with high accuracy.

In this embodiment, a hybrid lens is adopted as the fθ lens 336. The fθ lens 336 is mainly formed of a glass-grinded lens whose focal distance slightly varies in response to temperature variations. Alternatively, if a resin molded lens is used as the fθ lens 336, the focal distance varies, especially, due to refractive index variations and thermal expansion.

A change Δf of the focal distance is represented by the following formula;

$$\Delta f = \{(\Delta n - k)/(n-1)\} \cdot f \cdot \Delta T,$$

where Δn is a change of the refractive index of a resin material due to temperature, k is a thermal expansion coefficient, n is the refractive index of the resin material, f is a focal distance of all systems, and ΔT is a change of temperature.

Therefore, a difference Δθ of a scanning angle detected at a synchronization detecting position is represented by the following formula;

$$\Delta \theta = \{1/(1 + n0 \cdot \Delta T) - 1\} \cdot (H/f),$$

where n0 is a temperature coefficient of the focal distance and n0=(Δn−k)/(n−1), and H is a synchronization image height. The writing position has a difference corresponding to f·Δθ. However, if the distance x between the synchronization detecting sensor 378 and the reference hole 407 and the thermal expansion coefficient s of the holder 403 are set to satisfy the following formula;

$$s \cdot x = n0 \cdot H,$$

it is possible to cancel the writing position difference because of free expansion of the holder 403. Although the position difference due to variations of the focal distance is smaller than the above-mentioned position difference due to the optical housing, the fθ lens 336 may be designed under consideration of combination of these position difference.

A description will now be given, with reference to FIG. 21, of the structure of the movable mirror modules 334 and 335. The movable mirror module 334, (335) has a plurality of vibration modes (two modes in this embodiment) on a support substrate 421 shaped of a sintered metal. A first movable mirror 376 and a second movable mirror 377 are provided to the movable mirror module 334 (335) so as to be arranged parallel to the sub-scanning direction. The movable mirror module 334 (335) is sealed by a cap-shaped cover 425. An optical beam travels through a glass window 424 on an aperture of the cover 425.

A movable mirror substrate is configured by joining two Si substrates 426 and 427 via an insulation film. The first Si substrate 426 is formed of an Si substrate of 60 μm in thickness. As shown in FIG. 21, the first movable mirror 376, the second movable mirror 377, a first twisted beam 428 for supporting the first movable mirror 376 and a second twisted beam 429 for supporting the second movable mirror 377 are formed by etching on a fixing frame 430. The first twisted beam 428 and the second twisted beam 429 are disposed parallel to the main scanning direction.

Figure 21:
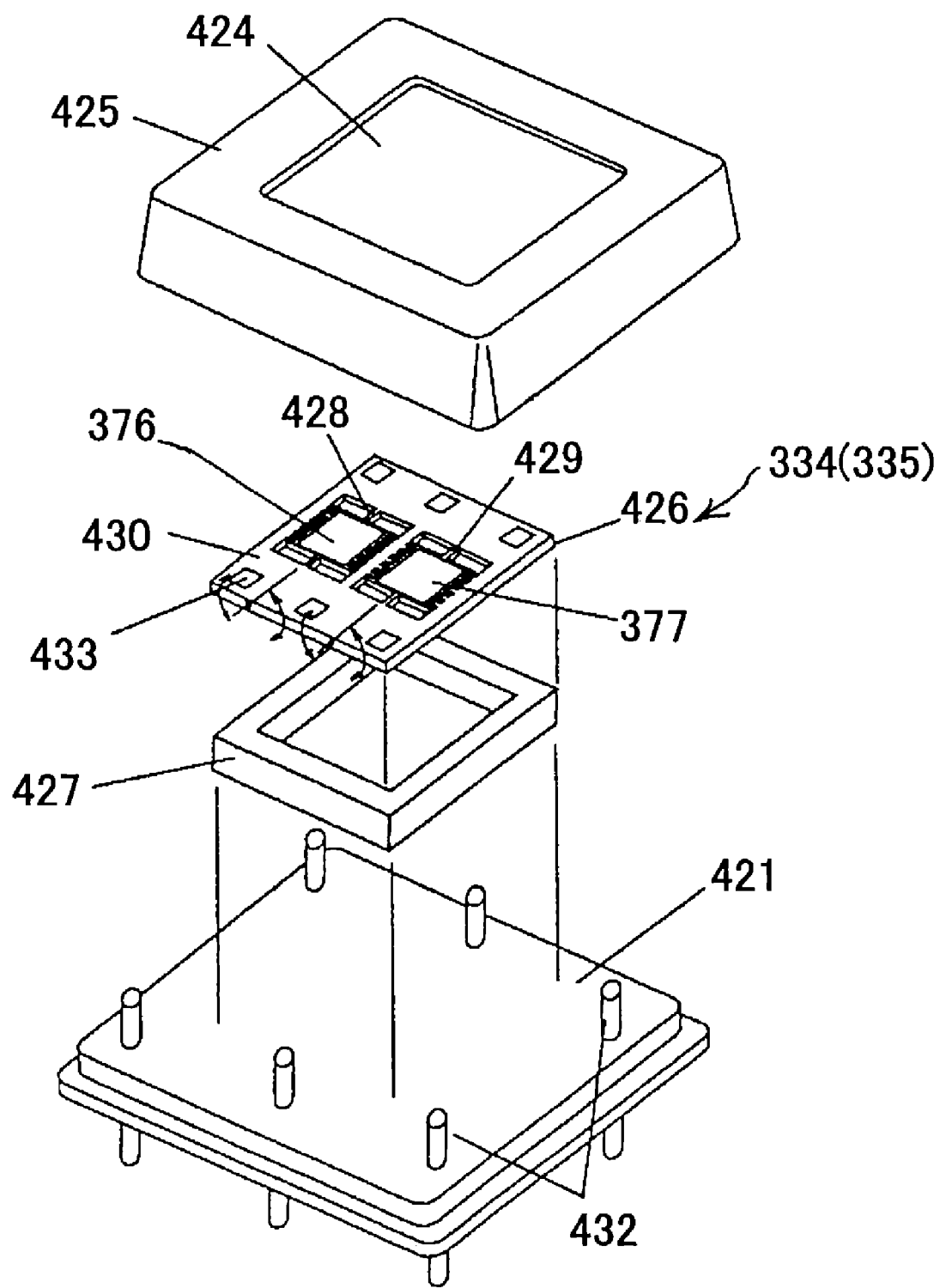
FIG. 21 is a cross-sectional view of an exemplary movable mirror module as an optical axis adjusting part according to the present invention.

A shown in FIG. 21, teeth are formed at both edge parts of the movable mirrors 376 and 377. Teeth are formed at the opposite side of the fixing frame 430 to the teeth of the movable mirrors 376 and 377 so as to engage the teeth of the fixing frame 430 with the teeth of the movable mirrors 376 and 377.

A metal film such as Au is deposited on the surfaces of the movable mirrors 376 and 377 and the teeth of the fixing frame 430. The teeth of both edges of the movable mirrors 376 and 377 serve as a first and a second movable electrodes, respectively. The teeth of the fixing frame 430 opposite to the first and the second movable electrodes serve as a first and a second fixed electrodes, respectively. The surfaces of the movable mirrors 376 and 377 are deposited with an oxide film or the like so as to have a stress difference between the front and the back surfaces of the substrate. Thereby, the twisted beams 428 and 429 are twisted so that the movable mirrors 376 and 377 can be inclined on more than predetermined angle at unloaded time. When a voltage is applied to the first and the second fixed electrodes, electrostatic force is generated between the fixed electrodes and the opposite movable electrodes. As a result, the movable mirrors 376 and 377 are separately rotated by small angles in a direction where the movable mirrors 376 and 377 are horizontally orientated, and the slopes of the movable mirrors 376 and 377 are determined to be balanced with the twisted beams 428 and 429, respectively.

In this embodiment, it is possible to shift a scanning position by about 5 μm per the slope angle of 1' of the movable mirrors 376 and 377.

As mentioned later, as the twisted beams 428 and 429 have a smaller width c and a greater length L, the swing angle θ of the movable mirrors 376 and 377 becomes greater. However, if a resonance frequency is low, the twisted beams 428 and 429 resonate due to vibration transmission involved in rotation of a drive motor and others. Therefore, it is preferable that the twisted beams 428 and 429 be set to have a sufficiently high resonance frequency (more than 200 Hz).

It is supposed that the movable mirrors 376 and 377 have $2a$ a in length, $2b$ in width and d in height and the twisted beams 428 and 429 have L in length and c in width. Then, the spring constant K of the twisted beams 428 and 429 is given by the following formula;

$$K = (G/2L) \cdot \{cd(c^2 + d^2)/12\},$$

where G is a material constant.

On the other hand, electrostatic force F between the electrodes is given by the following formula;

$$F = \in HV^2/2 \, \delta,$$

where ∈ is a dielectric constant of air, H is a length of the electrodes, V is an applied voltage, and δ is a distance between the electrodes. A rotation torque T for driving the movable mirrors 376 and 378 is given by the following formula;

$$T = F \cdot 2b.$$

Thus, the swing angle θ is represented by the following formulae;

$$\theta = T/K = B \cdot bH \cdot V^2/\delta \cdot \{cd(c^2 + d^2)/L\},$$

where B is a constant.

As a result, when the applied voltage V is controlled, it is possible to set the swing angle θ as a predetermined value.

From the above formulae, it is concluded that as the electrode length H is larger, the swing angle θ is greater. As a result, as the electrodes are formed as teeth as in this embodiment, it is possible to obtain 2n torque for the number n of teeth. In order to enhance response, furthermore, a moment of inertia is attempted to be reduced. In order to reduce the moment of inertia, it is necessary to decrease the weight of the movable mirrors 376 and 377 by cutting off the back side of the movable mirrors 376 and 377. In order to minimize influences of viscous resistance of air such as damping, the movable mirrors 376 and 377 are sealed with the cover 425 so that the sealed interior can have low pressure.

The second substrate 427 is formed of an Si substrate of 200 μm in thickness. The second substrate 427 supports a support part of the first Si substrate 426 through the center aperture thereof as illustrated in FIG. 21. The center aperture provides a swing area for the movable mirrors 376 and 377. Lead terminals 432 are inserted into the support substrate 421 via an insulation member. Pad parts 433, which are connected to individual fixed electrodes on the substrate surface, are connected to terminal parts, which project toward the upper sides of the lead terminals 432, by wire bonding. Thereby, electric wiring between the interior and the exterior of the sealed package is implemented.

The cover 425 is embedded in the stepping part formed around the circumference of the support substrate 421. The glass window 424 is coupled to the aperture from the inner side of the cover 425. Although the movable mirrors 376 and 377 are driven by electrostatic force according to the above-mentioned embodiment, the movable mirrors 376 and 377 may be driven by a piezoelectric element and the like.

Figure 22:
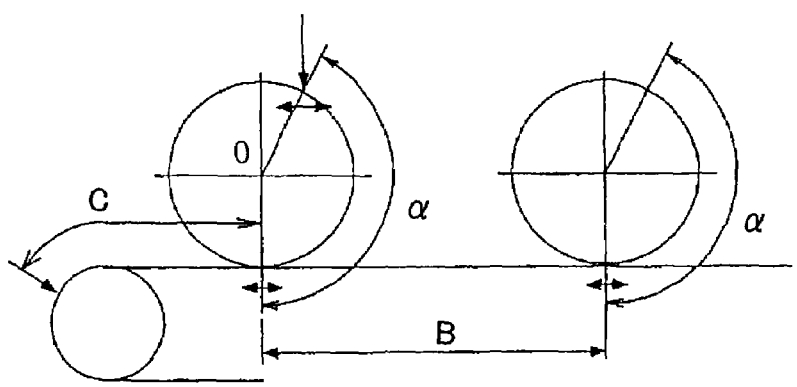
FIG. 22 is a diagram illustrating a writing position and a transferring position on a photoconductor drum.

FIG. 22 shows a relation between the writing position and the transferring position on the photoconductor drum 301.

In FIG. 22, the notation O represents the rotational center of the photoconductor drum 301. The angle between the writing position and the transferring position is set as α. As a result, if the photoconductor drum 301 is rotated at a predetermined angular velocity, the photoconductor drum 301 is rotated at a constant time t from the writing position to the transferring position.

Based on the above-mentioned detection pattern, the individual color resist positions with respect to the sub-scanning direction are detected. For each resist position, the writing timing is periodically adjusted per a pitch P of a scanning line for every other surface of the polygon mirror 306 so as to align the resist positions with respect to the sub-scanning direction. Then, the diameter D of the photoconductor drum 301 is represented by the following formula;

$$D \cdot \alpha/2 = N \cdot P + \Delta P,$$

where N is a natural number, and ΔP is a writing start timing difference due to a phase difference between synchronization detecting timings. Also, transferring position interval B between each of the color photoconductor drums and the reference color photoconductor drum are given by the following formula;

$$B = M \cdot P + \Delta P,$$

where M is a natural number.

Thus, even if D, α and B are different from each other, it is possible to make the rotational speed constant. As long as the writing position is not changed, only the difference ΔP between the individual writing start timings persists.

The difference ΔP is at most half an pitch, that is, ΔP≦P/2, and the optical axis of an optical beam is shifted in the sub-scanning direction by ΔP by using the movable mirrors 376 and 377 to make the difference ΔP zero.

Meanwhile, a semiconductor laser array, on which five illuminants are monolithically formed, is used in this embodiment to simultaneously scan five lines for each surface of the polygon mirror 306. Also, in this case, the writing start timings are adjusted in the same fashion.

Figure 23:
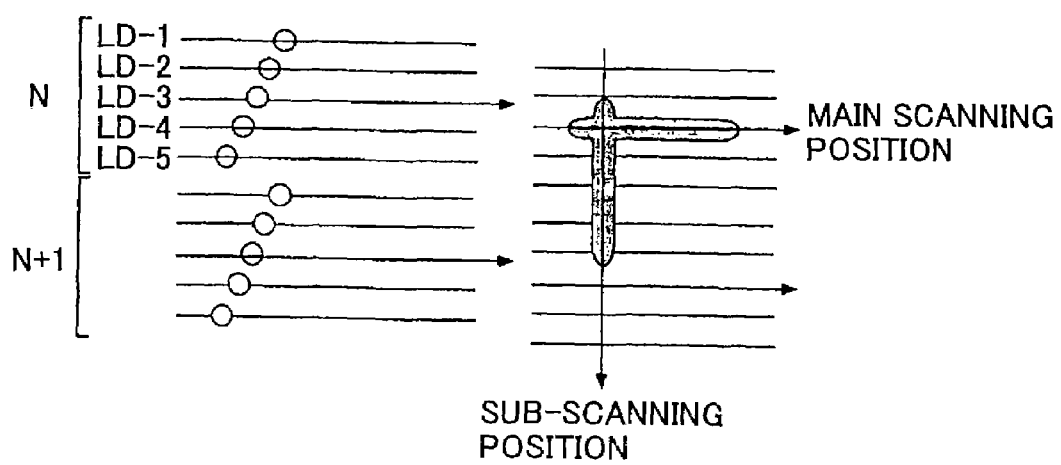
FIG. 23 is a diagram illustrating an arrangement of beam spots on a photoconductor drum.

As shown in FIG. 23, a plurality of beam spots are arranged at the pitch P on a photoconductor drum 301 corresponding to the recording density with respect to the sub-scanning direction. An optical beam for writing the head position is selected among a plurality of optical beams LD-1, LD-2, LD-3, LD-4 and LD-5 all of which are reflected on a same surface of the polygon mirror 306. In this selection, the optical beam that has the smallest difference with a reference color resist position (right side) is selected, that is, the optical beam LD-4 is selected in FIG. 23. Therefore, only the writing start timing difference ΔP persists in this case. In FIG. 23, the notations N and N+1 indicate the surface number of the polygon mirror 306.

Figure 24:
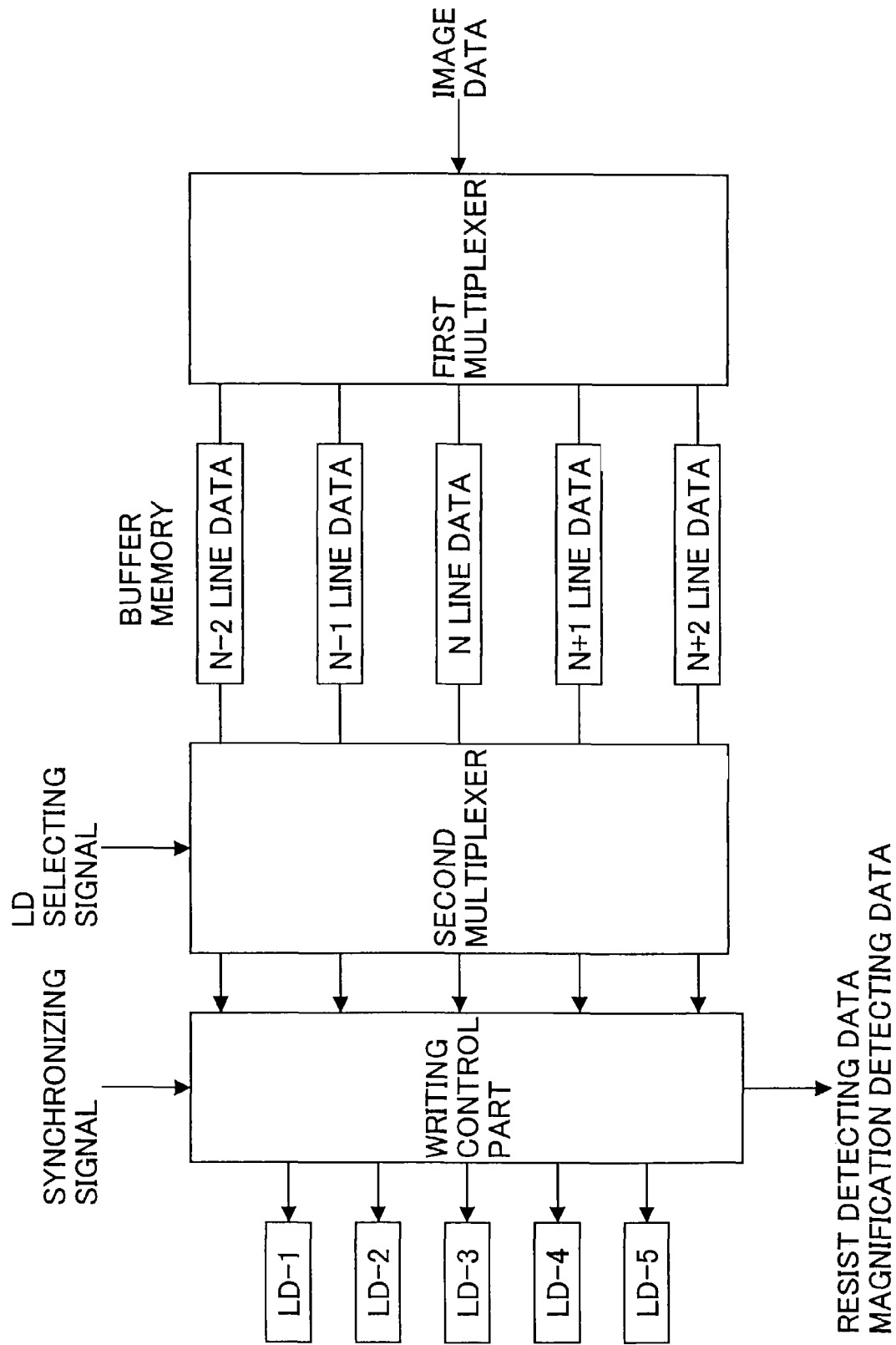
FIG. 24 is a block diagram of a control mechanism for correcting a difference of writing start timings.

FIG. 24 is a block diagram of a control mechanism for correcting a difference of writing starting timings. Every five lines of image data are distributed by a first multiplexer. The lines are temporarily stored in a buffer memory. Based on reference position data, a second multiplexer selects an optical beam for writing the head row and switches the current control into the semiconductor laser emitting the selected optical beam.

The stored data are read from the buffer memory synchronously with a synchronizing signal for each surface of the polygon mirror 306. Data that have not been recorded on this surface of the polygon mirror 306 are stored until the next surface of the polygon mirror 306, and then the data are recorded at the next surface of the polygon mirror 306.

At this time, a writing control part resets a writing start timing of an image with respect to the main scanning direction for each image forming station by using a synchronization detecting signal as a trigger. The writing control part determines the writing start timing based on detection of resist positions with respect to the main scanning direction such that the center position of an image area for the reference color coincides with the center positions of image areas for the other individual colors. As a result, it is possible to properly superpose the individual image areas.

The above-mentioned sub-scanning and the main scanning resist positions are periodically set suitably to an environment of an image forming apparatus during start-up time before printing or a waiting time between jobs.

In this embodiment, the above-mentioned detection method of a resist position difference uses an image recorded on the transfer belt 310. However, the detection method of a resist position difference is not limited to the above-mentioned fashion based on the image on the transfer belt 310. For instance, the sensor as shown in FIG. 19 may be used to detect the sub-scanning position of an optical beam in the optical scanner, and the optical beam that is the closest to a predetermined reference value of the time difference Δt may be selected as the optical beam for writing the head row.

Since each of the optical beams LD-1, LD-2, LD-3, LD-4 and LD-5 scans away each other at a predetermined pitch with respect to the sub-scanning direction, differences t1 through t5 of detection time between the PIN photodiodes 391 and 392 are different from each other. If the sub-scanning position is misaligned, these differences t1 through t5 increase or decrease uniformly. Therefore, by selecting the optical beam closest to a predetermined reference value of the time difference Δt and inclining the movable mirrors 376 and 377 so as to coincide with the reference value of Δt, it is possible to make the position difference of the head row approximately 0 and maintain constant intervals between the individual color scanning positions.

For each image forming station, the synchronization detecting sensor 378 and the end detecting sensor 379 are supported in the optical housing by the holder 403. In order to guide optical beams to the synchronization detecting sensor 378 and the end detecting sensor 379, as shown in FIG. 18, the optical beams are folded at the both ends out of the writing area of the optical path between the toroidal lens 342 and the photoconductor drum 301Y by the mirrors 380 and 381 mounted to the optical housing.

Figure 25:
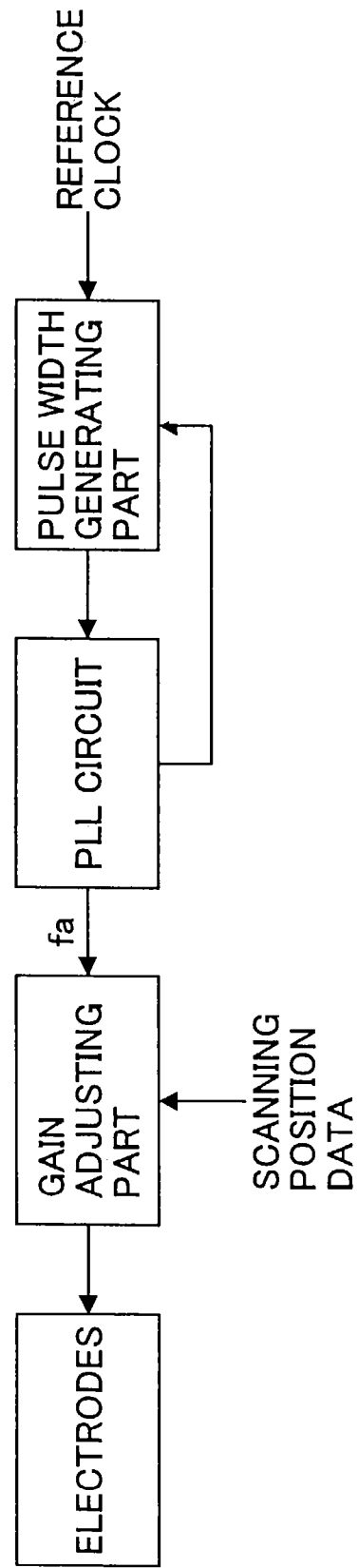
FIG. 25 is a block diagram of a drive circuit for driving a movable mirror.

FIG. 25 is a block diagram of a drive circuit for driving the movable mirrors 376 and 377. Referring to FIG. 25, a voltage applied to individual electrodes is increased or decreased by the gain adjusting part depending on the time difference Δt detected by the above-mentioned sensors 378 and 379. The slopes of the movable mirrors 376 and 377 are feedback-controlled such that the time difference Δt coincides with the predetermined reference value thereof.

Also, the gain adjusting part periodically resets the reference value of the time difference Δt based on a resist difference δ detected through a detection pattern recorded on the transfer belt 310.

In this embodiment, since the sensors 378 and 379 are disposed in the vicinity of the photoconductor drum 301, the resist difference δ is approximately in proportion to the time difference Δt. Thus, the time difference Δt is determined based on the following formula;

$$\Delta t = j \cdot \delta,$$

where j is a predetermined coefficient.

Therefore, it is also possible to prevent the resist difference on the photoconductor drum 301. Here, the slopes of the movable mirrors 376 and 377 are set when the power supply is switched ON or between printing jobs. At least, when an image is recorded, a voltage is applied to maintain the slopes that have been set in advance.

As mentioned above, the optical scanner according to this embodiment periodically resets the time difference Δt based on the detected resist difference on the transfer belt 310 and monitors for the resist positions with respect to the sub-scanning direction by using the sensors 378 and 379 in the optical housing.

Figure 26:
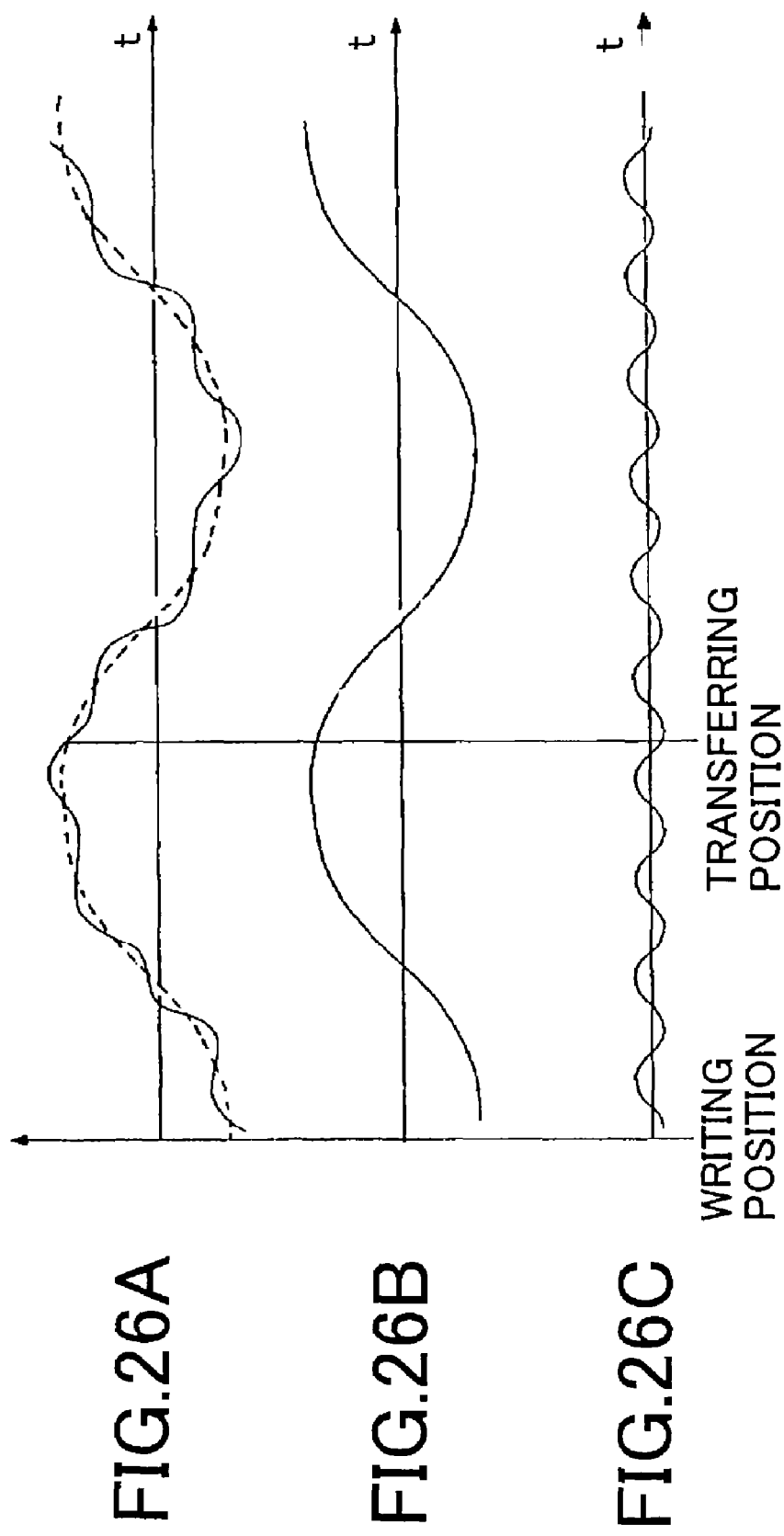
FIGS. 26A through 26C are diagram illustrating exemplary variations of a recording pitch with respect to a sub-scanning direction.

FIG. 26A shows an exemplary variation of a recording pitch on an image with respect to the sub-scanning direction. This variation is generated, for example, from a composite of large undulations in FIG. 26B and a small undulations in FIG. 26C. The large undulations in FIG. 26B are caused by a speed variation of the photoconductor drum 301 per the period of one rotation thereof, and the small undulations in FIG. 26C are caused by a speed variation of the transfer belt 310 per the period of one rotation of the driving roller 350. Even if individual writing timings coincide with each other, the resist positions are periodically varied due to the speed variations.

In order to reduce the resist difference due to the speed variations, the individual color transferring positions are conventionally set to have intervals (station intervals) equal to an integral multiple of the circumferential lengths of both the photoconductor drum 301 and the driving roller 350. As a result, it is possible to make the circumferential speeds of the photoconductor drums 301 and the transfer belt 310 at the transferring position equal for each color at transferring time.

Similarly, it is impossible to take an accurate measurement at the resist detecting positions if the individual color circumferential speeds do not coincide with each other. In particular, if the shift speed of the transfer belt 310 is used to compute a difference, the difference between the circumferential speeds cannot be ignored.

For this reason, the optical scanner according to this embodiment can set a distance between the transferring positions and the resist detecting positions of the individual image forming stations, that is, $$I = C + k \cdot B, \ k=0, 1, 2, 3,$$

to an integral multiple of the circumferential length of the driving roller 350. As a result, it is possible to make the circumferential speed of the transfer belt 310 equal for each color at detecting time.

Heretofore, the description has been focused on the case of uniform difference of the resist positions. However, even if the transfer belt 310 moves at periodically changing speeds due to speed variations of the driving roller 350, it is possible to eliminate resist position differences under the same configuration of the optical scanner according to the present invention.

In the above description, it has been demonstrated that a difference of resist positions that is regularly caused can be suppressed by designing arrangement. However, there may be a difference of resist positions that is irregularly caused by load variations of the driven rollers 351 and 352 that are used to tension the transfer belt 310. According to the present invention, it is also possible to effectively correct such an irregular difference of resist positions.

In this case, an amplitude and a frequency are detected by forming an encoder of the motor 353 coupled to the driving roller 350 and a caterpillar pattern on the transfer belt 310. Then, the detected amplitude and frequency are supplied to the gain adjusting part for controlling the movable mirrors 376 and 377 so that the movable mirrors 376 and 377 can oscillate at a constant frequency. When phases are adjusted such that scanning positions have polarities inversed to the speed variation, it is possible to cancel variations of resist positions due to the speed variation.

Here, it is possible to make the phases uniform by forming a resist mark at one point on the transfer belt 310.

Figure 27:
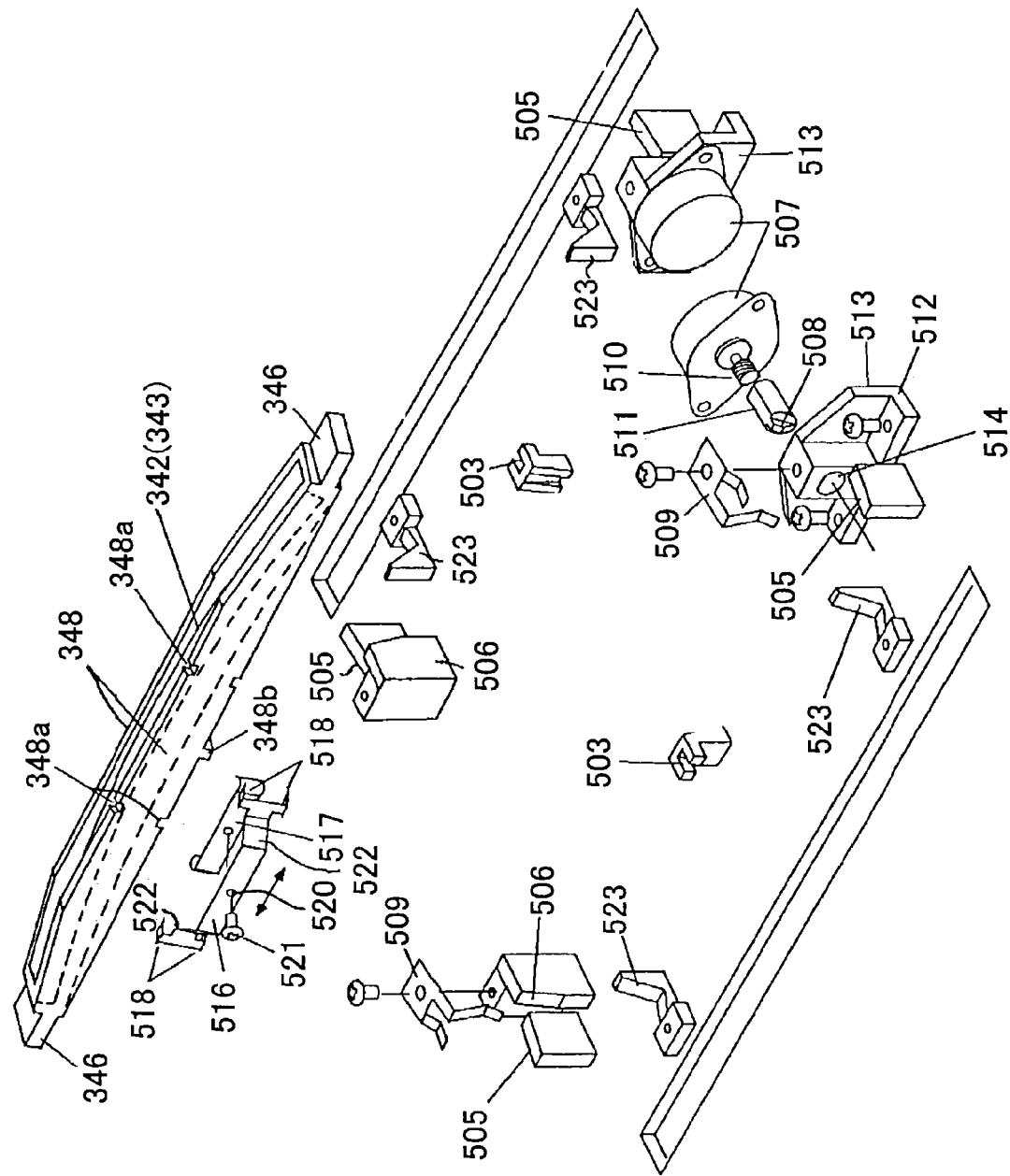
FIG. 27 is an exploded perspective view of a correction mechanism for correcting slope and curvature of a scanning line.

A description will now be given, with reference to FIG. 27, of a correction mechanism for correcting the slope and the curvature of a scanning line. FIG. 27 is an exploded perspective view of the correction mechanism from the photoconductor drum 601 to the bottom surface of the optical housing.

A toroidal lens 342 (343) is disposed on the bottom surface of the optical housing to face the photoconductor drum 301. Each of the toroidal lenses are uniformly oriented with respect to optical axis direction and the sub-scanning direction each other. A protrusion 348b at the center of a box-shaped rib part 648 is coupled to a concave part 503 of the optical housing. Regarding the main scanning direction (longitudinal axis direction), the optical axis direction of the toroidal lens 342 is determined by placing the undersurfaces of flange parts 346, which are provided at the both ends of the rib part 348, on reference surfaces 505 as illustrated in FIG. 27. Regarding the sub-scanning direction, one end of the rib part 348 is in contact with a reference block part 506 in the optical housing. The other end of the rib part 348 is in contact with a movable block part 508 coupled to a stepping motor 507. The movable block part 508 can move parallel to the bottom surface of the optical housing. A blade spring 509 provides a pressure in the optical axis direction and the sub-scanning direction.

A feed screw 510 is formed on the axis of the stepping motor 507 so as to couple a D-shaped cylinder part 511 on the movable block part 508. The D-shaped cylinder part 511 is inserted into a D-shaped hole 514 of a motor support member 512 and is screwed to a perpendicular surface 513. Thereby, it is possible to shift a block position of the movable block part 508 against the toroidal lens 342 (343) by pulling or pushing the D-shaped cylinder part 511 in the axis direction through rotation of the motor.

In this configuration, since the toroidal lens 342 (343) is rotated on a plane orthogonal to the optical axis by using the reference block side as a fulcrum and the slope of the focal line of the toroidal lens 342 (343) is changed, it is possible to adjust the slope of a scanning line.

The toroidal lenses for forming the other color images except black are configured to have the same mechanism by aligning the reference block sides thereof. Based on a detection result detected by the detectors 360, the other color scanning lines are aligned parallel to each other with reference to the scanning line for black. In FIG. 27, mounting parts 523 of folding mirrors is provided on the bottom surface of the optical housing.

A description will now be given of a curvature correction mechanism for correcting the curvature of a scanning line.

As shown in FIG. 27, a pair of a first metal plate 516 and a second metal plate 517 are provided to the surface opposite to the sub-scanning directional block of the box-shaped rib part 348 of the toroidal lens 342 (343). As shown in FIG. 27, the first metal plate 516 is knob-shaped, and the second metal plate 517 has curved ends.

The first metal plate 516 is supported by catching bent parts 518, which are provided to four corners thereof, to concave parts 348a of the box-shaped rib part 348. An adjusting screw 521 is inserted into a center hole 520, and thereby the first metal plate 516 is pulled to the second metal plate 517 via the center hole 520. Then, since the curved ends are in contact with the inner surfaces of a slope part 522, it is possible to adjust the slope angle of the slope part 522. When compressive force or tensile force is provided between the bent parts 518 of the box-shaped rib part 348 with respect to the longitudinal axis direction, it is possible to curve the focal line of the toroidal lens 342 (343) in the sub-scanning direction.

In detail, when compressive force is provided, the toroidal lens 342 (342) is concave toward the pair of the metal plates 516 and 517. In contrast, when tensile force is provided, the toroidal lens 342 (343) is convex toward the pair of the metal plates 516 and 517. For all colors including black, the toroidal lenses are provided to have the above-mentioned configuration. In this configuration, the toroidal lens is capable of correcting the curvature of a scanning line involved in obliquely incident optical beams to the polygon mirror 306. Furthermore, the toroidal lens is capable of also correcting the curvature of a scanning line due to placement errors of optical elements constituting the optical scanner. As a result, it is possible to improve linearity of the optical beams.

Here, when the detectors 360 detect a difference between resist positions with respect to the main scanning direction or the sub-scanning direction, it is sufficient to correct the difference between resist positions just by correcting timings for writing images. Therefore, it is possible to superpose individual images recorded by the image forming stations with high accuracy and form a high-quality full color image without any color displacement.

In the above-mentioned embodiments, two movable mirror modules 334 and 335 are provided as the optical axis adjusting part. However, the optical axis adjusting part may be configured as a single movable mirror module integrally including all movable mirrors corresponding to four image forming stations.

Figure 28:
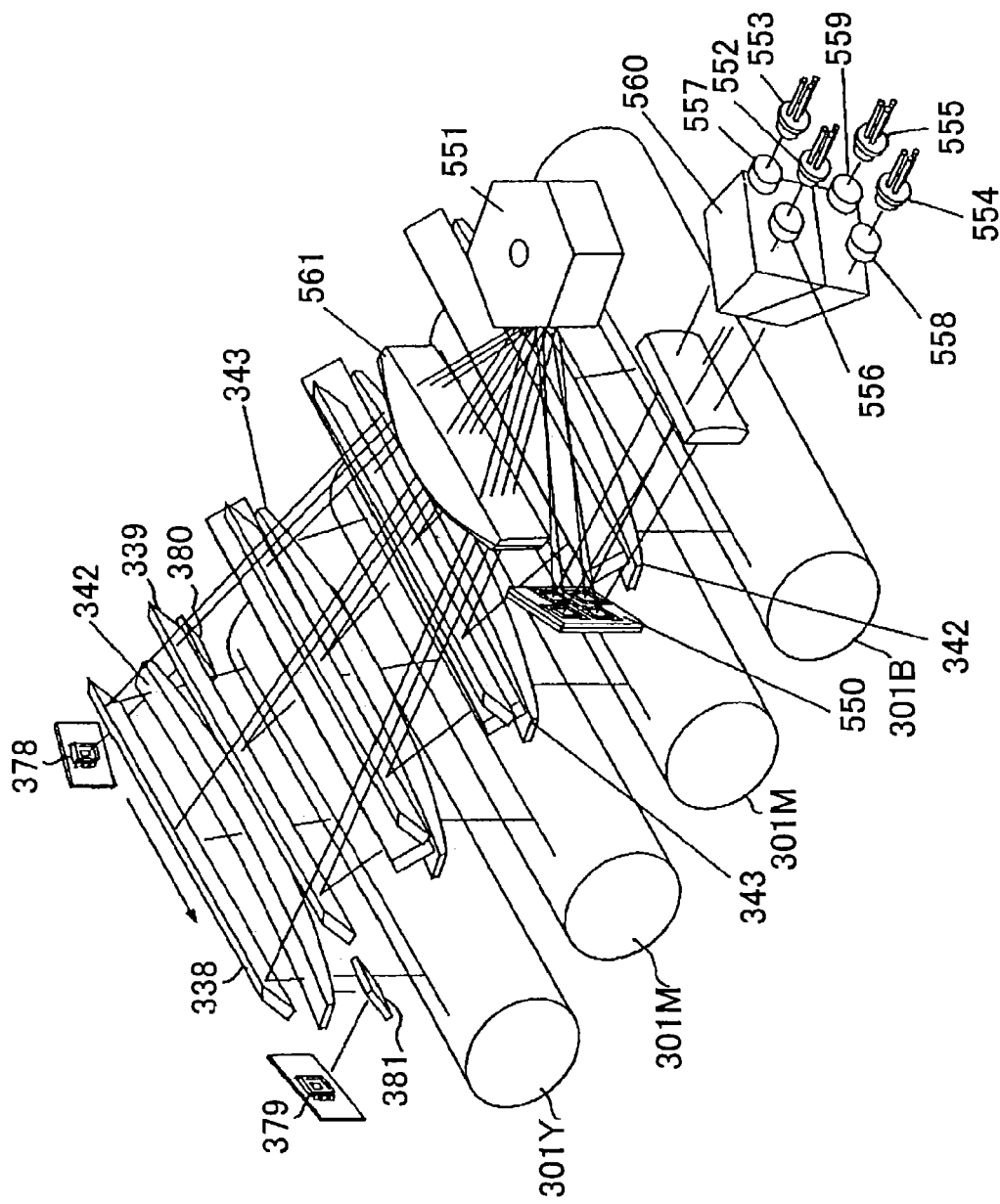
FIG. 28 is a diagram illustrating the structure of a variation of the image forming part according to the present invention.

FIG. 28 shows an exemplary single movable mirror module 550 that integrally accommodates four movable mirrors corresponding to four image forming stations wherein the movable mirrors are arranged as a hound's-tooth pattern as illustrated.

In the above-mentioned embodiment, the optical scanner 300 in FIG. 17 is configured such that the polygon mirror 306 deflects optical beams in two directions by simultaneously using two surfaces thereof. In an optical scanner according to this embodiment, a polygon mirror 551 deflects optical beams by simultaneously using just one surface thereof as illustrated in FIG. 28.

Four optical beams from semiconductor lasers 552, 553, 554 and 555 pass through coupling lenses 556, 557, 558 and 559, respectively, and then enter a synthesizing prism 560, which can be rotated on the optical axis thereof by a predetermined angle. The optical beams enter one surface of the polygon mirror 551. In the vicinity of the surface of the polygon mirror 551, the optical beams cross each other with respect to the main scanning direction and travel at a predetermined pitch parallel to each other with respect to the sub-scanning direction. A common fθ lens 561 is prepared for the four optical beams. A plurality of folding mirrors are disposed such that the four optical beams have an equal optical path length.

Figure 29:
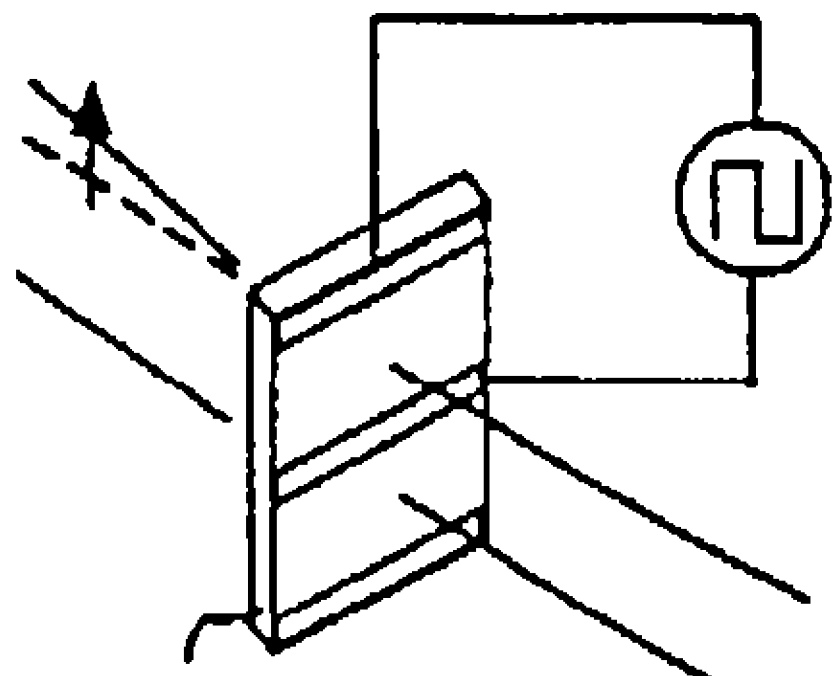
FIG. 29 is a diagram illustrating the structure of a variation of the optical axis adjusting part according to the present invention.

In the above-mentioned embodiments, the movable mirrors are used as the optical axis adjusting part according to the present invention. However, the optical axis adjusting part is not limited to the movable mirrors. The optical axis adjusting part may comprise anything that can adjust the optical axis of an optical beam with respect to the sub-scanning direction. As shown in FIG. 29, a substrate 570 in which liquid crystal is enclosed may be provided in an optical path between an illuminant and a polygon mirror. By applying an electric field to the liquid crystal and changing the orientation of the liquid crystal, an incident optical beam may be variably deflected. Specifically, a deflector as disclosed in Japanese Laid-Open Patent Application No. 08-313941 can be used as such an optical axis adjusting part.

Figure 30:
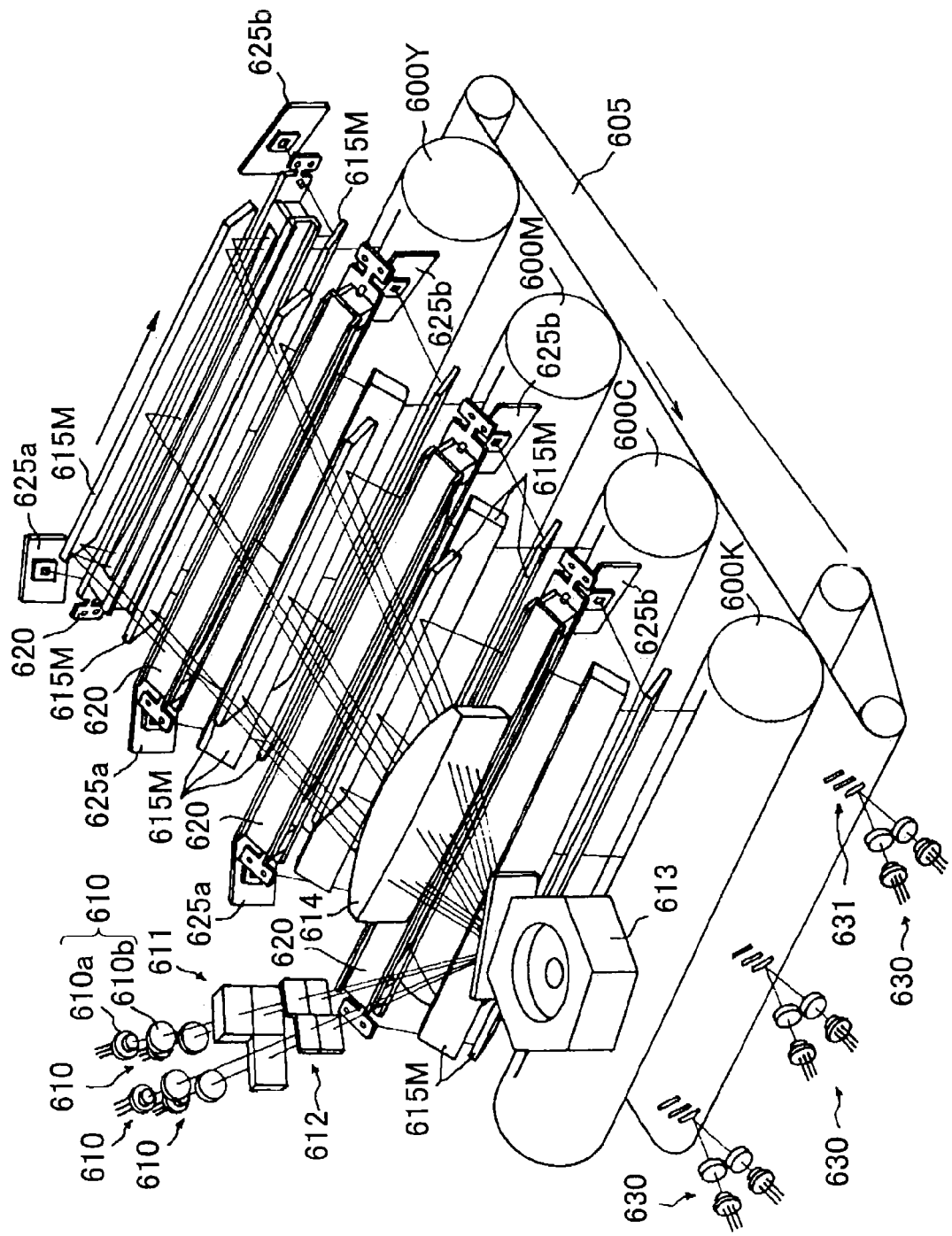
FIG. 30 is a diagram illustrating the structure of an image forming part of an image forming apparatus according to one embodiment of the present invention.

FIG. 30 shows an image forming part of an image forming apparatus according to one embodiment of the present invention wherein the image forming part comprises an optical scanner, drum-shaped image carriers 600K, 600C, 600M and 600Y (hereinafter referred to as photoconductor drums) and a transfer belt 605.

Referring to FIG. 30, each of the photoconductor drum 600K, 600C, 600M and 600Y has processing members in accordance with an electrophotographic process in the vicinity thereof. For example, the processing members are an electrifying part and a cleaning part for removing remaining toners on a photoconductor drum after a transferring process. Additionally, for example, a paper feeding part is disposed below the undersurface of the transfer belt 605 to face the photoconductors 600K, 600C, 600M and 600Y. The paper feeding part comprises a paper feeding cassette to accommodate and supply recording media (hereinafter referred to as record papers). Furthermore, a transferring part is disposed at the inner side of the transfer belt 605 to face the photoconductor drums 600K, 600C, 600M and 600Y. A belt electrifying part, is disposed at the upstream side of the rotational direction of the transfer belt 605, which is indicated by an arrow in FIG. 30. On the other hand, a belt separating charger, a fusing part and the like are disposed at the downstream side of the rotational direction of the transfer belt 605. These parts are known to those skilled in the art and are configured according to FIG. 35 to be mentioned later. For simplicity, these parts are omitted in FIG. 30.

A description will now be given, with reference to FIG. 30, of a tandem type color image forming apparatus for forming a color image. In this tandem type image forming apparatus, an optical scanner exposes the plurality of photoconductors 600K, 600C, 600M and 600Y so as to form individual simple color latent images to be developed. After being developed, the resulting individual visible images on the photoconductors 600K, 600C, 600M and 600Y are superposed and transferred onto the transfer belt 605 sequentially. Then, all the transferred images on the transfer belt 605 are simultaneously transferred onto a same record paper so as to form a full color image.

Whenever a predetermined number of record papers are printed, the optical scanner emits an optical beam, which is called a laser beam or scanning beam, to form a toner image for detecting color displacement. Based on three color displacement detecting toner images 631 on the transfer belt 605 as illustrated in FIG. 15, a color displacement detecting sensor 630 detects color displacement.

The optical scanner is configured as a unit such that a (not illustrated) box-shaped optical housing includes optical scanning image forming systems that comprises an illuminant unit 610 to be mentioned later, a polygon mirror 613, various lenses 612 and 614, mirrors 615M, a writing start position correcting part 611, beam spot position detecting parts 625a and 625b, which serve as position difference detecting parts. The optical scanner is disposed above photoconductors 600Y, 600M, 600C and 600K. The writing start position correcting part 611 includes a lead screw type actuator, which is driven by a stepping motor, to be mentioned later as a rotation adjusting part for controlling a wedge-shaped prism.

Here, the color displacement detecting sensor 630, which is installed in the image forming apparatus, is also used as the position difference detecting part to detect an amount to be corrected by the writing start position correcting part 611. The color displacement detecting sensor 630 may be used together with the beam spot position detecting parts 625a and 625b. In this case, the color displacement detecting sensor 630 is used to roughly correct a position difference, and the beam spot position detecting parts 625a and 625b are used to finely correct the position difference. Based on misalignment detection results, the writing start position correcting part 611 corrects and controls the position of an optical spot on a photoconductor during writing of image data.

The four photoconductor drums 600Y, 600M, 600C and 600K offer surfaces to be scanned by optical beams emitted from the optical scanner. The photoconductor drums 600Y, 600M, 600C and 600K are linearly arranged and rotationally driven. The optical scanner emits optical beams toward the individual photoconductor drums 600Y, 600M, 600C and 600K so as to form latent images thereon. Then, the individual color latent images are developed as different color toner images on the photoconductor drums 600Y, 600M, 600C and 600K. After the development, the resulting color toner images are sequentially superposed and transferred onto the transfer belt 605, which serves as an intermediate transferred member.

The optical scanner has four illuminant units 610 for emitting optical beams to form different color latent images corresponding to the individual photoconductor drums 600Y, 600M, 600C and 600K. Each of the illuminant units 610 at least includes a semiconductor laser 610a and a collimate lens 610b.

The optical beams from the four illuminant units 610 travel to the polygon mirror 613, which serves as a deflecting part, through a cylinder lens 612 and the writing start position correcting part 611.

After the optical beams are deflected by the polygon mirror 613, the deflected optical beams reach to the individual photoconductor drums 600Y, 600M, 600C and 600K through the fθ lens 614, the folding mirrors 615M and the toroidal lenses 620 so as to expose the photoconductor drums 600Y, 600M, 600C and 600K.

Each of the optical beams from the four illuminant units 610 travels to the corresponding photoconductor drum via the optical scanning systems from the cylinder lens 612 to the toroidal lens 620. Here, the polygon mirror 613 is directly coupled to a (not illustrated) polygon motor and is rotationally driven by the polygon motor.

The longitudinal axes of the photoconductor drums 600Y, 600M, 600C and 600K correspond to the main scanning direction. The beam spot position detecting parts 625a and 625b are disposed to face each other at both sides of outside areas out of an effective image area on the photoconductor drums 600Y, 600M, 600C and 600K. The beam spot position detecting parts 625a and 625b detect a writing start position and a writing end position, respectively.

In this embodiment, the optical scanner has at least one wedge-shaped prism on an optical path of an optical beam between the illuminant units 610 and the polygon mirror 613.

The writing position correcting part 611 shifts an optical spot with respect to the sub-scanning direction by rotating the wedge-shaped prism approximately on the optical axis of the collimate lens 610b.

A description will now be given, with reference to FIG. 31, of a correction mechanism for correcting an optical spot with respect to the sub-scanning direction by using a wedge-shaped prism.

Figure 31:
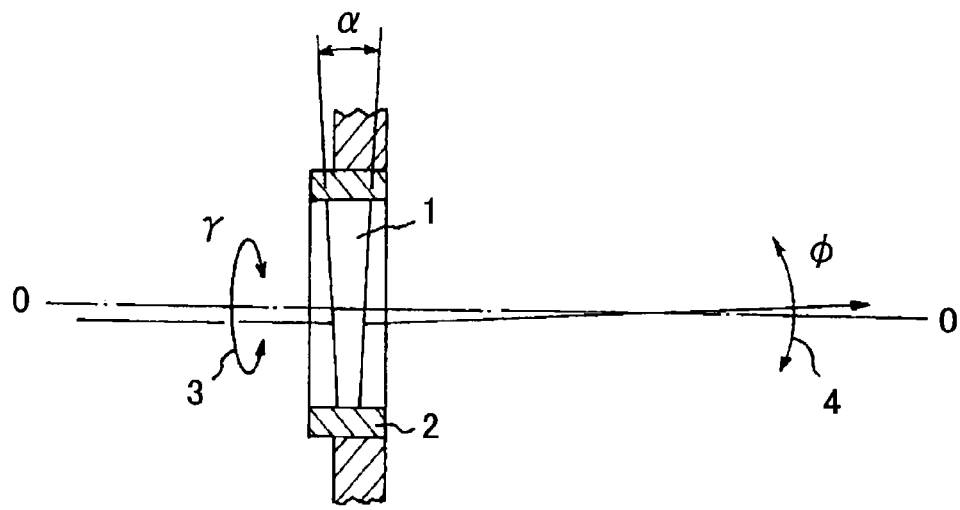
FIG. 31 is a diagram for explaining a correction mechanism for correcting the position of an optical spot with respect to the sub-scanning direction by means of a wedge-shaped prism.

In FIG. 31, a wedge-shaped (trapezoidal) prism 1 is rotated approximately on the optical axis O-O of the collimate lens 610b as indicated by the arrow 3. Thereby, it is possible to deflect an incident optical beam within the maximum deflection angle φ as indicated by the arrow 4 and adjust the position of the optical spot on a scanned surface with respect to the sub-scanning direction.

When the wedge-shaped prism 1 is rotated on the optical axis O-O of the collimate lens 610b as illustrated in FIG. 31, it is possible to adjust the deflection angle of the incident optical beam within the maximum deflection angle φ through deflection. Here, the maximum deflection angle φ is represented by using, the following formula;

$$\phi = (n-1) \times \alpha \tag{1},$$

where n is a refractive index of the wedge-shaped prism 1 and α is an apex angle of the wedge-shaped prism 1. Also, an amount of correction P for a scanning position on a photoconductor is represented by using the following formula;

$$P = fc \times \beta \times \tan\phi \times \sin\gamma \tag{2},$$

where fc is a focal distance of the collimate lens 610b, and β is a lateral magnification of all optical systems with respect to the sub-scanning direction. Here, it is preferable that the apex angle α [deg] of the wedge-shaped prism 1 satisfy the following inequality;

$$0.1 < \beta \times \tan[(n-1) \times \alpha] < 1.0 \tag{3}.$$

In the inequality (3), if the value of β×tan [(n−1)×α] is above the upper bound 1.0, wavefront aberration arises in the luminous flux. Thereby, the shape of the optical spot is deformed (occurrence of a side lobe) or the diameter of the optical spot increases. In contrast, if the value is below the lower bound 0.1, the optical spot has insufficient sensitivity. Thereby, it is necessary to make the rotational angle greater so as to adjust the writing start position. In this case, when variations over time should be corrected, the wedge-shaped prism 1 cannot respond immediately.

When the apex angle α of the wedge-shaped prism 1 is properly set, it is possible to realize the appropriate sensitivity. As a result, it is possible to prevent the excessive sensitivity unlike galvanometer mirrors and reduce influences due to vibration. Therefore, it is possible to position the optical spot with high accuracy.

In addition, the wedge-shaped prism 1 can be easily controlled because the wedge-shaped prism 1 is just rotationally driven. Thus, it is possible to flexibly correct the position of an optical spot during writing of image data compared to position correction for every batch at the start-up time of the optical scanner or before printing operations.

Figure 32:
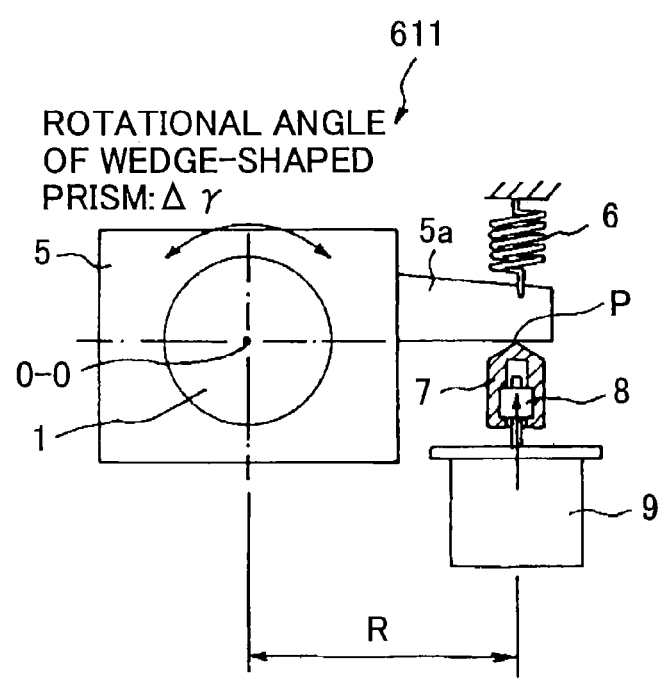
FIG. 32 is a diagram illustrating the structure of a lead screw type actuator serving as a writing start position correcting part.

A rotation adjusting part for the wedge-shaped prism 1 can comprise a lead screw type actuator driven by a stepping motor. In the lead screw type actuator, the wedge-shaped prism 1 is mounted in a prism holder 5 as illustrated in FIG. 32. The prism holder 5 supports the wedge-shaped prism 1 such that the wedge-shaped prism 1 is freely rotated on the optical axis O-O of the collimate lens 610b. The prism holder 5 has an arm 5a.

As shown in FIG. 32, an extensible spring 6 is provided between an end of the upper surface of the arm 5a and a fixed member so that the arm 5a is under pressure. Thereby, a clockwise moment with respect to the optical axis O-O is provided to the wedge-shaped prism 1 together with the prism holder 5.

A receiving member 7, which is in contact with an end of the lower surface of the arm 5a, obstructs rotation of the prism holder 5 including the wedge-shaped prism 1. As shown in FIG. 32, the receiving member 7 has a fundamentally column-shaped body and is cone-shaped at the upper end with respect to the axis direction as indicated by the arrow. The tip of the cone is in contact with the lower surface of the arm 5a. This contact point is referred to as an action point P of the actuator.

On the other hand, a nut 8 (or a female screw) is formed at the side of the receiving member 7 opposite to the tip so as to be coupled to the corresponding male screw integrally provided to the rotational axis of the stepping motor 9. This male screw is referred to as the lead screw. The stepping motor 9 is coupled to the above-mentioned or another fixed member.

The above-mentioned rotating part is referred to as the lead screw type actuator. The stepping motor 9 can rotate the prism holder 5 together with the wedge-shaped prism 1 on the optical axis O-O of the collimate lens 610b.

Since the lead screw type actuator is driven by the stepping motor 9, it is possible to control the rotational angle of the wedge-shaped prism 1 through a digital pulse signal applied to the stepping motor 9. As a result, after an amount of misalignment is computed by some computing part such as a microcomputer, it is possible to easily the rotation of the wedge-shaped prism 1 through feedback controls by providing an appropriate pulse signal.

The lead screw type actuator, which serves as the rotation adjusting part for the wedge-shaped prism 1, can be installed in the optical scanner as the writing starting position correcting part 611.

A description will now be given of another correction mechanism for correcting a color difference with respect to the sub-scanning direction.

In the color image forming apparatus shown in FIG. 30 or another color image forming apparatus described later with reference to FIG. 35, a color difference can be corrected with respect to the sub-scanning direction in such a way that the positions of scanning lines, which are emitted from optical scanning systems corresponding to individual colors, are properly adjusted to make the color difference approximately zero when individual color images are superposed on an intermediate transferred member.

When each of four optical beams corresponding to the four colors is attempted to be placed at a predetermined position in order to adjust the writing start position of the optical beam, there is a risk that optical performance such as the diameter of the optical spot is degraded due to an erroneous increase in rotational eccentricity. In addition, since more components are required for the writing start position correcting part, the fabrication cost is increased.

In order to eliminate this problem, the optical scanner according to the present invention sets one of the four colors: yellow (Y), magenta (M), cyan (C) and black (K) as a reference color and corrects the scanning positions of the other color optical beams relative to the scanning position of the reference color optical beam such that the scanning positions of the other color optical beams is approximately equal to the scanning position of the reference color. On the other words, an image of high reproducibility, in a sense that hue variations are sufficiently suppressed, can be obtained through the correction of "relative color displacement".

In this case, it is sufficient that wedge-shaped prisms 1 for correcting writing start positions are prepared for three of the scanning beams for the four colors Y, M, C and K. Consequently, just three wedge-shaped prisms 1 should be provided corresponding to the three scanning beams, and therefore just three writing start position correcting parts 611 are required.

In the optical scanner in FIG. 30, the three writing start position correcting parts 611 are installed for the three colors other than the reference color. The writing start position correcting part 611 for the reference color comprises a parallel flat plate or no component, that is, air. The writing start position correcting parts 611 for the other colors are formed as units that integrally include a wedge-shaped prism 1 and other components.

According to the above-mentioned optical scanner, since less portions and less amounts are adjusted, it is possible to easily correct a relative color difference even if scanning lines for the other colors are greatly misaligned to that of the reference color. In addition, it is possible to correct a color difference less than one line. From experiences of the inventors, if the relative color displacement is decreased below 30 μm, it is possible to obtain an image whose color displacement can be substantially ignored.

In the optical scanner according to the present invention, black is set as the reference color. In general, arbitrary color images can be formed of combinations of the three colors Y, M and C. In order to improve sharpness of the color images and enhance resolutions of character images, however, it is common that the optical scanner has a black process.

When the optical scanner adopts black as the reference color, the optical scanner has the following advantages. Since black has a higher contrast than the other colors, a black portion of an image is highly sensitive to variations of the diameter and the position of an optical spot due to external factors such as vibration and temperature changes. For this reason, if black is set as the reference color, it is possible to enhance the rigidity of optical components of the optical scanning system for black and thereby realize the tolerant optical scanning system to the external factors.

As mentioned above, since scanning lines for three of the four colors should be adjusted, it is sufficient that three wedge-shaped prisms 1 are prepared. In other words, it is possible to obtain an image of high color reproducibility in which hue variations are satisfactorily suppressed. In this case, just three writing start position correcting parts 611 should be prepared, for example, for the optical scanner in FIG. 30.

A description will now be given of an optical scanner according to another embodiment of the present invention.

The optical scanner comprises at least one wedge-shaped prism 1, a writing start position correcting part 611 and a position difference detecting part. The wedge-shaped prism 1 is disposed in an optical path between the illuminant unit 610 and the polygon mirror 613. The writing start position correcting part 611 rotates the wedge-shaped prism 1 approximately on the optical axis so as to make the position of an optical spot changeable with respect to the sub-scanning direction. The position difference detecting part detects relative sub-scanning directional differences between writing start positions on the photoconductor drums 600Y, 600M, 600C and 600K. Based on data regarding the differences detected by the position difference detecting part, the optical scanner is configured to feedback-control the writing start position correcting part 610.

Figure 33:
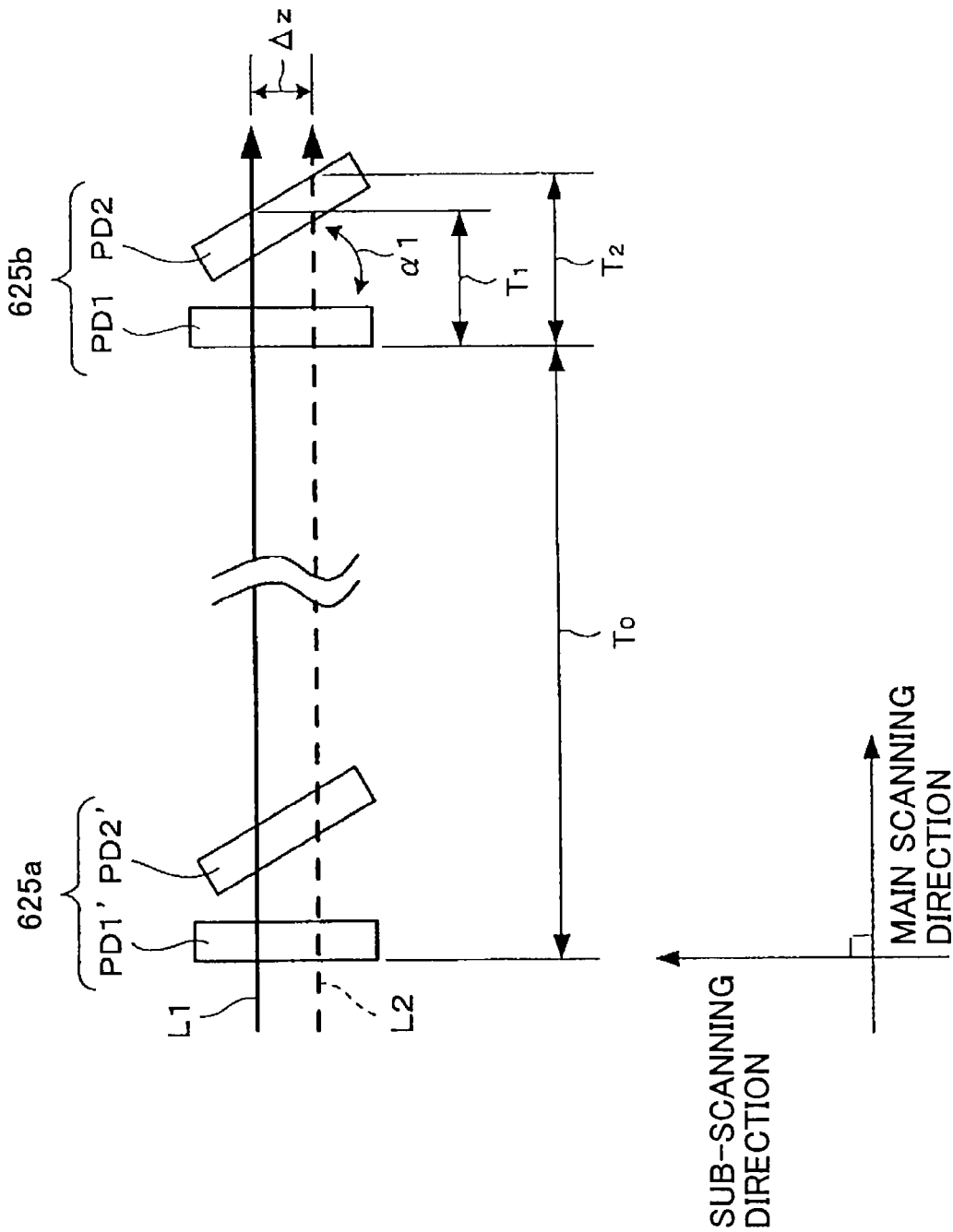
FIG. 33 is a diagram for explaining a detection mechanism by means of non-parallel photodiode sensors serving as a beam spot position detecting part.

If the position difference detecting part has the configuration as illustrated in FIG. 33, it is possible to use the position difference detecting part together with the beam spot position detecting part 625a for detecting the writing start positions or the beam spot position detecting part 625b for detecting the writing end positions.

According to the above-mentioned optical scanner, it is possible to effectively correct a difference between the writing start positions with respect to the sub-scanning direction on a photoconductor drum due to variations over time. Here, it is noted that a stepping motor, an ultrasonic motor or the like can be used to adjust rotation of the wedge-shaped prism 1 through the feedback control, as mentioned with reference to FIG. 32.

A description will now be given of an optical scanner according to another embodiment of the present invention.

The optical scanner is configured to use the writing start position correcting part 611 to perform the correction process at least once since start time of a printing process based on data regarding position differences detected by the position difference detecting part.

According to the above-mentioned optical scanner, even if a significant color displacement occurs over time regardless of proper adjustment of the optical scanner at shipment, it is possible to properly correct the color displacement due to periodical variations (places and seasons) over time because the correction of position differences is performed at least once before a printing process.

The position difference detecting part may be configured from non-parallel PD (Photodiode) sensors as illustrated in FIG. 33 or a beam spot position detecting part 625 using the non-parallel PD sensor.

Alternatively, the following prevailing correction method may be adopted. Specifically, before printing a first sheet, a reference toner image 631 is formed on the transfer belt 605 to detect a color displacement. A color displacement detecting sensor 630 is used to detect an amount of the color displacement. The color displacement detecting sensor 630 is formed of a reflection or transmission type sensor, which includes LED (Light Emitting Diode) and monitors for light intensity by means of a PD, and serves as the position difference detecting part installed in an image forming apparatus. Based on the detection, an amount of the correction is determined for a difference between writing start positions of the individual photoconductor drums 600Y, 600M, 600C and 600K. Finally, the writing start position correcting part 611, which serves as the rotation adjusting mechanism for the wedge-shaped prism 1, receives feedback.

A description will now be given of an optical scanner according to another embodiment of the present invention.

Figure 34:
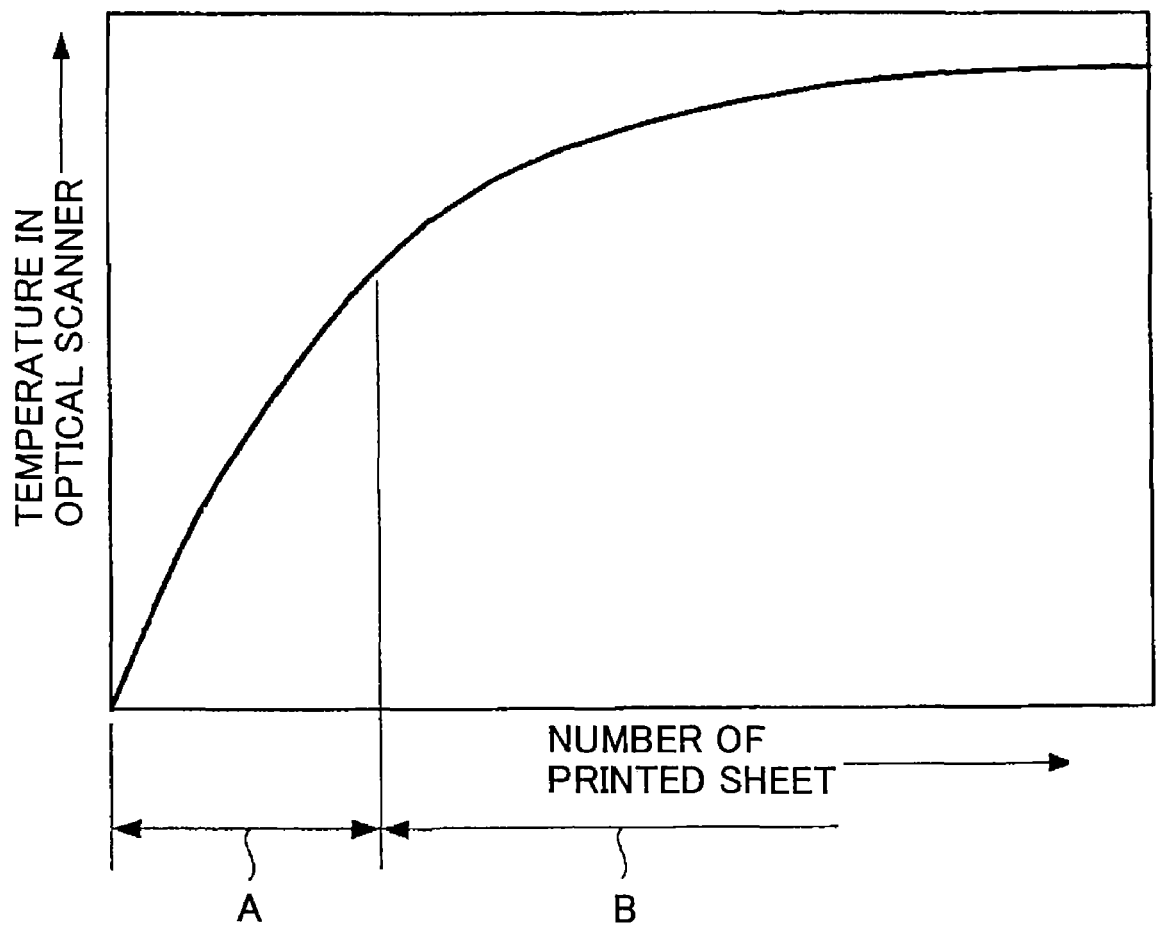
FIG. 34 is a graph of temperature changes in an optical scanner at successive printing.

As shown in FIG. 34, when a plurality of record sheets are successively printed out (during the interval designated by the notation B), heat is generated from the polygon mirror 613 and semiconductor laser 610a in the interior of the optical scanner and drastic temperature variations occur between the interval A of a start period and the interval B. In the exterior of the optical scanner, on the other hand, drastic temperature variations occur in the interior of the image forming apparatus due to a heater for fusing toners. In this case, optical spots are also variably positioned on photoconductor drums. For this reason, there is a problem in that output color images have greatly different hues depending on the number of output sheets.

In the optical scanner according to this embodiment, timing of the feedback control is determined such that the correction is performed within a time interval between printed sheets. A control time interval $T_A$ (between a time when an instruction for correcting a position difference is provided and a finish time of the control) is determined to satisfy the following inequality;

$$T_A < 0.8 \times (D/V) \tag{4},$$

where D is a distance between the sheets, and V is the linear speed of a photoconductor drum (linear speed of an image carrier).

If the wedge-shaped prism 1 is rotated at a response speed that meets the inequality (4), it is possible to form proper color images, each of which has a same hue as each other, even during drastic temperature variations due to successive printing.

However, if the control time interval $T_A$ is above the upper bound of the inequality (4), it is impossible to perform the correction during the successive printing. In this case, it is necessary to temporarily halt the printing process in order to correct scanning lines. As a result, although the tandem type color image forming apparatus has an advantage of high-speed printing, the tandem type color image forming apparatus cannot satisfactorily exert the advantage.

A description will now be given of an optical scanner according to another embodiment of the present invention.

In the optical scanner, a detection time interval $T_S$ (between a start time for correcting a position difference and a finish time of detection) is determined to satisfy the following inequality;

$$T_S < 10 \times (L/V) \tag{5},$$

where L is a length of a printed sheet with respect to the output direction, and V is the linear speed of a photoconductor drum.

The inequality (5) implies that when a position difference between scanning lines is detected during printing at least five sheets, hue variations is invisible to naked eyes even if drastic temperature variations occur in the image forming apparatus.

However, if the detection time interval $T_S$ is above the upper bound of the inequality (5), there is a risk that the resulting hue is problematic. Here, it is noted that the detection time interval $T_S$ includes a computation time for computing the correction amount for the position difference. The computation time is a time interval required to perform an averaging process for the purpose of noise reduction, improve the accuracy for position detection such as processing of an abnormal value and compute the correction amount to be supplied to the scanning line correcting part for feedback.

A description will now be given of an optical scanner according to another embodiment of the present invention.

In this optical scanner, the position difference detecting part detects the position of an optical spot by using non-parallel PD sensors disposed out of an effective writing area of the optical scanner with respect to the main scanning direction.

As shown in FIG. 33, the receiving surface of the photodiode PD1 (PD1') is orthogonal to a scanning beam, and the receiving surface of the photodiode PD2 (PD2') is inclined to that of PD1 (PD1'). This slope angle is designated by $\alpha 1$. Also, the scanning beam is referred to as L1 and L2 before and after a temperature variation due to a heater, respectively. Here, it is assumed that a position difference $\Delta Z$ (unknown) arises with respect to the sub-scanning direction. Here, passage times T1 and T2 of the respective scanning beams L1 and L2 between a pair of non-parallel photodiodes, for example, between PD1 and PD2 (or PD1' and PD2') is measured. Based on the results, a time difference T2-T1 is found, and then the sub-scanning directional scanning position (the writing start position) of the scanning beam is monitored for and detected.

It is possible to easily calculate a difference between dot positions with respect to the sub-scanning direction (=the sub-scanning directional correction amount $\Delta Z$) from the slope angle $\alpha 1$ between the receiving surfaces of PD1 and PD2 and the known time difference T2-T1. The optical scanner is configured to correct the correction amount $\Delta Z$ by using the writing start position correcting part 611.

According to the above-mentioned optical scanner, when a plurality of record sheets are successively printed out, it is possible to correct optical spots on photoconductor drums during writing of the images even if the optical spots are variably positioned on the photoconductor drums due to temperature variations.

Here, magnification variations with respect to the main scanning direction may be monitored for by detecting variations of a time interval T0 required for the scanning beam to pass between the photodiodes PD1' and PD1.

A description will now be given of a tandem type color image forming apparatus according to an embodiment of the present invention.

As shown in FIG. 34, when a plurality of image sheets are successively printed out, heat is generated from a polygon motor (not illustrated) for driving the polygon mirror 613 and semiconductor lasers (illuminants) 610*a* in the optical scanner in the image forming apparatus. In the exterior of the optical scanner, on the other hand, drastic temperature variations of the interior of the image forming apparatus occur when a heater, which serves as a fusing part, fuses toners. In this case, optical spots are also variably positioned on photoconductor drums, resulting in the problem that output color images have hues more different from each other as the number of the output color images increases.

The tandem type color image forming apparatus according to this embodiment is configured to have an optical scanner that comprises the position difference detecting part, at least one wedge-shaped prism and a writing start position correcting part 611 so as to adjust the positions of optical spots on photoconductor drums during writing of images. The position difference detecting part, which also serves as a beam spot position detecting part, detects position differences between scanning beams on the individual photoconductor drums 600Y, 600M 600C and 600K, as illustrated in FIG. 30. The wedge-shaped prism is disposed in an optical path between an illuminant and a deflecting part. The writing start position correcting part 611 rotates the wedge-shaped prism approximately on the optical axis so as to shift the position of the beam spot with respect to the sub-scanning direction. Based on the detected position differences measured by the position difference detecting part, the optical scanner can control the positions of optical spots on the photoconductor drums during writing of the images.

The exemplary color image forming apparatus that has the optical scanner according to the present invention has been described with reference to FIG. 30. In the following, a tandem type color image forming apparatus according to another embodiment of the present invention is described with reference to FIG. 35.

Figure 35:
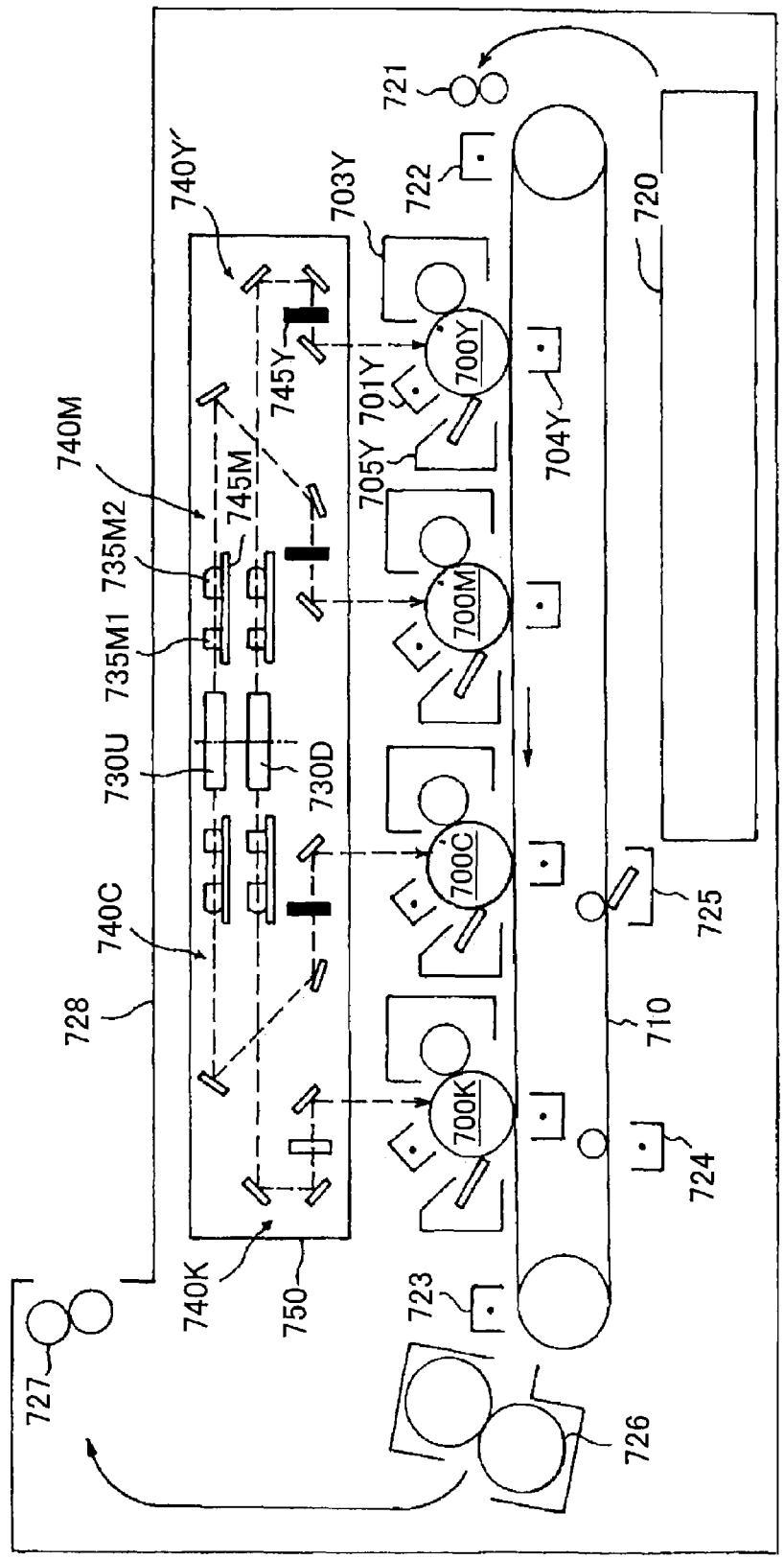
FIG. 35 is a diagram illustrating the structure of another exemplary image forming apparatus according to the present invention.

FIG. 35 roughly shows the structure of the tandem type color image forming apparatus. Referring to FIG. 35, in this tandem type color image forming apparatus, an optical scanner exposes a plurality of photoconductor drums (image carriers) 700Y, 700M, 700C and 700K so as to form electrostatic latent images. After the electrostatic latent images are developed, the resulting visible images on the individual photoconductor drums 700Y, 700M, 700C and 700K are superposed and transferred onto a transfer belt 710. Then, the images on the transfer belt 710 are entirely transferred onto a sheet-shaped medium (record paper) so as to obtain a color image.

In FIG. 35, the transfer belt 710 serves as an intermediate transfer belt for carrying a transferred paper (not illustrated) from a paper cassette 720. The transfer belt 710 is horizontally disposed at the inner-lower side of the image forming apparatus. From the upstream of the carrying direction of the transfer belt 710, the yellow photoconductor 700Y, the magenta photoconductor 700M, the cyan photoconductor 700C and the black photoconductor 700K, in the order, are arranged to have an equal interval between adjacent photoconductor drums.

In the following, suffixes Y, M, C and K may be attached to reference numerals corresponding to the four colors: yellow, magenta, cyan and black, respectively. All the photoconductor drums 700Y, 700M, 700C and 700K are formed to have a same diameter, and various processing members for forming a color image are provided in accordance with an electrophotographing process.

For instance, the photoconductor 700Y is focused hereinafter. In the vicinity of the photoconductor drum 700Y, an electrifying charger 701Y, an optical scanning image forming system 702Y, a developing device 703Y, a transferring charger 704Y and a cleaning device 705Y are disposed. The electrifying charger 701Y serves as an electrifying part. The developing device 703Y serves as a developing part. The transferring charger 704Y serves as a transferring part. The cleaning device 705Y serves as a cleaning means. In the vicinity of each of the other photoconductor drums 700M, 700C and 700K, the corresponding parts are provided similarly to the photoconductor drum 700Y. In this tandem type color image forming apparatus, the photoconductor drums 700Y, 700M, 700C and 700K are exposed in accordance with individual settings. A plurality of optical scanning image forming systems 702Y, 702M, 702C and 702K are provided corresponding to the photoconductor drums 700Y, 700M, 700C and 700K, respectively.

In the vicinity of the transfer belt 710, a pair of resist rollers 721, and a charger 722, which serves as a belt electrifying part, are disposed in the upstream side of the carrying direction of the transfer belt 710 as indicated by the arrow in FIG. 35. On the other hand, a belt detaching charger 723, a de-electrifying charger 724 and a cleaning device 725 are provided at the downstream side of the carrying direction of the transfer belt 710. Furthermore, a fusing device 726, which serves as q fusing part, is provided in the downstream side of the carrying direction from the belt detaching charger 723. The fusing device 726 is coupled to an output tray 728 via a pair of output rollers 727. In the above description, the suffix Y is omitted for simplicity.

In such a configuration, for example, when a full-color mode (multi-color mode) is selected, electrostatic latent images are formed on the photoconductors 700Y, 700M, 700C and 700K by optical beams from the individual scanning image forming optical systems based on image signals for individual colors: Y, M, C and K.

These electrostatic latent images are developed by the individual developing apparatuses for the color toners so as to form toner images. The toner images are sequentially transferred and superposed onto a transferred paper that are electrostatically absorbed on the transfer belt 710 to be carried. Then, the resulting paper is fused as a full-color image and is supplied to the output trey 728.

On the other hand, when a monochrome mode (single-color mode) is selected, the photoconductors 700Y, 700M and 700C and associated processing members are made inactivated, an electrostatic latent image is formed on only the photoconductor 700K by an optical beam from the scanning image forming optical system 702K based on an image signal for black. This electrostatic latent image is developed by black toners so as to form a toner image. The toner image is transferred onto a transferred paper that is electrostatically absorbed to be carried. The resulting paper is fused as a monochrome image and is supplied to the output trey 278.

Here, two fθ lenses 735M1 and 735M2 are fixed to a plate 745M in an optical housing 750. The fθ lenses 735M1 and 735M2 are fully or partially in contact with the corresponding surface of the plate 745M. The fθ lenses 735M1 and 735M2 are formed of a reasonable plastic material that can be aspherically-shaped with ease. Specifically, a synthetic resin is preferably used because of its low water absorbing property, high transparency and good formability. In this embodiment, the polygon mirror comprises an upper mirror 730U and a lower mirror 730D.

This color image forming apparatus has the above-mentioned optical scanner in the optical housing 750. Although not illustrated in FIG. 35, the color displacement detecting sensor 330 as illustrated in FIG. 30 may be used as the position difference detecting part.

While a large number of color images are successively printed out, rapid temperature variations are caused, especially, by heat of a polygon motor in the optical scanner. For this reason, if a first printed color image is compared to another color image that is printed out after several sheets have been printed out, there arises a problem that variations on color tone can be observed. If the optical scanner includes a wedge-shaped prism between the deflecting part and the scanned surface to be exposed, it is possible to not only correct differences of scanning positions and set the scanning position with high accuracy. In this case, furthermore, even if the temperature is rapidly varied, especially, due to successive printing, it is possible to obtain a satisfactory color image with little color displacement. Additionally, the above-mentioned optical scanners according to the embodiments of the present invention have their own merits.

A description will now be given of an optical scanner according to one embodiment of the present invention.

In the above-mentioned optical scanner in FIG. 30, a position difference between optical spots on the photoconductor drums 600Y, 600M, 600C and 600K can be corrected with respect to the sub-scanning direction based on position difference data that have been recorded in advance or position difference data that are detected by the position difference detecting part. This correction is conducted by the writing start position correcting part.

When the wedge-shaped prism is used in the writing start position correcting part, the optical scanner has the following advantages. The rotation of the wedge-shaped prism 1 can be easily controlled. Thus, it is possible to correct the positions of optical spots even during writing of image data relative to batch-based position correction that is performed intensively at starting-up time of the image forming apparatus or immediately before printing out. Even when the temperature is drastically varied during the starting-up interval A and the successive printing interval B as shown in FIG. 34 or a position difference occurs due to the unsteady speed of an intermediate transferring member and a photoconductor drum, the position difference can be eliminated in real-time based on data regarding position differences obtained by the position difference detecting part. Therefore, it is possible to effectively suppress occurrence of the position difference.

In FIG. 31, if the angle α of the wedge-shaped prism 1 is appropriately set, it is possible to realize appropriate sensitivity. Thus, it is possible to set the positions of optical spots with high accuracy without too-high sensitivity as a galvanometer mirror or influences due to vibration.

When a material and a shape of the wedge-shaped prism 1 and the prism holder 2 is appropriately selected, for example, the wedge-shaped prism 1 and the prism holder 2 are formed of a resin and have thin bodies, it is possible to decrease the weights thereof. For this reason, the high response speed of the wedge-shaped prism 1 makes it possible to correct a position difference at a higher frequency than conventional correction methods in which the positions of optical spots are corrected by tilting/shifting relatively heavy optical elements such as a long folding mirror, a scanning lens, a roof mirror and an illuminant unit.

When the wedge-shaped prism 1 is used to correct the positions of optical beams, it is possible to maintain appropriate positions of optical spots even at power OFF compared to conventional correction methods in which the positions of optical spots are corrected by adjusting a voltage applied to a liquid crystal element and an electric optical element such as PLZT. Furthermore, it is possible to implement the above-mentioned correction at a reasonable cost.

From inventors' experience, when an amount of displacement between colors is less than or equal to 30 μm, it is possible to achieve a condition in which color displacement is almost never noticeable in practice. According to the above-mentioned embodiment, it is possible to realize such a condition.

A description will now be given of an optical scanner according to another embodiment of the present invention.

When the wedge-shaped prism 1 is rotated on the optical axis O-O of the collimate lens 610b as illustrated in FIG. 30, it is possible to make the deflection angle variable within the maximum deflection angle φ. Here, the maximum deflection angle φ can be represented by the following formula (6);

$$\phi = (n-1) \times \alpha \qquad (6),$$

where n is a refractive index of the wedge-shaped prism 1 and α is an apex angle of the wedge-shaped prism 1.

Also, the correction amount ΔZ with respect to the sub-scanning direction on a photoconductor is represented by the following formula (7);

$$\Delta Z = \Delta \gamma |m \times fc \times (n-1) \times \alpha| \qquad (7),$$

where Δγ is an adjusted angle of the wedge-shaped prism 1 on the optical axis O-O, m is a sub-scanning directional lateral magnification of all optical systems between an illuminant and a scanned surface, and fc is a focal distance of the collimate lens 610b.

In the optical scanner according to this embodiment, a misalignment of an beam spot is corrected by setting the apex angle α [deg] of the wedge-shaped prism 1 to satisfy the following inequality (8);

$$1 < |m \times fc \times (n-1) \times \alpha| < 30 \qquad (8).$$

If the value of |m×fc×(n−1)×α| is above the upper bound of the inequality (8), the optical spot is irregularly shaped (generation of a side lobe) or the diameter of the optical spot increases due to wavefront aberration of the luminous flux. In contrast, if the absolute value is below the lower bound of the inequality (8), it is necessary to make the rotation angle greater in order to improve insufficient sensitivity and adjust the writing start position. As a result, it becomes difficult to realize a high-speed response when variations over time are to be corrected.

Therefore, if the inequality (8) is met, it is possible to eliminate the above-mentioned problems, that is, enlargement of a beam spot diameter, insufficient sensitivity to the correction, a large rotation angle for adjusting the writing start position, and an insufficient response speed to correction for variations over time. Here, the rotation of the wedge-shaped prism 1 can be easily controlled by using a stepping motor or an ultrasonic motor as the drive source.

A description will now be given of an image forming apparatus according to another embodiment of the present invention.

Although an intermediate transferred body is configured as the transfer belt 605 in the image forming apparatus illustrated in FIG. 30, the intermediate transferred body may be drum-shaped. FIG. 36A shows a variation of the position of an optical spot with respect to the sub-scanning direction on such a drum-shaped intermediate transferred body and a variation of the position of an optical spot with respect to the sub-scanning direction on a belt-shaped intermediate transferred body.

As seen from FIG. 36A, the difference ΔZ of optical spot positions with respect to the sub-scanning direction, that is, the sub-scanning directional correction amount as previously mentioned, is periodically caused on the intermediate transferred bodies. In FIG. 36A, one period corresponds to a time interval $T_m$ necessary for one rotation of the intermediate transferred bodies. In an intermediate transferred body is formed as a belt-shaped or drum-shaped rotational body, the time interval $T_m$ is represented by the following formula;

$$T_m = L_m/v_m \quad (9),$$

where $L_m$ is a length of one rotation of the intermediate transferred body, and $v_m$ is a linear velocity of the intermediate transferred body.

It is preferable that the time interval $T_m$ satisfy the following inequality;

$$0.5 < T_m(=L_m/v_m) < 5 [sec] \quad (10).$$

In the inequality (10), if the time interval $T_m$ is above the upper bound, the intermediate transferred body is highly sensitive to exogenous factors such as vibration because of a too large length of one period. In contrast, if the time interval $T_m$ is below the lower bound, the wedge-shaped prism 1 cannot follow a high response speed necessary for the position correction for an otpical spot. Therefore, when the time interval $T_m$ satisfies the inequality (10), it is possible to eliminate the above-mentioned problems on the intermediate transferred body, that is, less sensitivity to exogenous factors such as vibration, and follow-up capability toward the position correction for an optical spot.

FIG. 36B shows a position difference of the position of an optical spot with respect to the sub-scanning direction after the optical spot position is corrected. When the misalignment of an optical spot position on the intermediate transferred body is corrected by adjusting the optical spot position, it is possible to properly correct a low-frequency component of the misalignment. According to the correction, however, it is impossible to correct an extremely high-frequency component of the misalignment.

A description will now be given of an optical scanner according to one embodiment of the present invention.

In the above-mentioned writing start position correcting part in FIG. 31, a shift amount Δx of the linear actuator (=a displacement amount of a nut=a displacement amount of an action point P) is represented by the following formula;

$$\Delta x = R \times \tan(\Delta\gamma) \quad (11),$$

where R is a distance between the rotational center and the action point of the actuator, and Δγ is a rotational angle of the wedge-shaped prism 1.

On the other hand, the time interval $T_m$ necessary for one rotation of the intermediate transferred body is represented, as mentioned previously, by the formula (9);

$$T_m = L_m/v_m [sec].$$

Thus, a drive frequency N per unit time of the stepping motor required to control the sub-scanning directional correction amount ΔZ on a photoconductor is represented by the following formula;

$$N = \Delta x/p \times N_0/T_m \quad (12),$$

where p is a screw pitch of the lead screw, and $N_0$ is the number of pulses per one rotation of the stepping motor.

When the stepping motor satisfies the following inequality;

$$10 < N < 2000 [pps] \quad (13),$$

it is possible to properly reduce color displacement.

In the inequality (13), if N is above the upper bound (2000 [pps] or preferably 1000 [pps]), the stepping motor cannot respond and the correction for misalignment of a beam spot cannot be followed. In contrast, if N is below the lower bound, the position of a beam spot cannot be corrected with insufficient accuracy because of rough resolution.

On the other hand, a torque (rotational moment) T of the stepping motor is represented by the following formula;

$$T = \frac{T_1 p}{2\pi R}, \quad (14)$$

where $T_1$ is a torque generated by tension of the spring, p is a screw pitch of the lead screw, and R is a distance between the rotational center and the action point.

Figure 37:
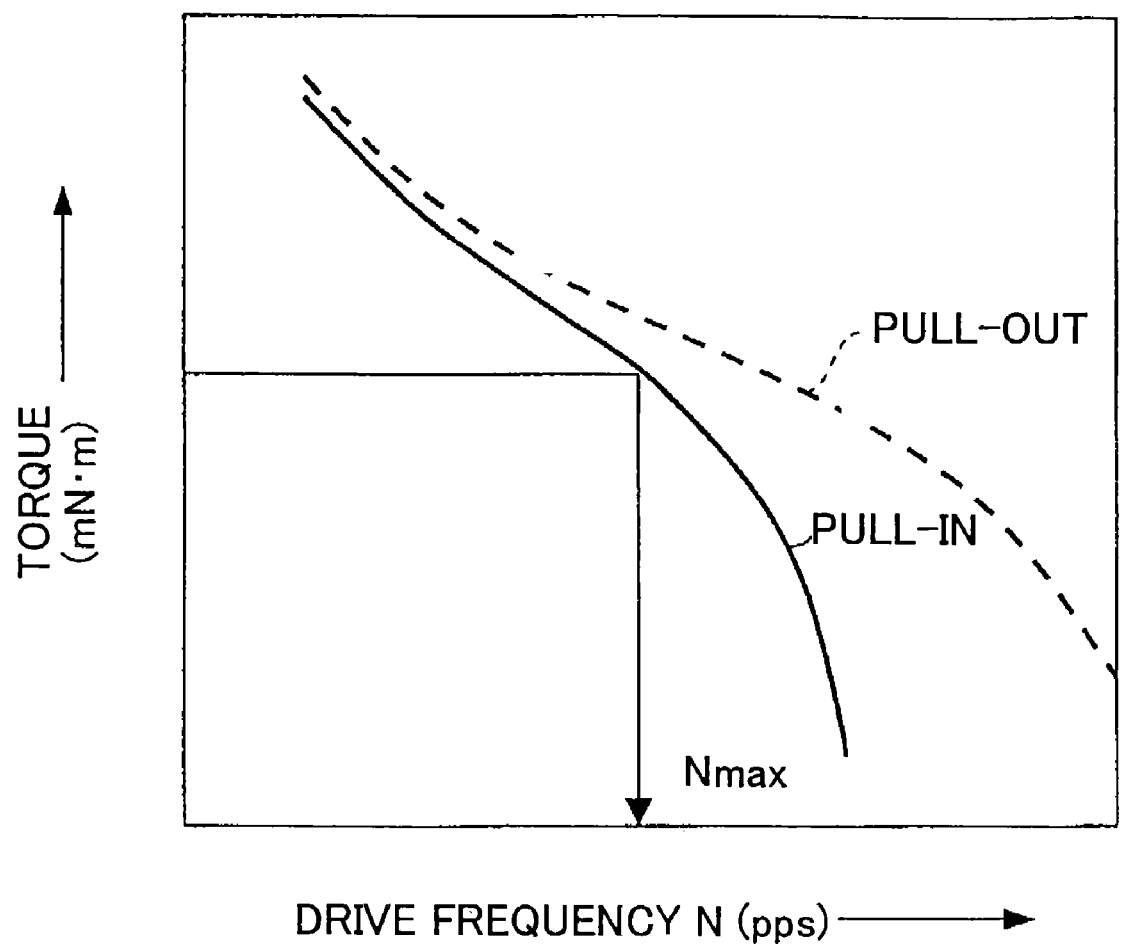
FIG. 37 is a graph of a relation between drive frequency of a stepping motor and torque.

The maximum number $N_{max}$ of response pulses of the stepping motor is obtained from a pull-in drive frequency toward the torque T with reference to the characteristic diagram of the stepping motor as illustrated in FIG. 37.

Thus, the number of pulses N, represented by the formula (12), per unit time required to control the sub-scanning directional correction amount ΔZ on a photoconductor needs to satisfy the following inequality;

$$N < N_{max} \quad (15).$$

A description will now be given of an optical scanner according to another embodiment of the present invention.

As shown in FIG. 15, the optical scanner includes a misalignment detecting part, at least one wedge-shaped prism 1 and a writing starting position correcting part 140. The misalignment detecting part, which also serves as a beam spot position detecting part, detects a position difference with respect to the sub-scanning direction between scanning beams on the individual photoconductors 160Y, 160M, 160C and 160K. The writing starting position correcting part 140, adjusts positions of the beam spots with respect to the sub-scanning direction by rotating the wedge-shaped prism 1 approximately on the optical axis. Based on misalignment data measured by the misalignment detecting part, the positions of the beam spots on the photoconductors are controlled during writing of image data.

The position difference detecting part detects a position of a beam spot by using a non-parallel photo diode sensor (PD) provided out of a written area with respect to the main scanning direction of the optical scanner. It is preferable that the non-parallel photo diode sensor be provided out of an effective writing area of a scanning beam for each of the photoconductors 160Y, 160M, 160C and 160K, for example, as the beam spot position detecting parts 300a and 300b in FIG. 15. At this time, the misalignment detecting part may also detect a synchronizing signal for determining the writing starting position with respect to the main scanning direction. In this embodiment, the misalignment detecting part detects the synchronizing signal for determining the writing starting position.

In the position difference detecting part, which is implemented as the beam spot position detecting parts 625a and 625b, a detection time interval $T_S$ for the scanning beams L1 and L2 by the non-parallel photo diodes PD1 and PD2, that is, the time interval between the starting time and the finishing time of the misalignment detection, is characterized in that the detection time interval $T_S$ satisfies the following inequality;

$$T_S < 10 \times (L_p/V_p) \tag{16}$$

where $L_p$ is a length of a recorded paper with respect to the output direction (the shift direction of the transfer belt 605 indicated by the arrow in FIG. 30), and $V_p$ is a linear velocity of a photoconductor.

The inequality (16) implies that even if drastic temperature variations occur, it is possible to make color tone variations invisible to the naked eyes by detecting misalignment of a scanning line while at least five sheets are being printed out. If the detection time interval $T_S$ is above the upper bound, there is a risk that a problematic color tone may be generated.

Here, the detection time interval $T_S$ includes a time interval for computing a correction amount of misalignment. This computation includes a computation time during which a correction amount for feedback to the scanning line correcting part is computed so as to improve accuracy for misalignment detection such as averaging and abnormal value processing for the purpose of noise reduction.

A description will now be given of exemplary numerals according to the present invention.

(1) Condition
Performance of optical systems
   m=9.4, fc=15 [mm]
Wedge-shaped prism
   α=2°, n=1.51 (BK7)
Lead screw type actuator
   $T_1$=25×10$^{-3}$ [Nm], p=0.3 [mm], R=16 [mm],
   $N_0$=20 [pulse/one rotation]
Intermediate transferred body
   $L_m$=500 [mm], $v_m$=250 [mm/s]
(2) Example of computation $$|m \times fc \times (n-1) \times \alpha| = |9.4 \times 15 \times (1.51-1) \times (2°/180° \times \pi)|$$
$$=2.5, \text{ which satisfies the inequality} \tag{8}$$

$$\Delta\gamma = \frac{\Delta Z}{|m \times fc \times (n-1) \times \alpha|} = 0.2/2.5 = 0.2 (=11°),$$

$\Delta x = R \times \tan(\Delta\gamma) = 16 \times \tan(0.2) = 3.2$ [mm], and $T_m = L_m/v_m = 2$ [sec], resulting in $N = \Delta x/p \times N_0/T_m = 3.2/0.3 \times 20/2 = 106$ [pps], which satisfies the inequality (13).

$$T = \frac{T_1 p}{2\pi R} = 25 \times 10^{-3} \times 0.3/(2\pi \times 16) = 7.46 \times 10^{-3} \text{ [Nm]},$$

which implies that a stepping motor that satisfies the inequality $N_{max} > N$ is used for $N_{max}$ in the motor characteristic diagram similar to FIG. 37.

The present invention is not limited to the specifically disclosed embodiments, and variations and modifications may be made without departing from the scope of the present invention.

The present application is based on Japanese priority applications No. 2002-193652 filed Jul. 2, 2002, No. 2002-276311 filed Sep. 20, 2002, No. 2002-274073 filed Sep. 19, 2002, and No. 2002-274075 filed Sep. 19, 2002, the entire contents of which are hereby incorporated by reference.

What is claimed is:

1. An optical scanner for scanning an image carrier comprising:
   an illuminant part emitting an optical beam;
   a deflecting part deflecting the optical beam;
   an image forming part focusing the deflected optical beam on the image carrier; and
   an optical axis adjustment part adjusting an optical axis of the optical beam with respect to a sub-scanning direction during an image writing operation of image data,
   the optical axis adjustment part comprising a prism for adjustment of a scanning position or a beam spot position of the optical beam on the image carrier with respect to a sub-scanning direction during the writing of image data by rotating the prism on an optical axis of the optical beam to deflect the incoming optical beam within a maximum deflection angle Φ, the maximum deflection angle Φ being defined in a formula Φ=(n−1)×α in which n is a refractive index of the prism and α is an apex angle of the prism, and the apex angle α of the prism satisfies:

$$0.1 < \beta \times \tan[(n-1) \times \alpha] < 1.0$$

in which β is a lateral magnification of all optical systems with respect to the sub-scanning direction, to compensate for misalignment of the scanning position or beam spot position due to fluctuation in rotation of the image carrier.

2. The optical scanner as claimed in claim 1, wherein the optical axis adjustment part further adjusts a writing start position on the image carrier.

3. The optical scanner as claimed in claim 2, further comprising:
   a beam position detection part detecting a beam position of the optical beam.

4. The optical scanner as claimed in claim 3, further comprising:
   a housing integrally accommodating the illuminant part, the deflecting part, the image forming part, the optical axis adjustment part, and the beam position detection part.

5. The optical scanner as claimed in claim 4, wherein the beam position detected by the beam position detection part is allowed to conduct free expansion relative to a location of the beam position detection part within the housing.

6. The optical scanner as claimed in claim 1, further comprising a rotation adjusting mechanism configured to adjust a rotational angle of the prism based on a detected amount of the misalignment of the scanning position beam spot position.

7. An image forming apparatus, comprising:
a plurality of image carriers; and
an optical scanner scanning the plurality of image carriers, the optical scanner comprising: an illuminant part emitting one or more optical beams; a deflecting part deflecting the optical beams; an image forming part focusing the deflected optical beams on the plurality of image carriers; and an optical axis adjustment part comprising a prism for adjustment of scanning positions or beam spot positions of the optical beams on the plurality of image carriers with respect to a sub-scanning direction during an image writing operation by rotating the prism on optical axes of the optical beams to deflect the incoming optical beam within a maximum deflection angle $\Phi$, the maximum deflection angle $\Phi$ being defined in a formula $\Phi=(n-1)\times\alpha$ in which n is a refractive index of the prism and $\alpha$ is an apex angle of the prism, and the apex angle $\alpha$ of the prism satisfies:

$$0.1<\beta\times\tan[(n-1)\times\alpha]<1.0$$

in which $\beta$ is a lateral magnification of all optical systems with respect to the sub-scanning direction, to compensate for misalignment of the scanning positions or beam spot positions due to fluctuation in rotation of the image carriers.

8. The image forming apparatus as claimed in claim 7, wherein the optical axis adjustment part further adjusts writing start positions on the plurality of image carriers.

9. The image forming apparatus as claimed in claim 8, further comprising:
a resist difference detection part detecting a resist difference between writing start positions on the plurality of image carriers.

10. The image forming apparatus as claimed in claim 9, wherein the optical axis adjustment part adjusts the writing start positions on the plurality of image carriers based on the resist difference detected by the resist difference detection part.

11. The image forming apparatus as claimed in claim 9, wherein a distance between an image transferred position onto a transferred member of the image forming apparatus and a resist position detected by the resist difference detection part is set to be an approximately integer multiple of a circumferential length of a driving roller for driving the transferred member.

12. The image forming apparatus as claimed in claim 8, further comprising:
a beam spot position detection part detecting beam spot positions on the plurality of image carriers.

13. The image forming apparatus as claimed in claim 12, wherein the optical axis adjustment part adjusts scanning positions on the plurality of image carriers based on misplacement of the beam spot positions detected by the beam spot position detection part.

14. The image forming apparatus as claimed in claim 7, further comprising a rotation adjusting mechanism configured to adjust a rotational angle of the prism based on a detected amount of the misalignment of the scanning position beam spot position.

* * * * *